(12) United States Patent
Amano et al.

(10) Patent No.: US 7,691,925 B2
(45) Date of Patent: Apr. 6, 2010

(54) PRESSURE-SENSITIVE ADHESIVE COMPOSITION, PRESSURE-SENSITIVE ADHESIVE SHEETS AND SURFACE PROTECTING FILM

(75) Inventors: Tatsumi Amano, Ibaraki (JP); Masahiko Ando, Ibaraki (JP); Kazuhito Okumura, Ibaraki (JP); Natsuki Kobayashi, Ibaraki (JP)

(73) Assignee: Nitto Denko Corporation, Osaka (JP)

( * ) Notice: Subject to any disclaimer, the term of this patent is extended or adjusted under 35 U.S.C. 154(b) by 726 days.

(21) Appl. No.: 11/073,456

(22) Filed: Mar. 7, 2005

(65) Prior Publication Data
US 2005/0197450 A1  Sep. 8, 2005

(30) Foreign Application Priority Data

| Mar. 8, 2004 | (JP) | 2004-064344 |
| Apr. 19, 2004 | (JP) | 2004-122626 |
| May 26, 2004 | (JP) | 2004-156011 |
| Sep. 10, 2004 | (JP) | 2004-264128 |
| Jan. 18, 2005 | (JP) | 2005-010022 |
| Feb. 2, 2005 | (JP) | 2005-026357 |
| Feb. 2, 2005 | (JP) | 2005-026704 |
| Feb. 2, 2005 | (JP) | 2005-026737 |
| Feb. 2, 2005 | (JP) | 2005-026766 |

(51) Int. Cl.
*C08K 5/34* (2006.01)
*C08L 33/06* (2006.01)

(52) U.S. Cl. .............. 524/99; 524/95; 524/104; 524/106; 524/272; 524/560; 428/343; 528/392; 528/492

(58) Field of Classification Search ............. 428/411.1, 428/355 R, 343; 524/95, 99, 104, 106, 272, 524/560; 528/392, 492
See application file for complete search history.

(56) References Cited

U.S. PATENT DOCUMENTS

| 3,492,276 A * | 1/1970 | Smith .................. 528/389 |
| 4,145,327 A | 3/1979 | Dolch et al. |
| 5,183,841 A | 2/1993 | Bernard |
| 5,433,892 A | 7/1995 | Czech |
| 5,631,079 A | 5/1997 | Gutman et al. |
| 5,885,678 A * | 3/1999 | Malhotra ............... 428/32.29 |
| 5,952,398 A | 9/1999 | Dietz et al. |
| 6,028,132 A | 2/2000 | Hayashi |
| 6,103,316 A * | 8/2000 | Tran et al. ............... 427/505 |
| 6,245,847 B1 | 6/2001 | Green et al. |
| 6,372,829 B1 | 4/2002 | Lamanna et al. |
| 6,407,788 B1 | 6/2002 | Okumura et al. |
| 6,657,011 B2 | 12/2003 | Lau et al. |
| 6,706,920 B2 | 3/2004 | Lamanna et al. |
| 6,939,911 B2 | 9/2005 | Tosaki et al. |
| 7,491,758 B2 | 2/2009 | Amano et al. |
| 2001/0031835 A1 | 10/2001 | Ohrui et al. |
| 2001/0041763 A1 | 11/2001 | Suzuki et al. |
| 2002/0132111 A1 | 9/2002 | Zhou et al. |
| 2002/0137825 A1 | 9/2002 | Lamanna et al. |
| 2003/0114560 A1 | 6/2003 | Yang et al. |
| 2004/0054041 A1 * | 3/2004 | Schmidt .................. 524/99 |
| 2005/0025903 A1 * | 2/2005 | Fink et al. ............... 427/521 |
| 2005/0080195 A1 | 4/2005 | Iwama |
| 2005/0266238 A1 | 12/2005 | Amano et al. |
| 2006/0024494 A1 | 2/2006 | Amano et al. |
| 2006/0100323 A1 | 5/2006 | Schmidt et al. |
| 2006/0188711 A1 | 8/2006 | Kishioka et al. |
| 2006/0207722 A1 | 9/2006 | Amano et al. |
| 2007/0141329 A1 | 6/2007 | Yang et al. |
| 2007/0149650 A1 | 6/2007 | Masuda |
| 2008/0176976 A1 | 7/2008 | Amano et al. |
| 2009/0029162 A1 | 1/2009 | Ukei et al. |
| 2009/0163626 A1 | 6/2009 | Ukei et al. |

FOREIGN PATENT DOCUMENTS

| EP | 0 435 080 | 7/1991 |
| EP | 1 102 108 A2 | 5/2001 |
| EP | 1 491 604 | 12/2004 |
| EP | 1 548 750 | 6/2005 |
| EP | 1 574 557 | 9/2005 |
| EP | 1 591 506 | 11/2005 |
| EP | 1 595 929 | 11/2005 |
| EP | 1 602 698 | 12/2005 |
| EP | 1 621 596 | 2/2006 |
| GB | 2121061 | 12/1983 |

(Continued)

OTHER PUBLICATIONS

Peter Wasserscheid, et al., "Ionic Liquids-New Solutions" for Transition Metal Catalysis, Angew: Chem, Int. , 39, pp. 3773-3789 Nov. 3, 2000.
Brochure regarding "Functional Chemicals" published by Kyoeisha Chemical Co., Ltd., printed and published in May 2003, front page, pp. 11-12, 19-20 and back page.
European Office Action issued on the related European Patent Application No. EP05016102.5, dated Apr. 16, 2007.
European Search Report issued on the related European Patent Application No. EP05011720.9, dated Sep. 30, 2005.
European Search Report issued on the related European Patent Application No. EP05016102.5, dated Dec. 29, 2005.

(Continued)

*Primary Examiner*—Thao T. Tran
(74) *Attorney, Agent, or Firm*—Knobbe Martens Olson & Bear LLP

(57) ABSTRACT

An object of the present invention is to provide a pressure-sensitive adhesive composition in which electrification of a pressure-sensitive adhesive sheet can be prevented upon peeling, and staining property on an adherend can be reduced, and an antistatic pressure-sensitive sheet and surface protecting film using this. There is provided a pressure-sensitive composition comprising an ionic liquid and a polymer having a glass transition temperature Tg of 0° C. or lower as a base polymer.

18 Claims, 2 Drawing Sheets

FOREIGN PATENT DOCUMENTS

| | | |
|---|---|---|
| JP | 59-226076 | 12/1984 |
| JP | 61-138901 | 6/1986 |
| JP | 04-309585 | 11/1992 |
| JP | 5-009449 | 1/1993 |
| JP | 06-051121 | 2/1994 |
| JP | 06-128539 | 5/1994 |
| JP | 9-157618 | 6/1997 |
| JP | 09-165460 | 6/1997 |
| JP | 9-208910 | 8/1997 |
| JP | 10-231325 | 9/1998 |
| JP | EP 0 873 986 A1 | 10/1998 |
| JP | 10-298539 | 11/1998 |
| JP | 11-256116 | 9/1999 |
| JP | 11-349910 | 12/1999 |
| JP | 2000-129235 | 5/2000 |
| JP | 2001-209039 | 8/2001 |
| JP | 2001-318230 | 11/2001 |
| JP | 2002-022960 | 1/2002 |
| JP | 2002-544364 | 12/2002 |
| JP | 2003-511505 | 3/2003 |
| JP | 2003-195044 | 7/2003 |
| JP | 2003-202722 | 7/2003 |
| JP | 2003-268334 | 9/2003 |
| JP | 2003-342483 | 12/2003 |
| JP | 2004-517185 | 6/2004 |
| JP | 2004-217931 | 8/2004 |
| JP | 2004-287199 | 10/2004 |
| JP | 2004-536940 | 12/2004 |
| JP | 2005-15524 | 1/2005 |
| JP | 2005-105228 | 4/2005 |
| JP | 2005-206776 | 8/2005 |
| JP | 1 582 573 | 10/2005 |
| WO | WO 97/08260 | 3/1997 |
| WO | WO 98/36005 | 8/1998 |
| WO | WO 00/24839 | 5/2000 |
| WO | WO 00/69985 | 11/2000 |
| WO | WO 01/25326 | 4/2001 |
| WO | WO 02/13980 | 2/2002 |
| WO | WO 02/053636 A1 | 7/2002 |
| WO | WO 03/011958 A1 | 2/2003 |
| WO | WO 03/068280 | 8/2003 |
| WO | WO 2003/085050 A3 | 10/2003 |
| WO | WO 03/099953 | 12/2003 |
| WO | WO 2004/005391 A1 | 1/2004 |
| WO | WO 2004/027788 | 4/2004 |
| WO | WO 2004/065523 A1 | 8/2004 |
| WO | WO 2005/061627 | 7/2005 |

OTHER PUBLICATIONS

European Search Report issued on the corresponding European Patent Application No. EP06110235.6, dated May 25, 2007.
European Search Report issued on the corresponding European Patent Application No. EP05004925, dated Oct. 24, 2005.
European Search Report issued on the related European Patent Application No. EP06111107, dated Jun. 27, 2006.
European Search Report issued on the related European Patent Application No. 05005660, dated Jun. 30, 2005.
European Search Report issued on the related European Patent Application No. 05020138, dated Nov. 28, 2005.
European Search Report issued on the related European Patent Application No. 05009331, dated Jul. 22, 2005.
European Search Report issued on the related European Patent Application No. 05004925, dated Aug. 19, 2005.
European Search Report issued on the related European Patent Application No. 05020102, dated Nov. 29, 2005.
European Search Report issued on the related European Patent Application No. 05010330, dated Sep. 19, 2005.
European Search Report issued on the related European Patent Application No. 05015766, dated Nov. 4, 2005.
European Search Report issued on the related European Patent Application No. 05016102, dated Nov. 8, 2005.
File History of the related U.S. Appl. No. 11/141,590, as of Apr. 28, 2008.
File History of the related U.S. Appl. No. 11/188,561, as of Apr. 28, 2008.
File History of the related U.S. Appl. No. 11/358,808, as of Apr. 28, 2008.
File History of the related U.S. Appl. No. 11/375,963, as of Apr. 28, 2008.
File History of the related U.S. Appl. No. 11/914,939, as of Apr. 28, 2008.
File History of the related U.S. Appl. No. 12/065,652, as of Apr. 28, 2008.
File History of the related U.S. Appl. No. 12/052,951, as of Apr. 28, 2008.
Information Supplement filed on the corresponding Japanese Patent Application No. 2005-26704, dated May 14, 2007.
International Search Report issued on the related PCT Application No. PCT/JP2006/309712, dated Jun. 20, 2006.
International Search Report issued on the related PCT Application No. PCT/JP2006/317522, dated Dec. 12, 2006.
Partial European Search Report issued on the related European Patent Application No. EP05016102, dated Nov. 8, 2005.
File History of the related U.S. Appl. No. 11/141,590, for the period of Apr. 29, 2008-Oct. 27, 2008.
File History of the related U.S. Appl. No. 11/188,561, for the period of Apr. 29, 2008-Oct. 27, 2008.
File History of the related U.S. Appl. No. 11/375,963, for the period of Apr. 29, 2008-Oct. 27, 2008.
File History of the related U.S. Appl. No. 11/914,939, for the period of Apr. 29, 2008-Oct. 27, 2008.
File History of the related U.S. Appl. No. 12/065,652, for the period of Apr. 29, 2008-Oct. 27, 2008.
File History of the related U.S. Appl. No. 12/052,951, for the period of Apr. 29, 2008-Oct. 27, 2008.
Chinese Office Action issued on the corresponding Chinese Patent Application No. 200510054498.0, dated Oct. 10, 2008.
File History of the related U.S. Appl. No. 11/375,963, for the period of Oct. 28, 2008-Dec. 2, 2008.
Japanese Office Action issued on the corresponding Japanese Patent Application No. 2005-026704, dated Aug. 4, 2009.
European Summons to Oral Proceedings issued on the corresponding European Patent Application No. EP05004925.3, dated Sep. 18, 2009.
Hans-Georg Elias: "Makromoleküle Band 1 Grundlagen Struktur-Synthese-Eigenschaften", Hüthig & Wepf Verlag, Basel Heidelberg New York, pp. 845-857 (1990).
Decision of Refusal issued on corresponding Japanese Patent Application No. 2005-026704, dated Nov. 10, 2009.
M.D. Lechner, K. Gehrke, E.H. Nordmeier: "Makromolekulare Chemie-Ein Lehrbuch für Chemiker, Physiker, Materialwissenschaftler und Verfahrenstechniker" Birkhäuser Verlag, Basel Boston Berlin, pp. 295-299 (1996).

* cited by examiner

[FIG. 1]
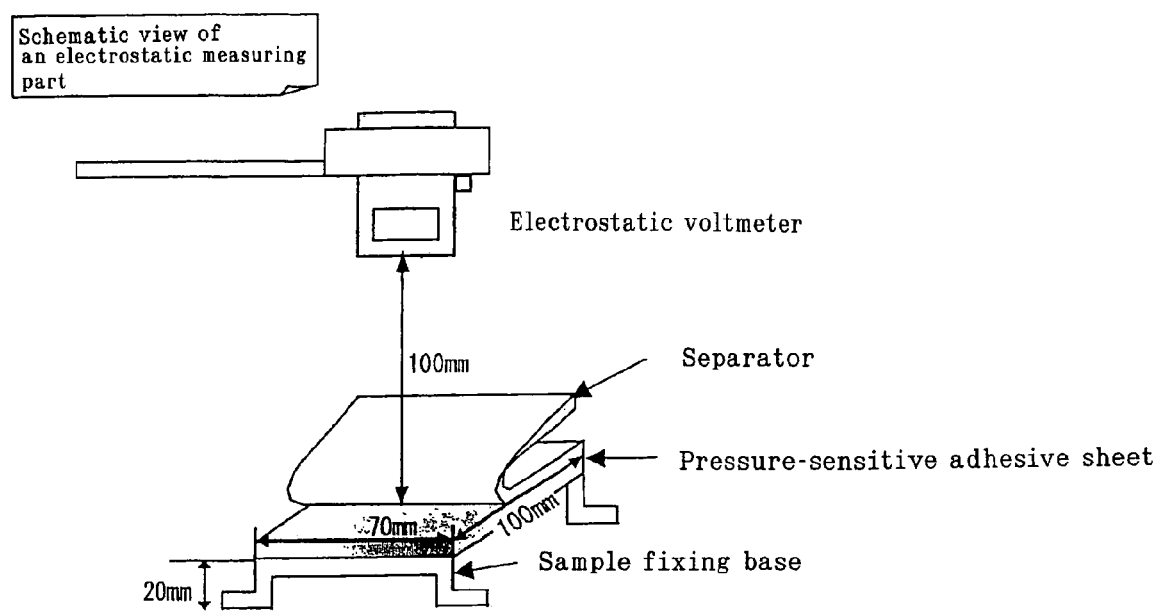

[FIG. 2]
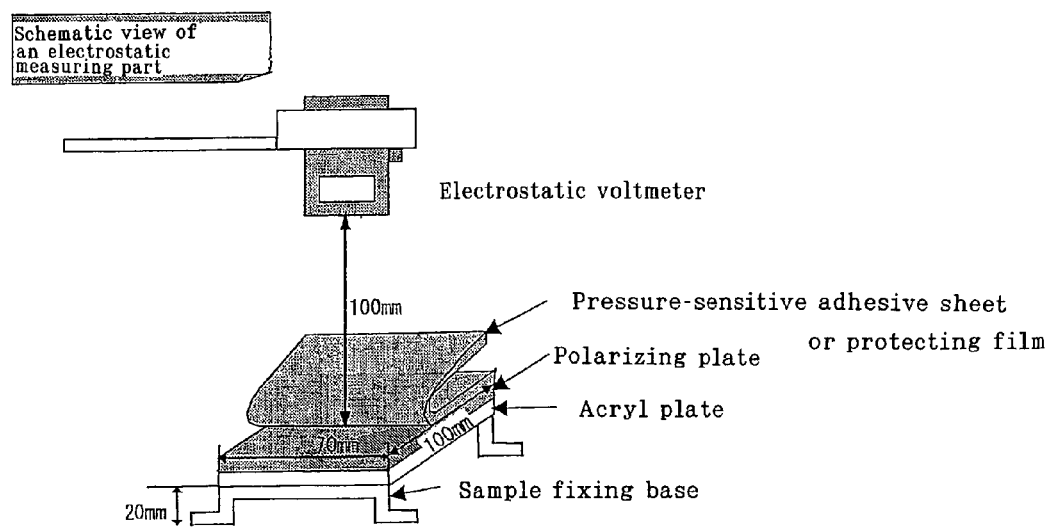

PRESSURE-SENSITIVE ADHESIVE COMPOSITION, PRESSURE-SENSITIVE ADHESIVE SHEETS AND SURFACE PROTECTING FILM

BACKGROUND OF THE INVENTION

1. Field of the Invention

The present invention relates to a pressure-sensitive adhesive composition having antistatic property, and pressure-sensitive adhesive sheets and a surface protecting film obtained by formulating into a form of a sheet or a tape using the composition.

2. Description of the Related Art

Pressure-sensitive sheets comprising an antistatic pressure-sensitive adhesive composition of the present invention is suitably used in plastic products on which static electricity is easily generated. Inter alia, particularly, the sheets are useful as antistatic pressure-sensitive adhesive sheets used in utilities disliking static electricity such as an electronic instrument, as well as a surface protecting film used for the purpose of protecting a surface of an optical member such as polarizing plate, a wavelength plate, an optical compensating film, and a reflecting sheet.

Also, the present invention relates to a pressure-sensitive adhesive-type optical member in which an antistatic pressure-sensitive adhesive layer is disposed on an optical member. The present invention is suitably used in a pressure-sensitive adhesive-type optical member using a plastic material on which static electricity is easily generated. Inter alia, particularly, the present invention is useful as a pressure-sensitive adhesive-type optical member used in a liquid crystal display and a touch panel.

3. Background of Technique

A pressure-sensitive adhesive tape can be adhered by applying a slight pressure at a normal temperature for a short time, and is used in various utilities for connecting various articles. In addition, since a pressure-sensitive adhesive tape has an aggregating force and elasticity, the tape is suitably adhered and, conversely, can be peeled from a hard smooth surface, and is also utilized as a surface protecting film.

A surface protecting film is generally used for the purpose of preventing a flaw or a stain produced at procession or conveyance of a subject to be protected by applying to a subject to be protected via a pressure-sensitive adhesive layer coated on a protecting film side. For example, for the purpose of preventing a flaw or a stain, a protecting film is applied to an optical member such as a polarizing plate and a wavelength plate used in a panel of a liquid crystal display via a pressure-sensitive adhesive layer.

In addition, a liquid crystal display and a touch panel are used by laminating various optical films such as a polarizing plate and a wavelength plate via a pressure-sensitive adhesive layer for controlling or adjusting a vibration direction or a phase difference of light.

In these optical films, products are distributed in a form in which a separator is applied for the purpose of protecting a pressure-sensitive adhesive surface for preventing a flaw or a stain, or a surface protecting film is applied for the purpose of preventing a flaw or a stain produced at a procession or conveyance process. In addition, in a step of applying an optical film, since a separator and a surface protecting film used for the purpose of protecting these optical films become unnecessary, they are peeled and removed from an optical film.

Since the aforementioned optical film, pressure-sensitive adhesive, separator and surface protecting film are constructed of a plastic material, they have high electrical insulating property and generate static electricity upon friction or peeling. Therefore, also when a separated is peeled from a surface protecting film, static electricity is generated. In addition, static electricity is a great problem in a step of manufacturing a liquid crystal display or a touch panel. Due to this static electricity, there arises a problem that a dust is attached to a surface protecting film or an optical member, and this pollutes an optical member. A disadvantage such as occurrence of electrostatic breakage at a surrounding circuit element occurs, producing abnormal display due to disturbance of a liquid crystal orientation. Then, in order to prevent such the disadvantage, a surface protecting film is subjected to various antistatic treatments.

Previously, as an attempt to suppress the aforementioned electrification of static electricity, for example, a method of preventing electrification by adding a low-molecular surfactant to a pressure-sensitive adhesive, and transferring a surfactant from a pressure-sensitive adhesive to an adherend has been disclosed (for example, see Patent Publication 1). However, the low-molecular surfactant is easily bled on a surface of a pressure-sensitive adhesive agent and, when applied to a protecting film, staining of an adherend is feared. Therefore, when a pressure-sensitive adhesive with a low-molecular surfactant added thereto is applied to a protecting film for an optical member, there is a problem that optical property of an optical member is deteriorated.

In addition, a method of adding an antistatic agent comprising polyether polyol and alkali metal salt to an acryl pressure-sensitive adhesive to suppress an antistatic agent from bleeding on a surface of a pressure-sensitive adhesive has been disclosed (for example, see Patent Publication 2). However, also in this method, bleeding of an antistatic agent is not avoided, and it has been found out that, when applied to a surface protecting film, staining of an adherend occurs with time or under a high temperature.

In addition, a surface protecting film in which an antistatic layer is disposed on one side of a plastic film has been disclosed (for example, see Patent Publication 3). However, in this surface protecting film, since electrification preventing treatment is performed on a support side, electrification prevention of a surface protecting film side can be performed, but electrification prevention of a subject to be protected can not be performed, and there is a problem that, when a surface protecting film is peeled from a subject to be protected, a subject to be protected is electrified.

For example, a method of performing electrification preventing treatment by forming an electrically conductive layer of indium oxide-tin oxide on a polarizing plate by sputtering has been disclosed (for example, see Patent Publication 4). In addition, a method of forming an electrification preventing layer comprising a ultraviolet-ray curing-type acryl resin blended with a metal oxide particle on a polarizing plate has been disclosed (for example, see Patent Publication 4).

However, in these procedures, a step for forming an electrification preventing layer on an optical member becomes necessary newly, productivity is reduced due to increase in a step, and a cost is increased. Therefore, a polarizing plate on which an electrification preventing layer is provided has a problem of a higher cost as compared with the previous polarizing plate which is not electrification prevention-treated.

On the other hand, a polarizing member on which a light diffusion layer having electrification preventing ability is formed by adding an antistatic agent to a light diffusion layer is known (for example, see Patent Publication 6), but this light diffusion layer is used for diffusing light from back light, and is not generally used in an optical member.

[Patent Publication 1] JP-A No. 9-165460
[Patent Publication 2] JP-A No. 6-128539
[Patent Publication 3] JP-A No. 11-256116
[Patent Publication 4] JP-A No. 6-51121
[Patent Publication 5] JP-A No. 2001-318230
[Patent Publication 6] JP-A No. 2002-22960

SUMMARY OF THE INVENTION

In light of such the circumstances, an object of the present invention is to provide a pressure-sensitive adhesive composition which can prevent electrification of a pressure-sensitive adhesive sheet upon peeling, and can reduce staining property to an adherend, and an electrification preventing pressure-sensitive adhesive sheet and surface protecting film using this.

In addition, an object of the present invention is to provide a pressure-sensitive adhesive composition which can prevent electrification of an adherend upon peeling, and can reduce staining of an adherend, and antistatic pressure-sensitive adhesive sheets and surface protecting film using this.

Further, an object of the present invention is to provide a pressure-sensitive adhesive-type optical member in which prevention of electrification of an optical member caused upon peeling of a separator or a surface protecting film can be performed simply and at a low cost by imparting antistatic ability to a pressure-sensitive adhesive layer having high general utility, and a pressure-sensitive adhesive force of a pressure-sensitive adhesive layer can be sufficiently maintained.

SUMMARY OF THE INVENTION

In order to solve the aforementioned problems, the present inventors intensively studied and, as a result, found out that the aforementioned object can be attained by a pressure-sensitive adhesive composition shown below, which resulted in completion of the present invention.

That is, a pressure-sensitive adhesive composition of the present invention is characterized in that it contains an ionic liquid, and a polymer having a glass transition temperature Tg of 0° C. or lower as a base polymer.

The ionic liquid in the present invention refers to a melt salt (ionic compound) exhibiting the liquid state at room temperature (25° C.).

According to the present invention, by action of the aforementioned ionic liquid as an antistatic agent and use of this, a pressure-sensitive adhesive composition in which bleeding of an antistatic agent is suppressed, and staining to an adherend with time or even under a high temperature is low, is obtained. Although the details of the reason why bleeding is suppressed by using an ionic liquid are not clear, the following is presumed.

It is thought that electrification prevention by a surfactant having a long chain alkyl group is manifested by bleeding of a surfactant on a surface and formation of a charge leaking layer accompanying with a moisture in the air. On the other hand, since an ionic liquid is in the liquid state, molecular motion is easier as compared with a surfactant, and rearrangement of a molecule easily occurs due to generation of a charge. Therefore, it is thought that, in the case of an ionic liquid, since charge neutralizing mechanism due to molecular rearrangement works, excellent antistatic effect is obtained as compared with a surfactant without bleeding on a surface. In addition, since an ionic liquid is preferably in the liquid state at room temperature, addition to and dispersion or dissolution in a pressure-sensitive adhesive is easily performed as compared with a solid salt. Further, since an ionic liquid has no vapor pressure (non-volatile), it is not vanished with time, and has characteristic that antistatic property is continuously obtained.

In the foregoing, it is preferable that the ionic liquid is one or more kinds of a nitrogen-containing onium salt, a sulfur-containing onium salt, and a phosphorus-containing onium salt. In particular, it is preferable that the ionic liquid contains one or more kinds of cations represented by the following general formulas (A) to (D). By an ionic liquids having these cations, further excellent antistatic ability is obtained.

[Chemical formula 1]

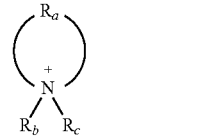

(A)

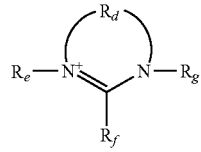

(B)

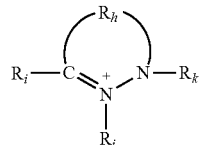

(C)

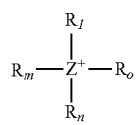

(D)

[in the formula (A), $R_a$ represents a hydrocarbon group of a carbon number of 4 to 20, and may contain a hetero atom, and $R_b$ and $R_c$ are the same or different, represent hydrogen or a hydrocarbon group of a carbon number of 1 to 16, and may contain a hetero atom, provided that, when a nitrogen atom contains a double bond, $R_c$ is not present][in the formula (B), $R_d$ represents a hydrocarbon group of a carbon number of 2 to 20, and may contain a hetero atom, and $R_e$, $R_f$ and $R_g$ are the same or different, represent hydrogen or a hydrocarbon group of a carbon number of 1 to 16, and may contain a hetero atom][in the formula (C), $R_h$ represents a hydrocarbon group of a carbon number of 2 to 20, and may contain a hetero atom, and $R_i$, $R_j$ and $R_k$ are the same or different, represent a hydrogen or a hydrocarbon group of a carbon number of 1 to 16, and may contain a hetero atom][in the formula (D), Z represents a nitrogen atom, a sulfur atom, or a phosphorus atom, and $R_l$, $R_m$, $R_n$ and $R_o$ are the same or different, represent a hydrocarbon group of a carbon number of 1 to 20, and may contain a hetero atom, provided that, when Z is a sulfur atom, $R_o$ is not present].

In addition, it is preferable that a toluene-soluble ionic liquid is used as an ionic liquid in the present invention. By using a pressure-sensitive adhesive composition containing such the toluene-soluble ionic liquid, a pressure-sensitive adhesive layer obtained by crosslinking this has reduced staining on a subject to be protected, and has excellent antistatic property and adhering property upon peeling.

Why antistatic property is improved by using the toluene-soluble ionic liquid is not clear, but it is presumed that a difference in polarity of an ionic liquid suitably contributes to antistatic property.

More specifically, since an ionic liquid has generally high polarity, wettability to a non-polar material such as silicone or fluorine is inferior, while since a toluene-soluble ionic liquid which is a non-polar solvent has low polarity among ionic liquids, wettability to a non-polar material such as silicone and fluorine is improved, and excellent antistatic ability is obtained also for a non-polar adherend.

"Toluene-soluble" in the present invention means that an ionic liquid is soluble in toluene, more specifically, refers to such nature that an ionic liquid is uniformly dissolved in toluene upon preparation of a 10 weight % solution of an ionic-liquid in toluene.

Further, in the present invention, it is preferable that the ionic liquid contains a $CF_3SO_3$— anion. By using an ionic liquid containing a $CF_3SO_3$— anion, an ionic liquid having improved solubility in toluene (toluene-soluble) is easily obtained.

In addition, it is preferable that an alicyclic ionic liquid is used as the ionic liquid in the present invention. By using such the alicyclic ionic liquid, more excellent antistatic property is obtained.

The alicyclic ionic liquid in the present invention refers to an ionic liquid containing an alicyclic structure in a molecular structure and, specifically, an ionic liquid containing an alicyclic organic cation component represented by the following formula (E) is used.

[Chemical formula 2]

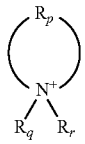

(E)

[in the formula (E), $R_p$ represents a hydrocarbon group of a carbon number of 4 to 20, and may contain a hetero atom, and $R_q$ and $R_r$ are the same or different, represent hydrogen or a hydrocarbon group of a carbon number of 1 to 10, and may contain a hetero atom].

In the foregoing, it is preferable that the ionic liquid contains any of a pyrrolidinium cation and/or a piperidinium cation. By an ionic liquid having these cations, further preferable antistatic ability is obtained.

In addition, it is preferable that the polymer having a glass transition temperature (Tg) of 0° C. or lower is a (meth)acryl-based polymer containing, as a main component, one or more kinds of acrylate and/or methacrylate having an alkyl group of a carbon number of 1 to 14. By these (meth)acryl-based polymers, balance of compatibility with an ionic liquid becomes better, and adhering property can be sufficiently maintained.

The (meth)acryl-based polymer in the present invention refers to an acryl-based polymer and/or a methacryl-based polymer.

Further, it is preferable that an acid value of the (meth) acryl-based polymer is 1.0 or lower. By these (meth)acryl-based polymers, an acid functional group having great interaction with an ionic liquid is not substantially possessed, and antistatic function can be suitably manifested without inhibiting the aforementioned charge neutralizing mechanism by molecular rearrangement. In addition, since a (meth)acryl-based polymer having an alkyl group of a specified carbon number is used, compatibility with an ionic liquid is better, and balance of adhering property becomes excellent, electrification prevention of an adherend can be performed upon peeling, and staining on an adherend can be reduced.

An acid value in the present invention means a mg number of potassium hydroxide necessary for neutralizing free fatty acid or resin acid contained in 1 g of a sample and, specifically, is a value measured by the method described in Example.

On the other hand, pressure-sensitive adhesive sheets of the present invention are characterized in that they have a pressure-sensitive adhesive layer containing the pressure-sensitive adhesive composition described above on one side or both sides of a support. According to pressure-sensitive adhesive sheets of the present invention, since the pressure-sensitive adhesive composition of the present invention exerting the aforementioned action and effect is used, prevention of electrification of sheets can be performed upon peeling, and pressure-sensitive adhesive sheets which can reduce staining on an adherend can be obtained.

When a (meth)acryl-based polymer having an acid value of 1.0 or lower is used as a base polymer, since the pressure-sensitive adhesive composition of the present invention exerting the aforementioned action and effect is used, electrification of an adherend can be prevented upon peeling, and pressure-sensitive adhesive sheets which can reduce staining on an adherend can be obtained.

It is preferable that the support is provided with an antistatic-treated-plastic film. By subjecting the plastic film to electrification preventing treatment, more excellent antistatic property is obtained. In addition, when a (meth)acryl-based polymer having an acid value of 1.0 or lower is used as a base polymer, a peeling electrification voltage to adherend can be within ±0.5 kv.

On the other hand, the surface protecting film of the present invention is characterized in that the film has a pressure-sensitive adhesive layer containing the pressure-sensitive adhesive composition described above on one side or both sides of a support. According to the surface protecting film of the present invention, since the pressure-sensitive adhesive composition of the present invention exerting the aforementioned action and effect is used, electrification of a surface protecting film can be prevented upon peeling, and a surface protecting film which can reduce staining property on an adherend can be obtained.

Further, when the pressure-sensitive adhesive composition of the present invention is applied to a surface protecting film, it is preferable that a plastic substrate used in a protecting film is antistatic-treated. According to the surface protecting film of the present invention, since the film is provided with a pressure-sensitive adhesive layer obtained by crosslinking a pressure-sensitive adhesive composition exerting such the action and effect, electrification on an adherend which has not electrification-prevented can be prevented upon peeling, and pressure-sensitive adhesive sheets excellent in adhesion reliance which are reduced in staining on an adherend can be obtained. For this reason, in particular, those sheets are very useful as an antistatic surface protecting film in the technical field associated with an electron instrument in which electrification of static electricity and staining are a particularly serious problem.

In addition, according to the pressure-sensitive adhesive-type optical member of the present invention, by imparting antistatic function to a pressure-sensitive adhesive layer, electrification of an optical member can be prevented simply without provision of a new antistatic layer, and an optical member can be prepared at a low cost without decreasing productivity. By using an ionic liquid as an antistatic agent, a pressure-sensitive adhesive composition having high antistatic effect is obtained without deteriorating pressure-sensitive adhesive property.

Further, the pressure-sensitive adhesive-type optical member of the present invention is particularly effective when the optical member contains a polarizing plate, a phase difference plate, a luminance improving plate, or an anti-glaring sheet.

BRIEF DESCRIPTION OF THE DRAWING

FIG. 1 is a schematic construction view of an electrostatic measuring part used for measuring a peeling electrification voltage in Example I.

FIG. 2 is a schematic construction view of an electrostatic measuring part used for measuring a peeling electrification voltage in Example II to Example V.

BEST MODE FOR CARRYING OUT THE INVENTION

The pressure-sensitive adhesive composition of the present invention contains an ionic liquid, and a polymer having a glass transition temperature Tg of 0° C. or lower as a base polymer.

An ionic liquid in the present invention refers to a melt salt (ionic compound) exhibiting liquid-like at room temperature (25° C.).

As the ionic liquid, a nitrogen-containing onium salt, a sulfur-containing onium salt or a phosphorus-containing onium salt is preferably used. In particular, since excellent antistatic ability is obtained, an ionic liquid comprising an organic cation component represented by the following general formulas (A) to (D), and an anion component is preferably used.

[Chemical formula 3]

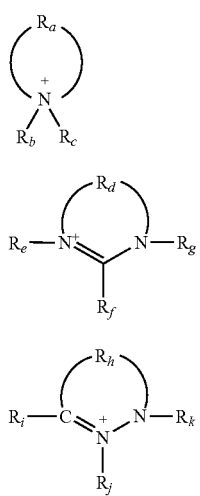

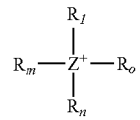

[in the formula (A), $R_a$ represents a hydrocarbon group of a carbon number of 4 to 20, and may contain a hetero atom, and $R_b$ and $R_c$ are the same or different, represent hydrogen or a hydrocarbon group of a carbon number of 1 to 16, and may contain a hetero atom, provided that, when a nitrogen atom contains a double bond, $R_c$ is not present][in the formula (B), $R_d$ represents a hydrocarbon group of a carbon number of 2 to 20, and may contain a hetero atom, and $R_e$, $R_f$ and $R_g$ are the same or different, represent hydrogen or a hydrocarbon group of a carbon number of 1 to 16, and may contain a hetero atom][in the formula (C), $R_h$ represents a hydrocarbon group of a carbon number of 2 to 20, and may contain a hetero atom, and $R_i$, $R_j$ and $R_k$ are the same or different, represent a hydrogen or a hydrocarbon group of a carbon number of 1 to 16, and may contain a hetero atom][in the formula (D), Z represents a nitrogen atom, a sulfur atom, or a phosphorus atom, and $R_l$, $R_m$, $R_n$ and $R_o$ are the same or different, represent a hydrocarbon group of a carbon number of 1 to 20, and may contain a hetero atom, provided that, when Z is a sulfur atom, $R_o$ is not present]

Examples of the cation represented by the formula (A) include a pyridinium cation, a piperidinium cation, a pyrrolidinium cation, a cation having a pyrroline skeleton, and a cation having a pyrrole skeleton.

Specific examples include 1-ethylpyridinium cation, a 1-butylpyridinium cation, 1-hexylpyridinium cation, a 1-butyl-3-methylpyridinium cation, a 1-butyl-4-methylpyridinium cation, a 1-hexyl-3-methylpyridinium cation, a 1-butyl-3,4-dimethylpyridinium cation, a 1,1-dimethylpyrrolidinium cation, a 1-ethyl-1-methylpyrrolidinium cation, a 1-methyl-1-propylpyrrolidinium cation, a 2-methyl-1-pyrroline cation, a 1-ethyl-2-phenylindole cation, a 1,2-dimethylindole cation, and a 1-ethylcarbazole cation.

Examples of the cation represented by the formula (B) include an imidazolium cation, a tetrahydropyrimidinium cation, and a dihydropyrimidinium cation.

Specific examples include a 1,3-dimethylimidazolium cation, a 1,3-diethylimidazolium cation, a 1-ethyl-3-methylimidazolium cation, a 1-butyl-3-methylmidazolium cation, a 1-hexyl-3-methylimidazolium cation, 1-ocytl-3-methylimidazolium cation, a 1-decyl-3-methylimidazolium cation, a 1-dodecyl-3-methylimidazolium cation, a 1-tetradecyl-3-methylimidazolium cation, a 1,2-dimethyl-3-propylimidazolium cation, a 1-ethyl-2,3-dimethylimidazolium cation, a 1-butyl-2,3-dimethylimidazolium cation, a 1-hexyl-2,3-dimethylimidazolium cation, a 1,3-dimethyl-1,4,5,6-tetrahydropyrimidinium cation, a 1,2,3-trimethyl-1,4,5,6-tetrahydropyrimidinium cation, a 1,2,3,4-tetramethyl-1,4,5,6-tetrahydropyrimidinium cation, a 1,2,3,5-tetramethyl-1,4,5,6-tetrahydropyrimidinium cation, a 1,3-dimethyl-1,4-dihydropyrimidinium cation, a 1,3-dimethyl-1,6-dihydropyrimidinium cation, a 1,2,3-trimethyl-1,4-dihydropyrimidinium cation, a 1,2,3-trimethyl-1,6-dihydropyrimidinium cation, a 1,2,3,4-tetramethyl-1,4-dihydropyrimidinium cation, and a 1,2,3,4-tetramethyl-1,6-dihydropyrimidinium cation.

Examples of the cation represented by the formula (C) include a pyrazolium cation, and a pyrazolinium cation.

Specific examples include a 1-methylpyrazolium cation, a 3-methylpyrazolium cation, and a 1-ethyl-2-methylpyrazolinium cation.

Examples of the cation represented by the formula (D) include a tetraalkylammonium cation, a trialkylsulfonium cation, a tetraalkylphosphonium cation, and those cations in which a part of the alkyl group is substituted with an alkenyl group, an alkoxyl group, or an epoxy group.

Specific examples include a tetramethylammonium cation, a tetraethylammonium cation, a tetrapropylammonium cation, a tetrabutylammonium cation, a tetrapentylammonium cation, a tetrahexylammonium cation, a tetraheptylammonium cation, a triethylmethylammonium cation, a tributylethylammonium cation, a trimethyldecylammonium cation, a trioctylmethylammonium cation, a tripentylbutylammonium cation, a trihexylmethylammonium cation, a trihexylpentylammonium cation, a triheptylmethylammonium cation, a tripentylbutylammonium cation, a triheptylhexylammonium cation, a dimethyldihexylammonium cation, a dipropyldihexylammonium cation, a heptyldimethylhexylammonium cation, a N,N-diethyl-N-methyl-N-(2-methoxyethyl)ammonium cation, a glycidiyltrimethylammonium cation, a diallyldimethylammonium cation, a N,N-dimethyl-N,N-dipropylammonium cation, a N,N-dimethyl-N,N-dihexylammonium cation, a N,N-dipropyl-N,N-dihexylammonium cation, a N,N-dimethyl-N-ethyl-N-propylammonium cation, a N,N-dimethyl-N-ethyl-N-butylammonium cation, a N,N-dimethyl-N-ethyl-N-pentylammonium cation, a N,N-dimethyl-N-ethyl-N-hexylammonium cation, a N,N-dimethyl-N-ethyl-N-heptylammonium cation, a N,N-dimethyl-N-ethyl-N-nonylammonium cation, a N,N-dimethyl-N-propyl-N-butylammonium cation, a N,N-dimethyl-N-propyl-N-pentylammonium cation, a N,N-dimethyl-N-propyl-N-hexylammonium cation, a N,N-dimethyl-N-propyl-N-heptylammonium cation, a N,N-dimethyl-N-butyl-N-hexylammonium cation, a N,N-dimethyl-N-butyl-N-heptylammonium cation, a N,N-dimethyl-N-pentyl-N-hexylammonium cation, a trimethylheptylammonium cation, a N,N-diethyl-N-methyl-N-propylammonium cation, a N,N-diethyl-N-methyl-N-pentylammonium cation, a N,N-diethyl-N-methyl-N-heptylammonium cation, a N,N-diethyl-N-propyl-N-pentylammonium cation, a triethylmethylammonium cation, a triethylpropylammonium cation, a triethylpentylammonium cation, a triethylheptylammonium cation, a N,N-dipropyl-N-methyl-N-ethylammonium cation, a N,N-dipropyl-N-methyl-N-pentylammonium cation, a N,N-dipropyl-N-butyl-N-hexylammonium cation, a N,N-dibutyl-N-metyl-N-pentylammonium cation, a N,N-dibutyl-N-methyl-N-hexylammonium cation, a trioctylmethylammonium cation, a N-methyl-N-ethyl-N-propyl-N-pentylammonium cation, a trimethylsulfonium cation, a triethylsulfonium cation, a tributylsulfonium cation, a trihexylsulfonium cation, a diethylmethylsulfonium cation, a dibutylethylsulfonium cation, a dimethyldecylsulfonium cation, a tetramethylphosphonium cation, a tetraethylphosphonium cation, a tetrabutylphosphonium cation, a tetrapentylphosphonium cation, a tetrahexylphosphonium cation, a tetraheptylphosphonium cation, a tetraoctylphosphonium cation, a triethylmethylphosphonium cation, a tributylethylphosphonium cation, and a trimethyldecylphosphonium cation.

Inter alia, a tetraalkylammonium cation such as a tetramethylammonium cation, a tetraethylammonium cation, a tetrapropylammonium cation, a tetrabutylammonium cation, a tetrapentylammonium cation, a tetrahexylammonium cation, a tetraheptylammonium cation, a triethylmethylammonium cation, a tributylethylammonium cation, a trimethyldecylammonium cation, a trioctylmethylammonium cation, a tripentylbutylammonium cation, a trihexylmethylammonium cation, a trihexylpentylammonium cation, a triheptylmethylammonium cation, a tripentylbutylammonium cation, a triheptylhexylammonium cation, a dimethyldihexylammonium cation, a dipropyldihexylammonium cation, a heptyldimethylhexylammonium cation, a N, N-diethyl-N-methyl-N-(2-methoxyethyl)ammonium cation, a glycidiyltrimethylammonium cation, a N,N-dimethyl-N-ethyl-N-propylammonium cation, a N,N-dimethyl-N-ethyl-N-butylammonium cation, a N, N-dimethyl-N-ethyl-N-pentylammonium cation, a N,N-dimethyl-N-ethyl-N-hexylammonium cation, a N,N-dimethyl-N-ethyl-N-heptylammonium cation, a N,N-dimethyl-N-ethyl-N-nonylammonium cation, a N,N-dimethyl-N-propyl-N-butylammonium cation, a N,N-dimethyl-N-propyl-N-pentylammonium cation, a N,N-dimethyl-N-propyl-N-hexylammonium cation, a N,N-dimethyl-N-propyl-N-heptylammonium cation, a N,N-dimethyl-N-butyl-N-hexylammonium cation, a N,N-dimethyl-N-butyl-N-heptylammonium cation, a N,N-dimethyl-N-pentyl-N-hexylammonium cation, a trimethylheptylammonium cation, a N,N-diethyl-N-methyl-N-propylammonium cation, a N,N-diethyl-N-methyl-N-pentylammonium cation, a N,N-diethyl-N-methyl-N-heptylammonium cation, a N,N-diethyl-N-propyl-N-pentylammonium cation, a triethylmethylammonium cation, a triethylpropylammonium cation, a triethylpentylammonium cation, a triethylheptylammonium cation, a N,N-dipropyl-N-methyl-N-ethylammonium cation, a N,N-dipropyl-N-methyl-N-pentylammonium cation, a N, N-dipropyl-N-butyl-N-hexylammonium cation, a N,N-dibutyl-N-methyl-N-pentylammonium cation, a N,N-dibutyl-N-methyl-N-hexylammonium cation, a trioctylmethylammonium cation, a N, methyl-N-ethyl-N-propyl-N-pentylammonium cation, a diallyldimethylammonium cation, a trialkylsulfonium cation such as a trimethylsulfonium cation, a triethylsulfonium cation, a tributylsulfonium cation, a trihexylsulfonium cation, a diethylmethylsulfonium cation, a dibutylethylsulfonium cation, and a dimethyldecylsulfonium cation, a tetraalkylphosphonium cation such as a tetramethylphosphonium cation, a tetraethylphosphonium cation, a tetrabutylphosphonium cation, a tetrapentylphosphonium cation, a tetrahexylphosphonium cation, a tetraheptylphosphonium cation, a tetraoctylphosphonium cation, a triethylmethylphosphonium cation, a tributylethylphosphonium cation, a tributylethylphosphonium cation, and a trimethyldecylphosphonium cation are preferably used.

On the other hand, the anionic component is not particularly limited as far as it satisfies that it becomes an ionic liquid. Specifically, for example, Cl—, Br—, I—, $AlCl_4$—, $Al_2Cl_7$—, $BF_4$—, $PF_6$—, $ClO_4$—, $NO_3$—, $CH_3COO$—, $CF_3COO$—, $CH_3SO_3$—, $CF_3SO_3$—, $(CF_3SO_2)_2N$—, $(CF_3SO_2)_3C$—, $AsF_6$—, $SbF_6$—, $NbF_6$—, $TaF_6$—, $F(HF)_n$—, $(CN)_2N$—, $C_4F_9SO_3$—, $(C_2F_5SO_2)_2N$—, $C_3F_7COO$—, and $(CF_3SO_2)(CF_3CO)N$— are used. Among them, in particular, an anionic component containing a fluorine atom is preferably used because a low melting point ionic compound is obtained. In addition, a $CF_3SO_3$— anion is preferably used because an ionic liquid-having-improved-solubility in toluene (toluene-soluble) is easily obtained.

An embodiment of an ionic liquid used in the present invention is used by appropriately selecting from a combination of the aforementioned cation component and anion component.

Examples include 1-butylpyridinium tetrafluoroborate, 1-butylpyridinium hexafluorophosphate, 1-butyl-3-methylpyridinium tetrafluoroborate, 1-butyl-3-methylpyridinium trifluoromethanesulfonate, 1-butyl-3-methylpyridinium bis(trifluoromethaneslufonyl)imide, 1-butyl-3-methylpyridinium bis(pentafluoroethanesulfonyl)imide, 1-hexylpyridinium tetrafluoroborate, 2-methyl-1-pyrroline tetrafluoroborate, 1-ethyl-2-phenylindole tetrafluoroborate, 1,2-dimethylindole tetrafluoroborate, 1-ethylcarbazole tetrafluoroborate, 1-ethyl-3-methylimidazolium tetrafluoroborate, 1-ethyl-3-methylimidazolium acetate, 1-ethyl-3-methylimidazolium trifluoroacetate, 1-ethyl-3-methylimidazolium heptafluorobutyrate, 1-ethyl-3-methylimidazolium trifluoromethanesulfonate, 1-ethyl-3-methylimidazolium perfluorobutanesulfonate, 1-ethyl-3-methylimidazolium dicyanamide, 1-ethyl-3-methylimidazolium bis(trifluoromethanesulfonyl)imide, 1-ethyl-3-methylimidazolium bis(pentafluoroethanesulfonylimide), 1-ethyl-3-methylimidazolium tris(trifluoromethanesulfonyl)imide, 1-butyl-3-methylimidazolium tetrafluoroborate, 1-butyl-3-methylimidazolium hexafluorophosphate, 1-butyl-3-methylimidazolium trifluoroacetate, 1-butyl-3-methylimidazolium heptafluorobutyrate, 1-butyl-3-methylimidazolium trifluoromethanesulfonate, 1-butyl-3-methylimidazolium pentafluorobutanesulfonate, 1-butyl-3-methylimidazolium bis(trifluoromethanesulfonyl)imide, 1-hexyl-3-methylimidazolium bromide, 1-hexyl-3-methylimidazolium chloride, 1-hexyl-3-methylimidazolium tetrafluoroborate, 1-hexyl-3-methylimidazolium hexafluorophosphate, 1-hexyl-3-methylimidazolium trifluoromethanesulfonate, 1-octyl-3-methylimidazolium tetrafluoroborate, 1-octyl-3-methylimidazolium hexafluorophosphate, 1-hexyl-2,3-dimethylimidazolium tetrafluoroborate, 1,2-dimethyl-3-propylimidazolium bis(trifluoromethanesulfonyl)imide, 1-methylpyrazolium tetrafluoroborate, 3-methylpyrazolium tetrafluoroborate, tetrahexylammonium bis(trifluoromethanesulfonyl)imide, N, N-diethyl-N-methyl-N-(2-methoxyethyl)ammonium tetrafluoroborate, N,N-diethyl-N-methyl-N-(2-methoxyethyl)ammonium bis (trifluoromethanesulfonyl)imide, diallyldimethylammonium tetrafluoroborate, diallyldimethylammonium trifluoromethanesulfonate, diallyldimethylammonium bis(trifluoromethanesulfonyl)imide, diallyldimethylammonium bis (pentafluoroethanesulfonyl)imide, glycidyltrimethylammonium trifluoromethanesulfonate, glycidyltrimethylammonium bis(trifluoromethanesulfonyl)imide, glycidyltrimethylammonium bis(pentafluoroethanesulfonyl)imide, 1-butylpyridinium (trifluoromethanesulfonyl)trifluoroacetamide, 1-butyl-3-methylpyridinium (trifluoromethanesulfonyl)trifluoroacetamide, 1-ethyl-3-methylimidazolium (trifluoromethanesulfonyl)trifluoroacetamide, diallyldimethylammonium (trifluoromethanesulfonyl)trifluoroacetamide, glycidyltrimethylammonium (trifluoromethanesulfonyl)trifluoroacetamide, N, N-dimethyl-N-ethyl-N-propylammonium bis(trifluoromethanesulfonyl)imide, N, N-dimethyl-N-ethyl-N-butylammonium bis(trifluoromethanesulfonyl)imide, N, N-dimethyl-N-ethyl-N-pentylammonium bis(trifluoromethanesulfonyl)imide, N, N-dimethyl-N-ethyl-N-hexylammonium bis(trifluoromethanesulfonyl)imide, N, N-dimethyl-N-ethyl-N-heptylammonium bis (trifluoromethanesulfonyl)imide, N, N-dimethyl-N-ethyl-N-nonylammonium bis(trifluoromethanesulfonyl)imide, N,N-dimethyl-N, N-dipropylammonium bis (trifluoromethanesulfonyl)imide, N, N-dimethyl-N-propyl-N-butylammonium bis(trifluoromethanesulfonyl)imide, N, N-dimethyl-N-propyl-N-pentylammonium bis(trifluoromethanesulfonyl)imide, N, N-dimethyl-N-propyl-N-hexylammonium bis(trifluoromethanesulfonyl)imide, N, N-dimethyl-N-propyl-N-heptylammonium bis (trifluoromethanesulfonyl)imide, N, N-dimethyl-N-butyl-N-hexylammonium bis(trifluoromethanesulfonyl)imide, N, N-dimethyl-N-butyl-N-heptylammonium bis(trifluoromethanesulfonyl)imide, N, N-dimethyl-N-pentyl-N-hexylammonium bis(trifluoromethanesulfonyl)imide, N,N-dimethyl-N, N-dihexylammonium bis (trifluoromethanesulfonyl)imide, trimethylheptylammonium bis(trifluoromethanesulfonyl)imide, N, N-diethyl-N-methyl-N-propylammonium bis(trifluoromethanesulfonyl)imide, N, N-diethyl-N-methyl-N-pentylammonium bis(trifluoromethanesulfonyl)imide, N, N-diethyl-N-methyl-N-heptylammonium bis(trifluoromethanesulfonyl)imide, N, N-diethyl-N-propyl-N-pentylammonium bis (trifluoromethanesulfonyl)imide, triethylpropylammonium bis(trifluoromethanesulfonyl)imide, triethylpentylammonium bis(trifluoromethanesulfonyl)imide, triethylheptylammonium bis(trifluoromethanesulfonyl)imide, N, N-dipropyl-N-methyl-N-ethylammonium bis(trifluoromethanesulfonyl)imide, N, N-dipropyl-N-methyl-N-pentylammonium bis (trifluoromethanesulfonyl)imide, N, N-dipropyl-N-butyl-N-hexylammonium bis(trifluoromethanesulfonyl)imide, N,N-dipropyl-N, N-dihexylammonium bis (trifluoromethanesulfonyl)imide, N, N-dibutyl-N-methyl-N-pentylammonium bis(trifluoromethanesulfonyl)imide, N, N-dibutyl-N-methyl-N-hexylammonium bis(trifluoromethanesulfonyl)imide, trioctylmethylammonium bis(trifluoromethanesulfonyl)imide, and N-methyl-N-ethyl-N-propyl-N-pentylammonium bis(trifluoromethanesulfonyl) imide.

In the present invention, it is preferable to use a toluene-soluble ionic liquid. The toluene-soluble ionic liquid can be obtained by appropriately combining the aforementioned cationic component and anionic component. Inter alia, particularly, an anionic component containing a fluorine atom is preferably used because a low melting point ionic compound is obtained. These cationic component and anionic component may be used alone, or may be used by mixing two or more kinds, respectively.

Examples of the toluene-soluble ionic liquid include tetrapentylammonium trifluoromethanesulfonate, tetrahexylammonium trifluorosulfonate, and tetraheptylammonium trifluoromethanesulfonate.

In the present invention, it is preferable to use an alicyclic ionic liquid. As the alicyclic ionic liquid in the present invention, an ionic liquid containing an alicyclic organic cationic component represented by the following general formula (E) is used.

[Chemical formula 4]

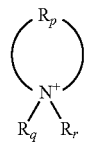

(E)

[in the formula (E), $R_p$ represents a hydrocarbon group of a carbon number of 4 to 20, and may contain a hetero atom, and $R_q$ and $R_r$ are the same or different, represent hydrogen or a hydrocarbon group of a carbon number of 1 to 10, and may contain a hetero atom].

Among the alicyclic organic cation component represented by the formula (E), a pyrrolidinium cation and a piperidinium cation are preferably used.

Examples include a 1,1-dimethylpyrrolidinium cation, a 1-methyl-1-ethylpyrrolidinium cation, a 1-methyl-1-propylpyrrolidinium cation, a 1-methyl-1-butylpyrrolidinium cation, a 1-methyl-1-pentylpyrrolidinium cation, a 1-methyl-1-hexylpyrrolidinium cation, a 1-methyl-1-heptylpyrrolidinium cation, a 1-ethyl-1-propylpyrrolidinium cation, a 1-ethyl-1-butylpyrrolidinium cation, a 1-ethyl-1-pentylpyrrolidinium cation, a 1-ethyl-1-hexylpyrrolidinium cation, a 1-ethyl-1-heptylpyrrolidinium cation, a 1,1-dipropylpyrrolidinium cation, a 1-propyl-1-butylpyrrolidinium cation, a 1,1-dibutylpyrrolidinium cation, a 1-propylpiperidinium cation, a 1-pentylpiperidinium cation, a 1,1-dimethylpiperidinium cation, a 1-methyl-1-ethylpiperidinium cation, a 1-methyl-1-propylpiperidinium cation, a 1-methyl-1-butylpiperidinium cation, a 1-methyl-1-pentylpiperidinium cation, a 1-methyl-1-hexylpiperidinium cation, a 1-methyl-1-heptylpiperidinium cation, a 1-ethyl-1-propylpiperidinium cation, a 1-ethyl-1-butylpiperidinium cation, a 1-ethyl-1-pentylpiperidinium cation, a 1-ethyl-1-hexylpiperidinium cation, a 1-ethyl-1-heptylpiperidinium cation, a 1,1-dipropylpiperidinium cation, a 1-propyl-1-butylpiperidinium cation, and a 1,1-dibutylpiperidinium cation.

In addition, the alicyclic ionic liquid can be obtained by appropriately combining the aforementioned cationic compound and the aforementioned anionic compound. Inter alia, an anionic component containing a fluorine atom is preferably used because a low melting point ionic compound is obtained, therefore, in particular, $(CF_3SO_2)_2N—$ and $(C_2F_5SO_2)_2N—$ are preferably used. These cationic compound and anionic compound may be used alone, or may be used by mixing two or more kinds, respectively.

Specific examples of the alicyclic ionic liquid used in the present invention include 1,1-dimethylpyrrolidinium bis(trifluoromethanesulfonyl)imide, 1-methyl-1-ethylpyrrolidinium bis(trifluoromethanesulfonyl)imide, 1-methyl-1-propylpyrrolidinium bis(trifluoromethanesulfonyl)imide, 1-methyl-1-butylpyrrolidinium bis(trifluoromethanesulfonyl)imide, 1-methyl-1-pentylpyrrolidinium bis(trifluoromethanesulfonyl)imide, 1-methyl-1-hexylpyrrolidinium bis(trifluoromethanesulfonyl)imide, 1-methyl-1-heptylpyrrolidinium bis(trifluoromethanesulfonyl)imide, 1-ethyl-1-propylpyrrolidinium bis(trifluoromethanesulfonyl)imide, 1-ethyl-1-butylpyrrolidinium bis(trifluoromethanesulfonyl)imide, 1-ethyl-1-pentylpyrrolidinium bis(trifluoromethanesulfonyl)imide, 1-ethyl-1-hexylpyrrolidinium bis(trifluoromethanesulfonyl)imide, 1-ethyl-1-heptylpyrrolidinium bis(trifluoromethanesulfonyl)imide, 1,1-dipropylpyrrolidinium bis(trifluoromethanesulfonyl)imide, 1-propyl-1-butylpyrrolidinium bis(trifluoromethanesulfonyl)imide, 1,1-dibutylpyrrolidinium bis(trifluoromethanesulfonyl)imide, 1-propylpiperidinium bis(trifluoromethanesulfonyl)imide, 1-pentylpiperidinium bis(trifluoromethanesulfonyl)imide, 1,1-dimethylpiperidinium bis(trifluoromethanesulfonyl)imide, 1-methyl-1-ethylpiperidinium bis(trifluoromethanesulfonyl)imide, 1-methyl-1-propylpiperidinium bis(trifluoromethanesulfonyl)imide, 1-methyl-1-butylpiperidinium bis(trifluoromethanesulfonyl)imide, 1-methyl-1-pentylpiperidinium bis(trifluoromethanesulfonyl)imide, 1-methyl-1-hexylpiperidinium bis(trifluoromethanesulfonyl)imide, 1-methyl-1-heptylpiperidinium bis(trifluoromethanesulfonyl)imide, 1-ethyl-1-propylpiperidinium bis(trifluoromethanesulfonyl)imide, 1-ethyl-1-butylpiperidinium bis(trifluoromethanesulfonyl)imide, 1-ethyl-1-pentylpiperidinium bis(trifluoromethanesulfonyl)imide, 1-ethyl-1-hexylpiperidinium bis(trifluoromethanesulfonyl)imide, 1-ethyl-1-heptylpiperidinium bis(trifluoromethanesulfonyl)imide, 1,1-dipropylpiperidinium bis(trifluoromethanesulfonyl)imide, 1-propyl-1-butylpiperidinium bis(trifluoromethanesulfonyl)imide, 1,1-dibutylpiperidinium bis(trifluoromethanesulfonyl)imide, 1,1-dimethylpyrrolidinium bis(pentafluoroethanesulfonyl)imide, 1-methyl-1-ethylpyrrolidinium bis(pentafluoroethanesulfonyl)imide, 1-methyl-1-propylpyrrolidinium bis(pentafluoroethanesulfonyl)imide, 1-methyl-1-butylpyrrolidinium bis(pentafluoroethanesulfonyl)imide, 1-methyl-1-pentylpyrrolidinium bis(pentafluoroethanesulfonyl)imide, 1-methyl-1-hexylpyrrolidinium bis(pentafluoroethanesulfonyl)imide, 1-methyl-1-heptylpyrrolidinium bis(pentafluoroethanesulfonyl)imide, 1-ethyl-1-propylpyrrolidinium bis(pentafluoroethanesulfonyl)imide, 1-ethyl-1-butylpyrrolidinium bis(pentafluoroethanesulfonyl)imide, 1-ethyl-1-pentylpyrrolidinium bis(pentafluoroethanesulfonyl)imide, 1-ethyl-1-hexylpyrrolidinium bis(pentafluoroethanesulfonyl)imide, 1-ethyl-1-heptylpyrrolidinium bis(pentafluoroethanesulfonyl)imide, 1,1-dipropylpyrrolidinium bis(pentafluoroethanesulfonyl)imide, 1-propyl-1-butylpyrrolidinium bis(pentafluoroethanesulfonyl)imide, 1,1-dibutylpyrrolidinium bis(pentafluoroethanesulfonyl)imide, 1-propylpiperidinium bis(pentafluoroethanesulfonyl)imide, 1-pentylpiperidinium bis(pentafluoroethanesulfonyl)imide, 1,1-dimethylpiperidinium bis(pentafluoroethanesulfonyl)imide, 1-methyl-1-ethylpiperidinium bis(pentafluoroethanesulfonyl)imide, 1-methyl-1-propylpiperidinium bis(pentafluoroethanesulfonyl)imide, 1-methyl-1-butylpiperidinium bis(pentafluoroethanesulfonyl)imide, 1-methyl-1-pentylpiperidinium bis(pentafluoroethanesulfonyl)imide, 1-methyl-1-hexylpiperidinium bis(pentafluoroethanesulfonyl)imide, 1-methyl-1-heptylpiperidinium bis(pentafluoroethanesulfonyl)imide, 1-ethyl-1-propylpiperidinium bis(pentafluoroethanesulfonyl)imide, 1-ethyl-1-heptylpiperidinium bis(pentafluoroethanesulfonyl)imide, 1-ethyl-1-pentylpiperidinium bis(pentafluoroethanesulfonyl)imide, 1-ethyl-1-hexylpiperidinium bis(pentafluoroethanesulfonyl)imide, 1-ethyl-1-heptylpiperidinium bis(pentafluoroethanesulfonyl)imide, 1-propyl-1-butylpiperidinium bis(pentafluoroethanesulfonyl)imide, 1,1-dipropylpiperidinium bis(pentafluoroethanesulfonyl)imide, and 1,1-dimethylpiperidinium bis(pentafluoroethanesulfonyl)imide.

As the aforementioned ionic liquid, a commercially available ionic liquid may be used, or the liquid may be synthesized as described below.

A method of synthesizing an ionic liquid is not particularly limited as far as an objective ionic liquid is obtained. Generally, a halide method, a hydroxide method, an acid ester method, a chelate forming method, and a neutralization method described in the publication "Ionic liquid—The Front and Future of Development—" (published by CMC) are used.

Regarding a halide method, a hydroxide method, an acid ester method, a chelate forming method, and a neutralization method, a synthesis method using an example of a nitrogen-containing onium salt will be shown below, but other ionic liquid such as a sulfur-containing onium salt, and a phosphorus-containing onium salt can be obtained by the similar procedure.

The halide method is a method which is performed by a reaction shown in the following formulas (1) to (3). First, a tertiary amine and alkyl halide are reacted to obtain halide (Reaction Equation (1), as a halogen, chlorine, bromine or iodine is used). The resulting halide is reacted with an acid (HA) having an anion structure (A-) of an objective ionic liquid or a salt (MA, M is a cation forming a salt with an objective anion such as ammonium, lithium, sodium and potassium) of an objective ionic liquid to obtain an objective ionic liquid ($R_4NA$).

[Chemical formula 5]

$$R_3N + RX \rightarrow R_4NX \quad (X: Cl, Br, I) \tag{1}$$

$$R_4NX + HA \rightarrow R_4NA + HX \tag{2}$$

$$R_4NX + MA \rightarrow R_4NA + MX \quad (M: NH_4, Li, Na, K, Ag \text{ etc.}) \tag{3}$$

The hydroxide method is a method performed by a reaction shown in (4) to (8). First, a halide ($R_4NX$) is subjected to ion exchange membrane method electrolysis (reaction equation (4)), an OH-type ion exchange resin method (reaction equation (5)) or a reaction with silver oxide ($Ag_2O$) (reaction equation (6)) to obtain a hydroxide ($R_4NOH$) (as a halogen, chlorine, bromine or iodine is used). The resulting hydroxide is subjected to a reaction of reaction equations (7) to (8) as in the aforementioned halide method to obtain an objective ionic liquid ($R_4NH$).

[Chemical formula 6]

$$R_4NX + H_2O \rightarrow R_4NOH + 1/2H_2 + 1/2X_2 \quad (X: Cl, Br, I) \tag{4}$$

$$R_4NX + P\text{—}OH \rightarrow R_4NOH + P\text{—}X \quad (P\text{—}OH: \text{OH-type ion exchange resin}) \tag{5}$$

$$R_4NX + 1/2Ag_2O + 1/2H_2O \rightarrow R_4NOH + AgX \tag{6}$$

$$R_4NOH + HA \rightarrow R_4NA + HX \tag{7}$$

$$R_4NOH + MA \rightarrow R_4NA + MX \quad (M: NH_4, Li, Na, K, Ag \text{ etc.}) \tag{8}$$

The acid ester method is a method performed by a reaction shown in (9) to (11). First, tertiary amine ($R_3N$) is reacted with acid ester to obtain an acid esterified substance (reaction equation (9), as acid ester, ester of an inorganic acid such as sulfuric acid, sulfurous acid, phosphoric acid, phosphorous acid, and carbonic acid, or ester of organic acid such as methanesulfonic acid, methylphosphonic acid and formic acid is used). The resulting acid esterified substance is subjected to a reaction of reaction equations (10) to (11) as in the aforementioned halide method, to obtain an objective ionic liquid ($R_4NA$). Alternatively, as acid ester, methyl trifluoromethane sulfonate, or methyl trifluoroacetate may be used to directly obtain an ionic liquid.

[Chemical formula 7]

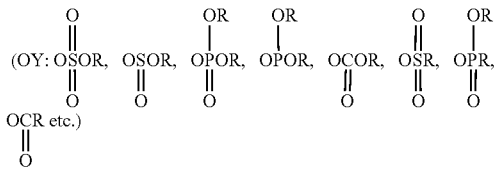

$$R_3N + ROY \rightarrow R_3NOY \tag{9}$$

$$R_4NOY + HA \rightarrow R_4NA + HOY \tag{10}$$

(in the case of OY: OCOR)

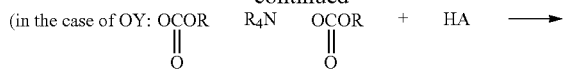

$$R_4NOY + MA \rightarrow R_4NA + MOY \tag{11}$$

(M: $NH_4$, Li, Na, K, Ag etc.)

The chelate forming method is a method performed by a reaction as shown in (12) to (15). First, halide of quaternary ammonium ($R_4NX$), hydroxide of quaternary ammonium ($R_4NOH$), or carbonic acid esterified substance of quaternary ammonium ($R_4NOCO_2CH_3$) is reacted with hydrogen fluoride (HF) or ammonium fluoride ($NH_4F$) to obtain a quaternary ammonium fluoride salt (reaction equation (12) to (14)). The resulting quaternary ammonium fluoride salt can be subjected to a chelate forming reaction with fluoride such as $BF_3$, $AlF_3$, $PF_5$, $ASF_5$, $SbF_5$, $NbF_4$ and $TaF_6$, to obtain an ionic liquid (reaction equation (15)).

[Chemical formula 8]

$$R_4NX + HF \rightarrow R_4NF + HX \quad (X: Cl, Br, I) \tag{12}$$

$$R_4NY + HF \rightarrow R_4NF + HY \quad (Y: OH, OCO_2CH_3) \tag{13}$$

$$R_4NY + NH_4F \rightarrow R_4NF + NH_3 + HY \quad (Y: OH, OCO_2CH_3) \tag{14}$$

$$R_4NF + MF_{n-1} \rightarrow R_4NMF_n \tag{15}$$

($MF_{n-1}$: $BF_3$, $AlF_3$, $PF_5$, $ASF_5$, $SbF_5$, $NbF_5$, $TaF_5$ etc.)

The neutralization method is a method performed by a reaction shown in (16). An ionic liquid can be obtained by reacting tertiary amine and an organic acid such as $HBF_4$, $HPF_6$, $CH_3COOH$, $CF_3COOH$, $CF_3SO_3H$, $(CF_3SO_2)_2NH$, $(CF_3SO_2)_3CH$, and $(C_2F_5SO_2)_2NH$.

[Chemical formula 9]

$$R_3N + HZ \rightarrow R_3HN^+Z^- \tag{16}$$

[HZ: $HBF_4$, $HPF_6$, $CH_3COOH$, $CF_3COOH$, $CF_3SO_3H$, $(CF_3SO_2)_2NH$, $(CF_3SO_2)_3CH$, $(C_2F_5SO_2)_2NH$ organic acid such as]

The aforementioned R represents hydrogen or a hydrocarbon group of a carbon number of 1 to 20, and may contain a hetero atom.

Since an amount of an ionic liquid to be blended varies depending on compatibility between a polymer and an ionic liquid to be used, the amount can not be always indiscriminately defined, but generally is preferably 0.01 to 40 parts by weight, more preferably 0.03 to 20 parts by weight, most preferably 0.05 to 10 parts by weight relative to 100 parts by weight of a base polymer. When the amount is less than 0.01 part by weight, sufficient antistatic property is not obtained and, when the amount exceeds 40 parts by weight, there is a tendency that staining on an adherend is increased, In addition, when an alicyclic ionic liquid is used, an amount of an ionic liquid to be blended is generally preferably 0.01 to 20 parts by weight, more preferably 0.03 to 10 parts by weight, most preferably 0.05 to 5 parts by weight relative to 100 parts by weight of a base polymer.

In the present invention, as a base polymer, a polymer having a glass transition temperature Tg of 0° C. or lower is used. Preferably, Tg is −100 to −5° C., and more preferably, Tg is −80 to −10° C. When a glass transition temperature Tg exceeds 0° C., it becomes difficult to obtain a sufficient adhering force even when an ionic liquid is contained.

Examples of such the polymer include polymers which are generally applied as a polymer for a pressure-sensitive adhesive, such as a (meth)acryl-based polymer containing, as a main component, one or two or more kinds of acrylate and/or methacrylate having an alkyl group of a carbon number of 1 to 14, a natural rubber, a styrene-isoprene-styrene block copolymer (SIS block copolymer), a styrene-butadiene-styrene block copolymer (SBS block copolymer), a styrene-ethylene-butylene-styrene block copolymer (SEBS block copolymer), a styrene-butadiene rubber, polybutadiene, polyisoprene, polyisobutyrene, a butyl rubber, a chloroprene rubber, and a silicone rubber.

Among them, since balance of compatibility with an ionic liquid and excellent pressure-sensitive adhesive property are obtained, a (meth)acryl-based polymer containing, as a main component, one or two or more kinds of acrylate and/or methacrylate having an alkyl group of a carbon number of 1 to 14 is preferably used.

As a (meth)acryl-based polymer containing, as a main component, one or two or more kinds of acrylate and/or methacrylate having an alkyl group of a carbon number of 1 to 14, a (meth)acryl-based polymer having a weight average molecular weight of 100 thousands or more containing, as a main component, a monomer containing 50 to 100% by weight of one or two or more kinds of acrylate and/or methacrylate {hereinafter, (meth)acrylate refers to as acrylate and/or methacrylate} having an alkyl group having a carbon number of 1 to 14 is used.

From a viewpoint of balance of pressure-sensitive adhesive performance, the (meth)acryl-based polymer has preferably a glass transition point Tg of 0° C. or lower (usually −100° C. or higher). From the same viewpoint, a carbon number of an alkyl group is preferably 6 to 14.

Examples of (meth)acrylate having an alkyl group of a carbon number of 1 to 14 include methyl(meth)acrylate, ethyl (meth)acrylate, n-butyl(meth)acrylate, s-butyl(meth)acrylate, t-butyl(meth)acrylate, isobutyl(meth)acrylate, hexyl (meth)acrylate, 2-ethylhexyl(meth)acrylate, n-octyl(meth) acrylate, isooctyl (meth)acrylate, n-nonyl(meth)acrylate, isononyl(meth)acrylate, n-decyl(meth)acrylate, isodecyl (meth)acrylate, n-dodecyl (meth)acrylate, n-tridecyl(meth) acrylate, and n-tetradecyl (meth)acrylate.

Among them, when used in the surface protecting film of the present invention, (meth)acrylate having an alkyl group of a carbon number of 6 to 14 such as hexyl(meth)acrylate, 2-ethylhexyl (meth)acrylate, n-octyl(meth)acrylate, isooctyl (meth)acrylate, n-nonyl(meth)acrylate, isononyl(meth)acrylate, n-decyl (meth)acrylate, isodecyl(meth)acrylate, n-dodecyl(meth)acrylate, n-tridecyl(meth)acrylate, and n-tetradecyl (meth)acrylate is suitably used. By using a (meth)acryl-based polymer consisting of (meth)acrylate having an alkyl group of a carbon number of 6 to 14, it becomes easy to control a pressure-sensitive adhesive force to an adherend low, and excellent re-peelability is obtained.

As other polymerizable monomer component, a cohesive strength or a heat resistance improving component such as a sulfonic acid group-containing monomer, a phosphoric acid group-containing monomer, a cyano group-containing monomer, vinyl esters, and an aromatic vinyl compound, and a component having a functional group working for improving an adhering force or for a crosslinking point, such as a carboxyl group-containing monomer, an acid anhydride group-containing monomer, a hydroxyl group-containing monomer, an amido group-containing monomer, an amino group-containing monomer, an imido group-containing monomer, an epoxy group-containing monomer, N-acryloylmorpholine, vinyl ethers can be appropriately used. Other components may be used alone, or two or more of them may be used jointly.

When (meth)acrylate having an acid functional group such as a carboxyl group, a sulfonic acid group and a phosphoric acid group is used, it is preferable to adjust an acid value of a (meth)acryl-based polymer 29 or less. When an acid value of a (meth)acryl-based polymer exceeds 29, there is a tendency that antistatic property is deteriorated.

An acid value can be adjusted by an amount of (meth) acrylate having an acid functional group to be blended, and examples thereof include a (meth)acryl-based polymer obtained by copolymerizing 2-ethylhexyl acrylate as a (meth) acryl-based polymer having a carboxyl group, and acrylic acid. In this case, by adjusting acrylic acid at 3.7 parts by weight relative to a total of 100 parts by weight of 2-ethylhexyl acrylate and acrylic acid, the aforementioned acid value can be satisfied.

Examples of the sulfonic acid group-containing monomer include styrenesulfonic acid, allylsulfonic acid, 2-(meth) acrylamido-2-methylpropanesulfonic acid, (meth)acrylamidopropanesulfonic acid, sulfopropyl(meth)acrylate, (meth) acryloyloxynaphthalenesulfonic acid, and sodium vinylsulfonate.

Examples of the phosphoric acid group-containing monomer include 2-hydroxyethylacryloyl phosphate.

Examples of the cyano group-containing monomer include acrylonitrile and methacrylonitrile.

Examples of vinylesters include vinyl acetate, vinyl propionate, and vinyl laurate.

Examples of the aromatic vinyl compound include styrene, chlorostyrene, chloromethylstyrene, α-methylstyrene, and other substituted styrene.

Examples of the carboxyl group-containing monomer include (meth)acrylic acid, carboxyethyl(meth)acrylate, carboxypentyl (meth)acrylate, itaconic acid, maleic acid, fumaric acid, crotonic acid, and isocrotonic acid.

Examples of the acid anhydride group-containing monomer include maleic acid anhydride, itaconic acid anhydride, and an acid anhydride of the aforementioned carboxyl group-containing monomer.

Examples of the hydroxyl group-containing monomer include 2-hydroxyethyl(meth)acrylate, 2-hydroxypropyl (meth)acrylate, 4-hydroxybutyl(meth)acrylate, 6-hydroxyhexyl(meth)acrylate, 8-hydroxyoctyl(meth)acrylate, 10-hydroxydecyl(meth)acrylate, 12-hydroxylauryl(meth)acrylate, (4-hydroxymethylcyclohexyl)methyl acrylate, N-methylol (meth)acrylamide, vinyl alcohol, allyl alcohol, 2-hydroxyethyl vinyl ether, 4-hydroxybutylvinyl ether, and diethylene glycol monovinyl ether.

Examples of the amido group-containing monomer include acrylamide, methacrylamide, diethylacrylamide, N-vinylpyrrolidone, N,N-dimethylacrylamide, N,N-dimethylmethacrylamide, N, N-diethylacrylamide, N,N-diethylmethacrylamide, N, N'-methylenebisacrylamide, N,N-dimethylaminopropylacrylamide, N, N-dimethylaminopropylmethacrylamide, and diacetoneacrylamide.

Examples of the amino group-containing monomer include aminoethyl(meth)acrylate, N,N-dimethylaminoethyl (meth)acrylate, N,N-dimethylaminopropyl(meth)acrylate, and (meth)acryloylmorpholine.

Examples of the imido group-containing monomer include cyclohexylmaleimide, isopropylmaleimide, N-cyclohexylmaleimide, and itaconeimide.

Examples of the epoxy group-containing monomer include glycidyl(meth)acrylate, methylglycidyl(meth)acrylate, and allyl glycidyl ether.

Examples of vinyl ethers include methyl vinyl ether, ethyl vinyl ether, and isobutyl vinyl ether.

An acid value of the (meth)acryl-based polymer is preferably 1.0 or less, more preferably 0.8 or less, most preferably 0.0. When an acid value is 1.0 or less, an amount of an acid functional group having interaction with an ionic liquid is decreased, and antistatic property becomes more secure. Adjustment of an acid value of an acryl-based polymer can be performed by adopting zero of, or reducing an amount of a monomer having a carboxyl group or a sulfonate group to be used.

When an acid value of an acryl-based polymer is 1.0 or less, other component constituting an acryl-based polymer can be used without limitation as far as it is a component other than acrylate and/or methacrylate having a carboxyl group or a sulfonate group. Inter alia, since control of crosslinking can be easily performed, a hydroxyl group-containing monomer is preferable, and acrylate and/or methacrylate having a hydroxyl group is particularly preferable.

In addition, when an acid value of an acryl-based polymer is 1.0 or less, an amount of the hydroxyl group-containing monomer to be used is preferably 0.5 to 10% by weight, more preferably 1 to 8% by weight among a constituting monomer component.

The aforementioned other polymerizable monomer component may be used alone, or two or more kinds may be used by mixing, and a content as a whole is such that a polymerizable monomer component is preferably 0 to 49 parts by weight, more preferably 0.1 to 45 parts by weight, particularly preferably 3 to 35 parts by weight relative to 100 parts by weight of a total constituting unit of a (meth)acryl-based polymer. By using the aforementioned other polymerizable monomer component, better interaction with an ionic liquid, and better adherability can be appropriately regulated.

The (meth)acryl-based polymer of the present invention is obtained by a polymerization method which is generally used as a procedure for synthesizing a (meth)acryl-based polymer such as solution polymerization, emulsion polymerization, bulk polymerization and suspension polymerization. In addition, the resulting polymer may be any of a random copolymer, a block copolymer, and a graft copolymer.

In the pressure-sensitive adhesive composition of the present invention, pressure-sensitive adhesive sheets further excellent in heat resistance are obtained by appropriately crosslinking a base polymer, in particular, a (meth)acryl-based polymer. Examples of a specific means for a crosslinking method include a so-called method of using a crosslinking agent, in which a compound having a group reactive with a carboxyl group, a hydroxyl group, an amino group or an amido group which is appropriately contained as a crosslinking basal point in a (meth)acrly-based polymer such as an isocyanate compound, an epoxy compound, a melanine-based resin and an aziridine compound is added to react them. Inter alia, from a viewpoint mainly of obtaining an appropriate cohesive strength, an isocyanate compound and an epoxy compound are particularly preferably used. These compounds may be used alone, or may be used by mixing two or more kinds of them.

Among them, examples of the isocyanate compound include aromatic isocyanate such as tolylene diisocyanate, and xylene diisocyanate, alicycilc isocyanate such as isophorone diisocyanate and aliphatic isocyanate such as hexamethylene diisocyanate.

More specific examples of the isocyanate compound include lower aliphatic polyisocyanates such as butylene diisocyanate, and hexamethylene diisocyanate, alicyclic isocyanates such as cyclopentylene diisocyanate, cyclohexylene diisocyanate, and isophorone diisocyanate, aromatic diisocyanates such as 2,4-tolylene diisocyanate, 4,4'-diphenylmethane diisocyanate, and xylene diisocyanate, and isocyanate adducts such as trimethylolpropane/tolylene diisocyanate trimer adduct (trade name: Coronate L manufactured by Nippon Polyurethane Industry Co., Ltd.), trimethylolpropane/hexamethylene diisocyanate trimer adduct (trade name: Coronate HL manufactured by Nippon Polyurethane Industry Co., Ltd.), and isocyanurate of hexamethylene diisocyanate (trade name: Coronate HX manufactured by Nippon Polyurethane Industry Co., Ltd.). These isocyanate compounds may be used alone, or may be used by mixing two or kinds of them.

Examples of the epoxy compound include N,N,N',N'-tetraglycidyl-m-xylenediamine (trade name TETRAD-X manufactured by Mitsubishi Gas Chemical Company, Inc.) and 1,3-bis(N,N-diglycidylaminomethyl)cyclohexane (trade name TETRAD-C manufactured by Mitsubishi Gas Chemical Company Inc.). These compounds may be used alone, or may be used by mixing two or more kinds.

Examples of the melamine-based resin include hexamethylolmelamine.

Examples of the aziridine derivative include trade name HDU, trade name TAZM, and trade name TAZO (all manufactured by Sogo Pharmaceutical Co., Ltd.) as a commercially available product. These compounds may be used alone, or may be used by mixing two or more kinds.

An amount of these crosslinking agents to be used depends on balance between a (meth)acryl-based polymer to be crosslinked, and is appropriately selected depending on utility as a pressure-sensitive adhesive sheet. In order to obtain sufficient heat resistance due to a cohesive strength of an acryl pressure-sensitive adhesive, generally, the crosslinking agent is contained preferably at 0.01 to 15 parts by weight, more preferably 0.5 to 10 parts by weight relative to 100 parts by weight of the (meth)acryl-based polymer. When a content is less than 0.01 part by weight, crosslinking formation due to a crosslinking agent becomes insufficient, a cohesive strength of a pressure-sensitive adhesive composition becomes small, and sufficient heat resistance is not obtained in some cases, and there is a tendency that it becomes cause for an adhesive residue. On the other hand, when a content exceeds 15 parts by weight, a cohesive strength of a polymer is great, flowability is reduced, and wetting on an adherend becomes insufficient, and there is a tendency that this becomes cause for peeling.

Alternatively, a polyfunctional monomer containing two or more radiation-reactive unsaturated bonds as a substantial crosslinking agent is added, and this may be crosslinked with radiation.

As the polyfunctional monomer having two or more radiation-reactive unsaturated bonds, a polyfunctional monomer component having two or more of one kind or two or more kinds radiation-reactive groups which can be crosslinking-treated (cured) by irradiation of radiation, such as a vinyl group, an acryloyl group, a methacryloyl group, and a vinylbenzyl group is used. Generally, a component having 10 or less of radiation-reactive unsaturated bonds is suitably used. Two or more kinds of the polyfunctional monomer may be used jointly.

Examples of the polyfunctinal monomer include ethylene glycol di(meth)acrylate, diethlene glycol di(meth)acrylate, tetraethylene glycol di(meth)acrylate, neopentyl glycol di(meth)acrylate, 1,6hexanediol di(meth)acrylate, trimethylolpropane tri(meth)acrylate, pentaerythritol tri(meth)acrylate, dipentaerythritol hexa(meth)acrylate, divinylbenzene, and N,N'-methylenebisacrylamide.

An amount of the polyfunctinal monomer to be used depends on balance between a (meth)acryl-based polymer to be crosslinked, and is appropriately selected depending on utility as a pressure-sensitive adhesive sheet. In order to obtain sufficient heat resistance due to a cohesive strength of an acryl pressure-sensitive adhesive, generally, the monomer is preferably blended at 0.1 to 30 parts by weight relative to 100 parts by weight of a (meth)acryl-based polymer. From a viewpoint of flexibility and tackiness, the monomer is preferably blended at 10 parts by weight or less relative to 100 parts by weight of a (meth)acryl-based polymer.

Examples of radiation include ultraviolet ray, laser ray, $\alpha$ ray, $\beta$ ray, $\gamma$ ray, X-ray, and electron beam. From a viewpoint of controlling property and better handling property and a cost, ultraviolet ray is suitably used. More preferably, ultraviolet ray having a wavelength of 200 to 400 nm is used. Ultraviolet ray can be irradiated using an appropriate light source such as a high pressure mercury lamp, a micro-wave excitation-type lamp, and a chemical lamp. When ultraviolet ray is used as irradiation, a photopolymerization initiator is added to an acryl pressure-sensitive adhesive layer.

The photopolymerization initiator depends on a kind of a radiation-reactive component, and may be a substance which produces a radical or a cation by irradiating ultraviolet ray having an appropriately wavelength which can trigger the polymerization reaction.

Example of the photoradical polymerization initiator include benzoins such as benzoin, benzoin methyl ether, benzoin ethyl ether, methyl o-benzoylbenzoate-p-benzoin ethyl ether, benzoin isopropyl ether, and $\alpha$-methylbenzoin, acetophenes such as benzylmethylketal, trichloroacetophenone, 2,2-diethoxyacetophenone, and 1-hydroxycyclohexyl phenyl ketone, propiophenones such as 2-hydroxy-2-methylpropiophenone, and 2-hydroxy-4'-isopropyl-2-methylpropiophenone, benzophenones such as benzophenone, methylbenzophenone, p-chlorobenzophenone, and p-dimethylaminobenzophenone, thioxanthons such as 2-chlorothioxanthon, 2-ethylthioxanthon, and 2-isopropylthioxanthon, acylphosphine oxides such as bis(2,4,6-trimethylbenzoyl)-phenylphosphine oxide, 2,4,6-trimethylbenzoyl-diphenylphosphine oxide, and (2,4,6-trimethylbenzoyl)-(ethoxy)-phenylphosphine oxide, benzil, dibenzsuberone, and $\alpha$-acyloxime ether.

Examples of a photocation polymerization initiator include onium salts such as an aromatic diazonium salt, an aromatic iodonium salt, and an aromatic sulfonium salt, organometallic complexes such as an ion-allene complex. a titanocene complex, and an aryl silanol-aluminum complex, nitrobenzyl ester, sulfonic acid derivative, phosphoric acid ester, phenolsulfonic acid ester, diazonaphthoquinone, and N-hydroxymidosulfonate. Two or more kinds of the photopolymerization initiators may be used jointly.

It is preferably that the photopolymerization initiator is blended usually in a range of 0.1 to 10 parts by weight, preferably 0.2 to 7 parts by weight relative to 100 parts by weight of a (meth)acryl-based polymer.

Further, it is also possible to use a photoinitiation polymerization assistant such as amines. Examples of the photoinitiation assistant include 2-dimethylaminoethyl benzoate, diemethylaminoacetophenone, p-dimethylaminobenzoic acid ethyl ester, and p-dimethylaminobenzoic acid isoamyl ester. Two or more kinds of the photopolymerization initiation assistants may be used. It is preferably that the polymerization initiation assistant is blended at 0.05 to 10 parts by weight, further 0.1 to 7 parts by weight relative to 100 parts by weight a (meth)acryl-based polymer.

Further, the previously known tackifiers, or the previously known various additives such as a leveling agent, an antioxidant, a corrosion preventing agent, a photo stabilizer, an ultraviolet absorbing agent, a polymerization inhibitor, a silane coupling agent, and a powder, a particle, and a foil of inorganic or organic filer, metal powder and pigment may be appropriately added to the pressure-sensitive adhesive composition used in the pressure-sensitive adhesive sheet of the present invention depending on utility.

Meanwhile, the pressure-sensitive adhesive layer in the present invention is such that the aforementioned pressure-sensitive adhesive composition is crosslinked. In addition, pressure-sensitive adhesive sheets of the present invention are such that such the pressure-sensitive adhesive layer is formed on a supporting film. Thereupon, crosslinking of the pressure-sensitive adhesive composition is generally performed after coating of the pressure-sensitive adhesive composition, and a pressure-sensitive adhesive layer composition after crosslinking may be also transferred onto a supporting film.

When a photopolymerization initiator as an arbitrary component is added as described above, a pressure-sensitive adhesive layer can be obtained by coating the pressure-sensitive adhesive composition directly on a subject to be protected, or coating on one side or both sides of a supporting substrate, and performing light irradiation. Usually, a pressure-sensitive adhesive layer is used by photopolymerization by irradiating with ultraviolet ray having a luminous intensity of 1 to 200 mW/cm$^2$ at a wavelength of 300 to 400 nm, at a light amount of around 200 to 4000 mJ/cm$^2$.

A method of forming a pressure-sensitive adhesive layer on a film is not particularly limited, but for example, a layer is prepared by coating the aforementioned pressure-sensitive adhesive composition on a supporting film, and drying this to remove a polymerization solvent to form a pressure-sensitive adhesive layer on a supporting film. Thereafter, aging may be performed for the purpose of adjusting transference of a component of a pressure-sensitive adhesive layer or adjusting a crosslinking reaction. Alternatively, when pressure-sensitive adhesive sheets are prepared by coating a pressure-sensitive adhesive composition on a supporting film, one or more kinds of solvents other than a polymerization solvent may be newly added to the composition so that the composition can be uniformly coated on a supporting film.

In addition, as a method of forming the pressure-sensitive adhesive layer of the present invention, the known method used for preparing pressure-sensitive adhesive sheets is used. Specifically, examples include roll coating, gravure coating, reverse coating, roll brushing, spray coating, and air knife coating methods, immersing and curtain coating method, and extruding coating method with a die coater.

Pressure-sensitive adhesive sheets of the present invention are such that the aforementioned pressure-sensitive adhesive layer is coated on one side or both sides of various supports comprising a plastic film such as a polyester film, or a porous material such as a paper and a non-woven fabric at a thickness of usually 3 to 100 μm, preferably around 5 to 50 μm, to form an aspect of a sheet or a tape. In particular, it is preferable to use a plastic substrate as a support in a case of a surface protecting film.

The plastic substrate is not particularly limited as far as it can be formed into a sheet or a film, and examples include a polyolefin film such as polyethylene, polypropylene, poly-1-butene, poly-4-methyl-1-pentene, a polybutadiene film, a polymethylpentene film, an ethylene-propylene copolymer, an ethylene 1-butene copolymer, an ethylene-vinyl acetate copolymer, an ethylene-ethyl acrylate copolymer, and an ethylene-vinyl alcohol copolymer, a polyester film such as polyethylene terephthalate, polyethylene naphthalate, and polybutylene terephthalate, a polyacrylate film, a polyurethane film, a polystyrene film, a polyamide film such as nylon 6, nylon, 6,6, and partially aromatic polyamide, a polyvinyl chloride film, a vinyl chloride copolymer film, a polyvinylidene chloride film, and a polycarbonate film.

A thickness of the film is usually 5 to 200 μm, preferably around 10 to 100 μm.

The plastic substrate may be subjected to releasing, anti-staining or acid treatment with silicone, fluorine, long chain alkyl-based or fatty acid amide-based releasing agent, or a silica powder, easy adhesion treatment such as alkali treatment, primer treatment, corona treatment, plasma treatment, and ultraviolet ray treatment, or coating-type, kneading-type, or deposition-type antistatic treatment, if necessary.

In addition, it is more preferably that a plastic substrate used in the surface protecting film of the present invention is electrification preventing-treated.

Antistatic treatment which is performed on a plastic substrate is not particularly limited, but for example, a method of providing an electrification preventing layer on at least one side of a generally used film, or a method of kneading a kneading-type electrification preventing agent into a plastic film is used.

Examples of a method of providing an electrification preventing layer on at least one side of a film include a method of coating an electrification preventing resin comprising an electrification preventing agent and a resin component, or an electrically conductive resin containing an electrically conductive polymer or an electrically conductive substance, and a method of depositing or plating an electrically conductive substance.

Examples of an electrification preventing agent contained in an electrification preventing resin include a cation-type electrification preventing agent having a cationic functional group such as a quaternary ammonium salt, a pyridinium salt, and a primary, secondary or tertiary amino group, an anion-type electrification preventing agent having an anionic functional group such as a sulfonic acid salt, a sulfuric acid ester salt, a phosphonic acid salt, and a phosphoric ester salt, an amphoteric-type electrification preventing agent such as alkylbetain and a derivative thereof, imidazoline and a derivative thereof, and alanine and a derivative thereof, a nonion-type electrification preventing agent such as glycerin and a derivative thereof, and polyethylene glycol and a derivative thereof, and an ionic electrically conductive polymer obtained by polymerizing or copolymerizing a monomer having the aforementioned cation-type, anion-type, or amphoteric-type ionic electrically conductive group. These compounds may be used alone, or two or more of them may be used by mixing.

Specifically, examples of the cation-type electrification preventing agent include a (meth)acrylate copolymer having a quaternary ammonium group such as an alkyl trimethylammonium salt, acyloylamidopropyltrimethtylammonium methosulfate, an alkylbenzylmethylammonium salt, acyl choline chloride, and polydimethylaminoethyl methacrylate, a styrene copolymer having a quaternary ammonium group such as polyvinylbenzyltrimethylammonium chloride, and a diallylamine copolymer having a quaternary ammonium group such as polydiallyldimethylammonium chloride. The compounds may be used alone, or two or more kinds may be used by mixing.

Examples of the anion-type electrification preventing agent include an alkyl sulfonic acid salt, an alkylbenzenesulfonic acid salt, an alkyl sulfate ester salt, an alkyl ethoxy sulfate ester salt, an alkyl phosphate ester salt, and a sulfonic acid group-containing styrene copolymer. These compounds may be used alone, or two or more kinds may be used by mixing.

Examples of the amphoteric-type electrification preventing agent include alkylbetain, alkylimidazoliumbetain, and carbobetaingrafted copolymer. These compounds may be used alone, or two or more kinds may be used by mixing.

Examples of the nonion-type electrification preventing agent include fatty acid alkylolamide, di(2-hydroxyethyl) alkylamine, polyoxyethylenealkylamine, fatty acid glycerin ester, polyoxyethylene glycol fatty acid ester, sorbitan fatty acid ester, polyoxysorbitan fatty acid ester, polyoxyethylene alkyl phenyl ether, polyoxyethylene alkyl ether, polyethylene glycol, polyoxyethylenediamine, a copolymer consisting of polyether, polyester and polyamide, and methoxypolyethyleneglycol (meth)acrylate. These compounds may be used alone, or two or more kinds may be used by mixing.

Examples of the electrically conductive polymer include polyaniline, polypyrrole and polythiophene. These electrically conductive polymers may be used alone, or two or more kinds may be used by mixing.

Examples of the electrically conductive substance include tin oxide, antimony oxide, indium oxide, cadmium oxide, titanium oxide, zinc oxide, indium, tin, antimony, gold, silver, copper, aluminum, nickel, chromium, titanium, iron, covert, copper iodide, and an alloy and a mixture thereof. These electrically conductive substances may be used alone, or two or more kinds may be used by mixing.

As a resin component used in the electrification preventing resin and the electrically conductive resin, a generally used resin such as polyester, acryl, polyvinyl, urethane, melanine and epoxy is used. In the case of a polymer-type electrification preventing agent, it is not necessary that a resin component is contained. In addition, the electrification preventing resin component may contain compounds of a methylolated or alkylolated melanine series, a urea series, a glyoxal series, and an acrylamide series, an epoxy compound, or an isocyanate compound as a crosslinking agent.

An electrification preventing layer is formed, for example, by diluting the aforementioned electrification preventing resin, electrically conductive polymer or electrically conductive resin with a solvent such as an organic solvent and water, and coating this coating solution on a plastic film, followed by drying.

Examples of an organic solvent used in formation of the electrification preventing layer include methyl ethyl ketone, acetone, ethyl acetate, tetrahydrofuran, dioxane, cyclohexanone, n-hexane, toluene, xylene, methanol, ethanol, n-propanol and isopropanol. These solvents may be used alone, or two or more kinds may be used by mixing.

As a coating method in formation of the electrification preventing layer, the known coating method is appropriately used, and examples include roll coating, gravure coating, reverse coating, roll brushing, spray coating, and air knife coating methods, an immersing and curtain coating method, and an extrusion coating method with a die coater.

A thickness of the aforementioned electrification preventing resin layer, electrically conductive polymer or electrically conductive resin is usually 0.01 to 5 μm, preferably around 0.03 to 1 μm.

Examples of a method of depositing or plating an electrically conductive substance include vacuum deposition, sputtering, ion plating, chemical deposition, spray pyrolysis, chemical plating, and electric plating methods.

A thickness of the electrically conductive substance is usually 20 to 10000 Å, preferably 50 to 5000 Å.

As the kneading-type electrification preventing agent, the aforementioned electrification preventing agent is appropriately used.

An amount of the kneading-type electrification preventing agent to be blended is 20% by weight or less, preferably in a range of 0.05 to 10% by weight relative to a total weight of a plastic film. A kneading method is not particularly limited as far as it is a method by which the electrification preventing agent can be uniformly mixed into a resin used in a plastic film, but for example, a heating roll, a Banbury mixer, a pressure kneader, and a biaxial kneading machine are used.

The plastic film may be subjected to releasing, anti-staining or acid treatment with a silicone-based, fluorine-based, long chain alkyl-based or fatty acid amide-based releasing agent, or a silica powder, or easy adhesion treatment such as alkali treatment, primer treatment, corona treatment, plasma treatment, and ultraviolet treatment, if necessary.

If necessary, a separator (or peeling liner, peeling sheet etc.) can be laminated on a surface of a pressure-sensitive adhesive for the purpose of protecting a pressure-sensitive adhesive surface. As a substrate constituting a separator, there are a paper and a plastic film, and a plastic film is suitably used from a viewpoint of excellent surface smoothness.

The film is not particularly limited as far as it is a film which can protect the pressure-sensitive adhesive layer, and examples include a polyolefin film such as polyethylene, polypropylene, poly-1-butene, poly-4-methyl-1-pentene, an ethylene-propylene copolymer, an ethylene-1-butene copolymer, an ethylene-vinyl acetate copolymer, an ethylene-ethyl acrylate copolymer, and an ethylene-vinyl alcohol copolymer, a polyether film such as polyethylene terephthalate, polyethylene naphthalate, and polybutylene terephthalate, a polyacrylate film, a polystyrene film, a polyamide film such as nylon 6, nylon 6,6, and partially aromatic polyamide, a polyvinyl chloride film, a poly vinylidene chloride film, and a polycarbonate film.

A thickness of the film is usually around 5 to 200 μm, preferably around 10 to 100 μm. A pressure-sensitive adhesive layer applying surface of the film is appropriately subjected to treatment with a releasing agent such as a silicone-based, fluorine-based, long chain alkyl-based, or fatty acid amide-based releasing agent, or a silica powder.

The pressure-sensitive adhesive composition, the pressure-sensitive adhesive layer and the pressure-sensitive adhesive sheets using the present invention are used, particularly, in plastic products on which static electricity is easily generated and, inter alia, can be used as a surface protecting film used for the purpose of protecting an optical member surface such as a polarizing plate, a wavelength plate, an optical compensating film, a light diffusion sheet and a reflecting sheet which are used in a liquid crystal display.

The pressure-sensitive adhesive-type optical member of the present invention is such that a pressure-sensitive adhesive layer containing the aforementioned pressure-sensitive adhesive composition is formed on one side or both sides of an optical member at a thickness of usually around 3 to 200 μm, preferably around 10 to 100 μm. Formation of a pressure-sensitive adhesive layer can be performed by a method of coating directly on an optical member, or a method of transferring a layer once formed by coating on another substrate (e.g. peeling liner etc.).

As a method of coating and forming a pressure-sensitive adhesive layer, the known method which is used for manufacturing a pressure-sensitive adhesive tape is used, and examples include roll coating, gravure coating, reverse coating, roll brushing, spray coating and air knife coating methods, an immersing and curtain coating method, and an extrusion coating method with a die coater.

As an optical member, members which are used for manufacturing various display devices are used, a kind thereof is not particularly limited, but examples include a polarizing plate, a phase difference plate, a luminance improving plate, and a glare-preventing sheet. An optical member may be lamination of two or more layers of an optical material such as lamination of a polarizing plate and a phase difference plate, lamination of phase difference plates, and lamination of a polarizing plate, a luminance improving plate and a glare-preventing sheet.

For example, a polarizing plate in which one side or both sides of a polarizer has a transparent protecting film is usually used.

A polarizer is not particularly limited, but various kinds can be used. Examples of a polarizer include a polarizer obtained by adsorbing a dichromatic substance such as iodine and a dichromatic dye onto a hydrophilic polymer film such as a polyvinyl alcohol-based film, a partially formalized polyvinyl alcohol-based film, and an ethylene-vinyl acetate copolymer-based partially saponified film, and monoaxially stretching this, and a polyene-based oriented film such as polyvinyl alcohol which has been dehydrated-treated and polyvinyl chloride which has been hydrochloric acid removal-treated. Among them, a polarizer comprising a dichromatic substance such as a polyvinyl alcohol-based film and iodine is preferable. A thickness of the polarizer is not particularly limited, but is preferably 1 μm to 1 mm, more preferably 20 μm to 200 μm in view of a strength as a film and uniformity at stretching.

A polarizer in which a polyvinyl alcohol-based film has been stained with iodine and monoaxially stretched can be prepared by staining polyvinyl alcohol by immersing an aqueous iodine solution, and stretching 3 to 7-fold of an original length. If necessary, polyvinyl alcohol may be immersed in an aqueous solution of potassium iodide optionally containing boric acid, zinc sulfate, and zinc chloride. Further, if necessary, a polyvinyl alcohol-based film may be washed with water by immersing in water, before staining. By washing a polyvinyl alcohol-based film with water, a stain and a blocking preventing agent on a surface of a polyvinyl alcohol-based film can be washed out, and there is effect that ununiformity such as scatter of staining is prevented by swelling a polyvinyl alcohol-based film. Stretching may be performed after staining with iodine, or stretching may be performed while staining, or staining with iodine may be performed after stretching. Stretching may be performed in an aqueous solution of boric acid or potassium iodide, or in a water bath.

As a material for forming a transparent protecting film provided on one side or both sides of the polarizer, materials excellent in transparency, mechanical strength, thermal stability, water blocking property and isotropy are preferable. Examples include a polyester-based polymer such as polyethylene terephthalate and polyethylene naphthalate, a cellulose-based polymer such as diacetylcellulose and triacetylcellulose, an acryl-based polymer such as polymethyl methacrylate, a styrene-based polymer such as polystyrene and acrylonitrile-styrene copolymer (AS resin), and a polycarbonate-based polymer. In addition, examples of a polymer for forming the transparent protecting film include polyolefin having a polyethylene, polypropylene, cyclo-based or norbornene structure, a polyolefin-based polymer such as an ethylene-propylene copolymer, a vinyl chloride-based polymer, an amide-based polymer such as nylon and aromatic polyamide, an imide-based polymer, a sulfone-based polymer, a polyethersulfone-based polymer, a polyether ether ketone-based polymer, a polyphenylene sulfide-based polymer, a vinyl alcohol-based polymer, a vinylidene chloride-based polymer, a vinyl butyral-based polymer, an arylate-based polymer, a polyoxymethylene-based polymer, an epoxy-based polymer, and a blend of the aforementioned polymers. A transparent protecting film may be formed as a cured layer of a thermal-curing type or ultraviolet-ray curing resin such as an acryl series, a urethane series, an acrylurethane series, an epoxy series and a silicone series.

In addition, there can be exemplified a polymer film described in JP-A No. 2001-343529 (WO 01/37007), for example, a resin composition containing (A) a thermoplastic resin having a substituted and/or non-substituted imido group on a side chain, and (B) a thermoplastic resin having a substituted and/or non-substituted phenyl and nitrile group on a side chain. Examples include a film of a resin composition containing an alternate copolymer consisting of isobutylene and N-methylmaleimide, and an acrylonitrile-styrene copolymer. As a film, a film composed of a mixed extruded product of a resin composition may be used.

A thickness of a protecting film can be appropriately determined, but generally, is around 1 to 500 μm from a viewpoint of a strength, workability such as handling property, and a thin layer property. Particularly, the thickness is preferably 1 to 300 μm, more preferably 5 to 200 μm.

In addition, it is preferable that a protecting film is as less colored as possible. Therefore, a protecting film in which a phase difference value in a film thickness direction represented by $Rth=[(nx+ny)/2-nz]\cdot d$ (wherein nx and ny are a main refractive index in a film planar surface, nz is a refractive index in a film thickness direction, and d is a film thickness) is preferably used. By using a film having such the phase difference value (Rth) in a thickness direction of −90 nm to +75 nm, coloring of a polarizing plate due to a protecting film (optical blue) can be approximately solved. The phase difference value (Rth) in a thickness direction is further preferably −80 nm to +60 nm, particularly preferably −70 nm to +45 nm.

As a protecting film, a cellulose-based polymer such as triacetylcellulose is preferable from a viewpoint of polarizing property and durability. In particular, a triacetylcellulose film is preferable. When a protecting film is provided on both sides of a polarizer, a protecting film having a surface and a back composed of the same polymer material may be used, or a protecting film having a surface and a back composed of different polymer materials may be used. The polarizer and a protecting film are usually adhered via an aqueous pressure-sensitive adhesive. As an aqueous adhesive, there can be exemplified an isocyanate-based adhesive, a polyvinyl alcohol-based adhesive, a gelatin-based adhesive, a vinyl-based latex series, aqueous polyurethane, and aqueous polyester.

A surface of the transparent protecting film on which a polarizer is not adhered may be subjected to a hard coating layer, reflection preventing treatment, or treatment for the purpose of sticking prevention, diffusion or antiglare.

Hard coating treatment is performed for the purpose of preventing flaw of a polarizing plate surface, and a curing film excellent in a hardness and sliding property due to an appropriate ultraviolet-ray resin such as an acryl series and a silicone series may be formed in a manner of adding to a surface of a transparent protecting film. Reflection preventing treatment is performed for the purpose of preventing reflection of outer light on a polarizing plate surface, and can be attained by forming a reflection preventing membrane as usual. In addition, sticking preventing treatment is performed for the purpose of preventing adhesion with an adjacent layer.

In addition, antiglare treatment is performed for the purpose of preventing inhibition of visibility of a polarizing plate-permeated light by reflection of outer light on a surface of a polarizing plate, and can be formed, for example, by imparting a fine irregular structure to a surface of a transparent protecting film by an appropriate format such as a surface roughening format by a sand blast format and an embossing procession format, and a format of blending a transparent fine particle. As a fine particle to be contained for forming the surface fine irregular structure, a transparent fine particle such an inorganic-based fine particle which may be electrically conductive comprising silica, alumina, titania, zirconia, tin oxide, indium oxide, cadmium oxide, or antimony oxide, or an organic-based fine particle comprising a crosslinked or uncrosslinked polymer is used. When a surface fine irregular structure is formed, an amount of a fine particle to be used is generally around 2 to 50 parts by weight, preferably 5 to 25 parts by weight relative to 100 parts by weight of a transparent resin for forming a surface fine irregular structure. The antiglare layer may function also as a diffusion layer for diffusing polarizing plate-permeated light to extend a visual angle (visual angle extending function etc.).

The aforementioned reflection preventing layer, sticking preventing layer, diffusion layer and antiglare layer may be provided on a transparent protecting film itself, or may be provided as another entity different from a transparent protecting film as an optical layer.

For example, an antiglare layer is formed into a sheet, or formed on a transparent substrate, whereby, an antiglare sheet is obtained. A thickness of an antiglare sheet is not particularly limited, but 1 μm to 1 mm is preferably used in view of a strength as a sheet.

Examples of the optical member of the present invention include an optical layer which may be used in formation of a liquid crystal display device such as a reflection plate, a semipermeation plate, a phase difference plate (including ½ or ¼ wavelength plate), a visual angle compensating film and a luminance improving film. These may be used as an optical member of the present invention alone, or one layer or two or more layers may be used in the polarizing plate by lamination upon actual use.

In particular, a reflection type polarizing plate or a semipermeation-type polarizing plate in which a reflection plate or a semipermeation reflection plate is further laminated on a polarizing plate, an elliptic polarizing plate or a circular polarizing plate in which a phase difference plate is laminated on a polarizing plate, a wide field angle polarizing plate in which a visual angle compensating film is further laminated on a polarizing plate, or a polarizing plate in which a luminance improving film is further laminated on a polarizing plate is preferable.

A reflection-type polarizing plate is a plate in which a reflection layer is provided on a polarizing plate, is for forming a liquid crystal display device which is a type of reflecting and displaying incident light from a visible side (display side), and has an advantage that building-in of a light source such as back light can be omitted, and a liquid crystal display device is easily thinned. Formation of a reflection-type polarizing plate can be performed by an appropriate format such as a format of providing a reflection layer comprising a metal on one side of a polarizing plate via a transparent protecting layer, if necessary.

Examples of the reflection-type polarizing plate include a plate in which a reflection layer is formed by providing a foil comprising a reflecting metal such as aluminum or a deposition membrane on one side of a transparent protecting film which has been mat-treated, if necessary. In addition, examples include a plate in which a fine particle is contained in the transparent protecting film to form a surface fine irregular structure, and a reflection layer of a fine irregular structure is possessed thereon. The aforementioned reflection layer of a fine irregular structure has an advantage that directivity or glittering appearance is prevented by diffusing incident light by random reflection, and deviation in light and dark can be suppressed. In addition, the transparent protecting film containing a fine particle has also an advantage that incident light and its reflected light are diffused upon permeation therethrough, whereby, light dark deviation can be more suppressed. Formation of a reflection layer of a fine irregular structure reflecting a surface fine irregular structure of a transparent protecting film can be performed by a method of providing a metal directly on a surface of a transparent protecting layer by an appropriate format such as a deposition format such as ion plating format and sputtering format, and a plating format.

A reflection plate may be used by a reflection sheet on which a reflection layer is provided on an appropriate film like a transparent protecting film in place of a format of directly imparting to the transparent film of a polarizing plate. Since a reflection layer is usually made of a metal, a use aspect in the state where its reflection side is covered with a transparent protecting film or a polarizing plate is more preferable from a viewpoint of prevention of reduction in a reflectivity due to oxidation, consequently long term durability of an initial reflectivity, and avoidance of separate provision of a protecting layer.

A semi-permeation polarizing plate can be obtained by adopting a semi-permeation type reflection layer such as a half mirror which reflects light on a reflection layer and permeates light in the aforementioned plate. The semi-permeation polarizing plate is usually provided on a back side of a liquid crystal cell, and such a type of a liquid crystal display device can be formed that, when a liquid crystal display device is used in the relatively light atmosphere, incident light from a visible side (display side) is reflected to display an image and, in the relatively dark atmosphere, an image is displayed using a built-in light source such as back light built in a back side of a semi-permeation polarizing plate. That is, the semi-permeation polarizing plate is useful for forming such a type of a liquid crystal display device that energy which is used in a light source such as back light can be saved, and the device can be used using a built-in light source also under the relatively dark atmosphere.

An elliptic polarizing plate or a circular plate in which a phase difference plate is further laminated on a polarizing plate will be explained. When a linearly polarized light is changed to elliptically polarized light or a circularly polarized light, or elliptically polarized light or circularly polarized light is changed to linearly polarized light, or a polarization direction of linearly polarized light is changed, a phase difference plate is used. In particular, as a phase difference plate for changing linearly polarized light to circularly polarized light, or changing circularly polarized light to linearly polarized light, a so-called ¼ wavelength plate (also referred to as λ/4 plate) is used. A ½ wavelength plate (also referred to as λ/2 plate) is usually used when a polarization direction of linearly polarized light is changed.

An elliptic polarizing plate is effectively used when coloration (blue or yellow) generated by birefringence of a liquid crystal layer of a supertwist nematic (STN)-type liquid crystal display device is compensated (prevented) to display white and black without the coloration. Further, an elliptic polarizing plate in which three dimensional refractive index is controlled is preferable because it can also compensate (prevent) coloration caused when a screen of a liquid crystal display device is seen from a slant direction. A circular polarizing plate is effectively used, for example, when a tone of an image of a reflection-type liquid crystal display device for displaying a colored image is adjusted, or it has also function of reflection prevention.

Examples of a phase difference plate include a birefringent film obtained by monoaxially or biaxially stretching a polymer material, an oriented film of a liquid crystal polymer, and an oriented layer of a liquid crystal polymer supported by a film. A thickness of a phase difference plate is not particularly limited, but is generally around 20 to 150 μm.

Examples of a polymer material include polyvinyl alcohol, polyvinyl butyral, polymethyl vinyl ether, polyhydroxyethyl acrylate, hydroxyethylcellulose, hydroxypropylcellulose, methylcellulose, polycarbonate, polyarylate, polysulfone, polyethylene terephthalate, polyethylene naphthalate, polyether sulfone, polyphenylene sulfide, polyphenylene oxide, polyallylsulfone, polyvinyl alcohol, polyamide, polyimide, polyolefin, polyvinyl chloride, cellulose-based polymer, and a norbornene-based resin, or two dimensional-based or three dimensional-based various copolymers, graft copolymers and blends thereof. These polymer materials are converted into an oriented entity (stretched film) by stretching.

Examples of a liquid crystal polymer include various main chain types and side chain types in which a conjugating linear atomic population (mesogen) imparting liquid crystal orienting property is introduced into a main chain or a side chain of a polymer. Examples of a main chain type liquid crystal polymer include a nematic oriented polyester-based liquid crystal polymer, a discotic polymer and a cholesteric polymer having a structure in which a mesogen group is bound with a spacer part imparting bending property. Examples of a side chain-type liquid crystal polymer include a polymer having a main chain skeleton of polysiloxisane, polyacrylate, polymethacrylate or polymalonate and, as a main chain, a mesogen part consisting of a para-substituted cyclic compound unit imparting neomatic orientation, via a spacer part consisting of a conjugating atomic population. These liquid crystal polymers are obtained by rubbing-treating a surface of a thin film of polyimide or polyvinyl alcohol formed on a glass plate, or spreading a liquid crystal polymer solution on an orientation-treated surface on which silicon oxide has been slantly deposited, followed by thermal treatment. A phase difference plate may have an appropriate phase difference depending on a use purpose such as a plate for the purpose of compensating for coloration or a visual angle due to birefringence of various wavelength plates or liquid crystal layers, or has optical property such as a phase difference which is controlled by laminating two or more kinds of phase difference plates.

The aforementioned elliptic polarizing plate or reflection-type elliptic polarizing plate is such that an appropriate combination of a polarizing plate or a reflection-type polarizing plate and a phase difference plate is laminated. Such the elliptic polarization plate can be formed by successively and separately laminating a (reflection-type) polarizing plate and a phase difference plate in a process for manufacturing a liquid crystal display device so that a combination of the (reflection-type) polarizing plate and the phase difference plate is obtained, and an optical member such as an elliptic polarizing plate which has been formed in advance as described above has an advantage that it is excellent in stability of quality and laminating workability, and an efficiency of manufacturing a liquid crystal display device can be improved.

A visual angle compensating film is a film for extending a field angle so that an image is seen relatively clearly even when a screen of a liquid crystal display device is seen not from a direction vertical to the screen but from a slightly slant direction. Such the visual angle compensating phase difference plate is such that an orientation layer of a liquid crystal polymer is supported on a phase difference plate, an oriented film such as a liquid crystal polymer, or a transparent substrate. In a normal phase difference plate, a polymer film having birefringence which has been monoaxially stretched in its surface direction is used, while in a phase difference plate used as a visual angle compensating film, a bidirectional stretched film such as a polymer film having birefringence which has been biaxially stretched in a surface direction, a polymer having birefringence which has been monoaxially stretched in a surface direction, is also stretched, and also stretched in a thickness direction, and has a controlled refractive index in a thickness direction, and a slantly oriented film is used. Examples of the slantly oriented film include a film obtained by adhering a thermally shrinking film to a polymer film, and subjecting the polymer film to stretching treatment or/and shrinking treatment under action of a shrinking force due to heating, and a film in which a liquid crystal polymer is slantly oriented. As a raw material polymer for a phase difference plate, the same polymer as that explained for the previous phase difference plate is used, and an appropriate polymer for the purpose of preventing coloration due to change in a visual confirmation angle based on a phase difference due to a liquid crystal cell, or extending a field angle for better visual confirmation can be used.

In addition, from a viewpoint of accomplishment of a wide field angle for better visual confirmation, an optical compensating phase difference plate in which an optically anisotropic layer comprising an oriented layer of a liquid crystal polymer, in particular, a slantly oriented layer of a discotic liquid crystal polymer is supported by a triacetylcellulose film can be preferably used.

A polarizing plate in which a polarizing plate and a luminance improving film are laminated is usually used by provision on a back side of a liquid crystal cell. The luminance improving film exhibits such the property that, when natural light is introduced by back light of a liquid crystal display device, or reflection from a back side, linearly polarized light having a prescribed polarization axis or circularly polarized light in a prescribed direction is reflected, and other light is permeated. In a polarizing plate in which the luminance improving film is laminated on a polarizing plate, light from a light source such as back light is introduced to obtain permeated light in the prescribed polarized state and, at the same time, light other than the aforementioned prescribed polarized state is reflected without permeation. Light reflected on a surface of this luminance improving film is inverted via a reflection layer provided on its rear side to introduce into the luminance improving film again, a part or all of this is permeated as light in the prescribed polarized state to increase an amount of light permeating through the luminance improving film and, at the same time, polarized light which is absorbed in a polarizer with difficulty is supplied to increase an amount of light which can be utilized in a liquid crystal display image display, thereby, a luminance can be improved. That is, when light is introduced through a polarizer from a back side of a liquid crystal cell by back light without using the luminance improving film, most of light having a polarization direction which is not consistent with a polarization axis of a polarizer is absorbed in a polarizer, and is not permeated through a polarizer. That is, different depending on property of a used polarizer, about 50% of light is absorbed in a polarizer, an amount of light which can be utilized in a liquid crystal image display is reduced by that portion, and an image is darkened. Since the luminance improving film does not introduce light having such a polarization direction that it is absorbed in a polarizer, into a polarizer, once reflects on the luminance improving film, and inverts the light via a reflection layer provided on its rear side to introduce into the luminance improving film again, these are repeated, and the luminance improving film makes only polarized light that a polarization direction of light reflecting and inverting between both of them becomes a polarization direction capable of permeating through a polarizer, permeate therethrough, supplies this to a polarizer, light such as back light can be effectively used for displaying an image of a liquid crystal display device, and a screen can be made bright.

A diffusion plate can be also provided between a luminance improving film and the reflection layer. Light in the polarized state which has reflected by the luminance improving film is directed towards the reflection layer, and light which has passed through the provided diffusion plate is uniformly diffused and, at the same time, the polarized state is lost, and the non-polarized state is obtained. That is, the diffusion plate returns polarized light to original natural light state. Light in this non-polarized state, that is, in the natural light state is directed towards a reflection layer, reflected via the reflection layer, and passes through the diffusion plate again to be introduced into a luminance improving film again, and this is repeated. By providing a diffusion plate for returning polarized light to original natural light state between a luminance improving film and the reflection layer like this, irregularity in brightness of a display screen is reduced while maintaining brightness of a display screen at the same time, and a uniform and bright screen can be provided. It is thought that, by provision of such the diffusion plate, the number of reflection repetition of initial time incident light is increased appropriately, and a uniform bright display screen can be provided, in cooperation with the diffusion function of a diffusion plate.

As the luminance improving film, a film exhibiting property that linearly polarized light having a prescribed polarization axis is permeated, and other light is reflected, such as a multilayered thin film of a dielectric material, and a multilayered laminate of thin films having different refractive index anisotropy, a film exhibiting characteristic that any one of clockwise and anti-clockwise circularly polarized lights is reflected, and other light is permeated, such as an oriented film of a cholesteric liquid crystal polymer, and an oriented liquid crystal layer thereof supported on a film can be appropriately used.

Therefore, in the aforementioned such a type luminance improving film that linearly polarized light having a prescribed polarization axis is permeated, by introducing permeated light as it is into a polarizing plate by adjusting a polarization axis, the light can be effectively permeated while loss in absorption by a polarizing plate is suppressed. On the other hand, in such a type luminance improving film that circularly polarized light is used such as a cholesteric liquid crystal layer, although light can be introduced into a polarizer, it is preferable that after the circularly polarized light is converted into linearly polarized light via a phase difference plate, this is introduced into a polarizing plate from a viewpoint of suppression of absorption loss. By using a ¼ wavelength plate as the phase difference plate, circularly polarized light can be converted into linearly polarized light.

A phase difference plate which functions as a ¼ wavelength plate in a wide wavelength range such as a visible light region can be obtained, for example, by a format of overlaying a phase difference layer functioning as a ¼ wavelength plate for pale light having a wavelength 550 nm, and a phase difference layer exhibiting other phase difference property, for example, a phase difference layer functioning as a ½ wavelength plate. Therefore, a phase difference plate to be provided between a polarizing plate and a luminance improving film may consist of one or two or more phase difference layers.

Also regarding a cholesteric liquid crystal layer, by forming an arrangement structure in which two layers or three or more layers are overlaid by combining layers having different reflection wavelengths, a layer reflecting circularly polarized light in a wide wavelength range such as a visible light region can be obtained and, based on this, permeated circularly polarized light having a wide wavelength range can be obtained.

In addition, a polarizing plate may consist of lamination of a polarizing plate and two or three or more optical layers such as the aforementioned polarization separation-type polarizing plate. Therefore, a reflection-type elliptic polarizing plate or a semi-permeation type elliptic polarizing plate obtained by combining the aforementioned reflection-type polarizing plate or semi-permeation type polarizing plate and a phase difference plate may be used.

An optical member in which the aforementioned optical layer is laminated on a polarizing plate can be formed by a format of successively and separately laminating layers in a process for manufacturing a liquid crystal display device, and an optical member obtained by laminating layers in advance has an advantage that it is excellent in stability of quality and assembling work, and a step of manufacturing a liquid crystal display device can be improved. For lamination, an appropriate adhesion means such as a pressure-sensitive adhesive layer can be used. Upon adhesion of the aforementioned polarizing plate and other optical layer, an optical axis can be made to be an appropriate arrangement angle depending on desired phase difference property.

An optical member of the pressure-sensitive adhesive optical member of the present invention, and each layer such as a pressure-sensitive adhesive layer may have ultraviolet-ray absorbing ability imparted by a format such as a format of treatment with a ultraviolet-ray absorbing agent such as a salicylic acid ester-based compound and a benzophenol-based compound, a benzotriazole-based compound and a cyanoacrylate-based compound, and a nickel complex salt-based compound.

The pressure-sensitive adhesive optical member of the present invention can be preferably used in formation of various image display devices such as a liquid crystal display device. Formation of a liquid crystal display device can be performed according to the previous method. That is, a liquid crystal display device can be generally formed by appropriately assembling a liquid crystal cell and a pressure-sensitive adhesive optical member and, if necessary, a constitutional part such as an illumination system, and incorporating a driving circuit therein, and, in the present invention, there is particularly no limitation except that an optical member of the present invention is used, and may be according to the previous method. As a liquid crystal cell, an optional type such as TN type, STN type and πtype can be used.

A liquid crystal display device in which a pressure-sensitive adhesive optical member is arranged on one side or both sides of a liquid crystal cell, or an appropriate liquid crystal display device using back light or a reflection plate as an illumination system can be formed. In this case, an optical member in accordance with the present invention can be provided on one side or both sides of a liquid crystal cell.

When an optical member is provided on both sides, optical members may be the same or different. Further, upon formation of a liquid crystal display device, one layer or two or more layers of appropriate parts such as a diffusion plate, an antiglare layer, a reflection preventing membrane, a protecting plate, a prism array, a lens array sheet, a light diffusion plate, and back light can be arranged.

Then, an organic electroluminescence device (organic PL displaying device) will be explained. Generally, in an organic EL display device, a transparent electrode, an organic light emitting layer and a metal electrode are laminated on a transparent substrate in this order to form a light emitting entity (organic electroluminescence emitting entity). Herein, the organic light emitting layer may be a laminate of various organic thin films, and a construction having various combinations such as a laminate of a hole injecting layer comprising a triphenylamine derivative and a light emitting layer comprising a fluorescent organic solid such as anthracene, a laminate of such the light emitting layer and an electron injecting layer comprising a perylene derivative, and a laminate of these hole injecting layer, light injecting layer and electron injecting layer are known.

The organic EL display device emits light by a principle that, by applying a voltage to a transparent electrode and a metal electrode, a hole and an electron are injected into an organic light emitting layer, energy generated by recombination of these hole and electron excites a fluorescent substance, and light is radiated when an excited fluorescent substance is returned to the ground state. Mechanism of recombination on a way is the same as in general diodes and, as predicted from this, a current and a light emitting intensity exhibit strong non-linearity accompanied with rectification property relative to an applied voltage.

In the organic EL display device, in order to take out emitted light in an organic light emitting layer, at least one of electrodes must be transparent, and a transparent electrode formed of a transparent electrically conductive material such as indium tin oxide (ITO) is usually used as an anode. On the other hand, in order to make injection of an electron easy and increase a light emitting efficiency, it is important to use a substance having small work function in a cathode, and metal electrode such as Mg—Ag and Al—Li is usually used.

In the organic EL display device having such the construction, an organic light emitting layer is formed of an extremely thin film having a thickness of around 10 nm. For this reason, an organic light emitting layer makes light permeate therethrough approximately completely like a transparent electrode. As a result, since light which has been introduced from a surface of a transparent substrate at not emitting, passed through a transparent electrode and an organic light emitting layer, and reflected on a metal electrode comes out on a surface side of a transparent substrate again, a display surface of an organic EL display device looks like a mirror plane when confirmed visually.

In an organic μL display device containing an organic electroluminescence emitting entity in which a transparent electrode is provided on a surface side of an organic light emitting layer emitting light by application of a voltage, and a metal electrode is provided on a back side of an organic light emitting layer, a polarizing plate can be provided on a surface side of a transparent electrode and, at the same time, a phase difference plate can be provided between these transparent electrode and polarizing plate.

Since a phase difference plate and a polarizing plate have such action that light introduced from the outside and reflected on a metal electrode is polarized, there is an effect that a mirror plane of a metal electrode can not be confirmed visually from the outside due to the polarizing action. In addition, when a phase difference plate is constructed of a ¼ wavelength plate, and an angle between a polarization direction of a polarizing plate and that of a phase difference plate is adjusted to be π/4, a mirror plane of a metal electrode can be completely shielded.

That is, only a linearly polarized light component of outside light introduced into this organic EL display device is permeated through a polarizing plate. This linearly polarized light becomes generally elliptically polarized light by a phase difference plate and, in particular, when a phase difference plate is a ¼ wavelength plate, and an angle between a polarization direction of a polarizing plate and that of a phase difference plate is π/4, circularly polarized light is obtained.

This circularly polarized light is permeated through a transparent substrate, a transparent electrode, and an organic thin film, reflected on a metal electrode, permeated through an organic thin film, a transparent electrode and a transparent substrate again, to become linearly polarized again at a phase difference plate. And, since this linearly polarized light is orthogonal with a polarization direction of a polarizing plate, the light can not permeate through a polarizing plate. As a result, a mirror plain of a metal electrode can be completely shielded.

In the pressure-sensitive adhesive optical member of the present invention, a separator (or peeling liner, peeling sheet etc.) can be applied on a pressure-sensitive adhesive surface for the purpose of protecting a pressure-sensitive adhesive surface, if necessary. As a substrate constituting a separator, there are a paper and a plastic film, and a plastic film is suitably used from a viewpoint of excellent surface smoothness.

The film is not particularly limited as far as it is a film which can protect the pressure-sensitive adhesive layer, and examples include a polyolefin film such as polyethylene, polypropylene, poly-1-butene, and poly-4-methyl-1-pentene, a polybutadiene film, a polymethylpentene film, an ethylene-propylene copolymer, an ethylene-1-butene copolymer, an ethylene-vinyl acetate copolymer, an ethylene-ethyl acrylate copolymer, and an ethylene-vinyl alcohol copolymer, a polyester film such as polyethylene terephthalate, polyethylene naphthalate, and polybutylene terephthalate, a polyacrylate film, a polyurethane film, a polystyrene film, a polyamide film such as nylon 6, nylon 6,6, and partially aromatic polyamide, a polyvinyl chloride film, a vinyl chloride copolymer film, a polyvinylidene chloride film, and a polycarbonate film.

A thickness of the film is usually around 5 to 200 µm, preferably around 10 to 100 µm. A pressure-sensitive adhesive layer applying surface of the film is appropriately subjected to treatment with a releasing agent such as a silicone-based, fluorine-based, long chain alkyl-based or fatty acid amide-based releasing agent, or a silica powder.

The pressure-sensitive adhesive optical member of the present invention is preferably used for manufacturing various display devices such as a liquid crystal display apparatus and a touch panel. An optical element such as a polarizing plate, a phase difference plate, a luminance improving plate and an antiglare sheet forming an optical member may be endowed with ultraviolet-ray absorbing ability using a ultraviolet-ray absorbing agent. Examples of the ultraviolet-ray absorbing agent include a salicylic acid ester-based compound, a benzophenone-based compound, a benzotriazole-based compound, a cyanoacrylate-based compound, and a nickel complex salt-based compound.

EXAMPLES

Examples which specifically show a construction and effect of the present invention will be explained below. Assessment items in Examples were measured as follows:

<Measurement of Acid Value>

An acid value was measured using an automatically titrating apparatus (COM-550 manufactured by HIRANUMA SANGYO Co., Ltd.), and was obtained by the following equation.

$$A=\{(Y-X) \times f \times 5.611\}/M$$

A; Acid value
Y; Titration amount of sample solution (ml)
X; Titration amount of solution of only 50 g of mixed solvent (ml)
f; Factor of titration solution
M; Weight of polymer sample (g)
Measurement conditions are as follows:
Sample solution: About 0.5 g of a polymer sample was dissolved in 50 g of a mixed solvent (toluene/2-propanol/distilled water=50/49.5/0.5, weight ratio) to obtain a sample solution.
Titration solution: 0.1N 2-propanolic potassium hydroxide solution (for petroleum product neutralization value test manufactured by Wako Pure Chemical Industries, Ltd.)
Electrode: glass electrode; GE-101, comparative electrode; RE-201, Measurement mode: petroleum product neutralization value test 1

<Measurement of Molecular Weight>

A molecular weight was measured using a GPC apparatus (HLC-8220 GPC manufactured by Tosoh Corporation). Measuring conditions are as follows.
Sample concentration: 0.2 wt % (THF solution)
Sample injection amount: 10 µl
Eluent: THF
Flow rate: 0.6 ml/min
Measuring temperature: 40° C.
Column:
Sample column;
TSKguard column SuperHZ-H(1 column)+TSK gel Super HZM-H(2 columns)
Reference column;
TSK gel SuperH-RC(1 column)
Detector: Refractive index detector (RI)
A molecular weight was obtained in terms of polystyrene.

<Measurement of Glass Transition Temperature Tg>

A glass transition temperature Tg(° C.) was obtained by the following equation using the following reference values as a glass transition temperature $Tg_n$(° C.) of a homopolymer of each monomer.
Equation:

$$1/(Tg+273)=\Sigma[W_n/(Tg_n+273)]$$

[wherein Tg (° C.) represents a glass transition temperature of a copolymer, $W_n$ (−) represents a weight fraction of each monomer, $Tg_n$ (° C.) represents a glass transition temperature of a homopolymer of each polymer, and n represents a kind of each monomer]
Reference values:
Isononyl acrylate: −82° C.
2-Ethylhexyl acrylate: −70° C.
Butyl acrylate: −55° C.
2-Hydroxyethyl acrylate: −15° C.
Diethylacrylamide: 81° C.
Acrylic acid: 106° C.

Reference values were cited from the description in "Synthesis-Design and New Utility Development of Acryl Resin" (published by publishing section of Chubu Keiei Kaihatsu Center).

<Assessment of Toluene-Solubility>

9 Parts by weight of toluene (guaranteed grade manufactured by Wako Pure Chemical Industries, Ltd.) was added to 1 part by weight of an ionic liquid, and this was mixed and stirred under a normal temperature (25° C.) for 10 minutes, and allowed to stand for 30 minutes.

Thereafter, solubility was assessed with naked eyes, and toluene-solubility was determined. In assessment criteria, the state where no separated substance is observed, and a substance is uniformly dissolved was assessed as "soluble" (existence of toluene-solubility).

<Analysis of Ionic Liquid Structure>

Structural analysis of an ionic liquid was performed by NMR measurement, XRF measurement and FT-IR measurement.

[NMR Measurement]

NMR measurement was performed under the following measuring condition using a nuclear magnetic resonance apparatus (EX-400 manufactured by JEOL. Ltd.).
  Observation frequency: 400 MHz ($^1$H), 100 MHz ($^{13}$C)
  Measuring solvent: acetone-$d_6$
  Measuring temperature: 23° C.

[XRF Measurement]

XRF measurement was performed under the following measuring condition using a scanning-type fluorescent X-ray analyzing apparatus (ZSX-100e manufactured by Rigaku Corporation).
  Measuring method: filter method
  X-ray source: Rh

[FT-IR Measurement]

FT-IR measurement was performed under the following measuring condition using an infrared spectrophotometer (Magna-560 manufactured by Nicolet).
  Measuring method: ATR method
  Detector: DTGS
  Resolution: 4.0 cm$^{-1}$
  Accumulation times: 64
  Examples I to V will be explained below.

Example I

Preparation Example I-1

(Acryl-Based Polymer A)

A mixture of 200 parts by weight of 2-ethylhexyl acrylate, 8 parts by weight of 2-hydroxyethyl acrylate, 0.4 part by weight of 2,2'-azobis(isobutyronitrile) and 312 parts by weight of ethyl acetate was reacted at 65° C. for 6 hours under nitrogen atmosphere to obtain a solution (40% by weight) of an acryl-based polymer having Tg=−68° C., a weight average molecular weight of 500 thousands and an acid value of 0.

Preparation Example I-2

(Acryl Based-Polymer B)

A mixture of 200 parts by weight of n-butyl acrylate, 8 parts by weight of 2-hydroxyethyl acrylate, 0.4 part by weight of 2,2'-azobis(isobutyronitrile) and 625 parts by weight of ethyl acetate was reacted at 65° C. for 6 hours under nitrogen atmosphere to obtain a solution (25% by weight) of an acryl-based polymer having Tg=−54° C., a weight average molecular weight of 540 thousands and an acid value of 0.

Preparation Example I-3

(Allyl Polymer C)

A mixture of 200 parts by weight of 2-ethylhexyl acrylate, 8 parts by weight of acrylic acid, 0.4 part by weight of 2,2'-azobis(isobutyronitrile) and 312 parts by weight of ethyl acetate was reacted at 65° C. for 6 hours under nitrogen atmosphere to obtain a solution (40% by weight) of an acryl-based polymer having Tg=−66° C., a weight average molecular weight of 540 thousands and an acid value of 30.

Preparation Example I-4

(Acryl-Based Polymer D)

A mixture of 200 parts by weight of 2-ethylhexyl acrylate, 0.1 part by weight of 1-hydroxycyclohexyl phenyl ketone (Irgacure 184 manufactured by Ciba Specialty Chemicals) and 0.1 part by weight of benzyldimethylketal (Irgacure 651 manufactured by Ciba Specialty Chemicals) was irradiated with ultraviolet-ray using a high pressure mercury lamp under nitrogen atmosphere to obtain a partial polymer (weight average molecular weight 2200 thousands, acid value 0) having a polymerization rate of 10%.

Preparation Example I-5

(Antistatic Agent A)

A mixture of 0.2 part by weight of lithium perchlorate (melting point 236° C.) and 9.8 parts by weight of polypropylene glycol (diol type, number average molecular weight 2,000) was diluted with 10 parts by weight of ethyl acetate to prepare an antistatic agent solution (50% by weight).

Preparation Example I-6

(Antistatic Agent B)

10 Parts by weight of lauryltrimethylammonium chloride (manufactured by Tokyo Kasei Kogyo Co., Ltd.; solid at 25° C.) which is a cationic surfactant was diluted with 20 parts by weight of ethyl acetate and 20 parts by weight of isopropyl alcohol to prepare an antistatic agent solution (20% by weight).

Example I-1

(Preparation of Pressure-Sensitive Adhesive Composition)

A solution (40% by weight) of an acryl-based polymer A obtained in Preparation Example I-1 was diluted with ethyl acetate to 20% by weight, and 0.1 part by weight of 1-butyl-3-methylpyridinium trifluoromethanesulfonate (liquid at 25° C.) as an ionic liquid, 0.8 part by weight of an isocyanurate of hexamethylene diisocyanate (Coronate HX manufactured by Nippon Polyurethane Industry Co., Ltd.) and 0.4 part by weight of dibutyltin dilaurate (1% by weight ethyl acetate solution) as a crosslinking catalyst were added to 100 parts by weight of this solution to prepare an acryl pressure-sensitive adhesive solution.

(Preparation of Pressure-Sensitive Adhesive Sheet)

The aforementioned acryl pressure-sensitive adhesive solution was coated on one side of a polyethylene terephthalate film, and this was heated at 110° C. for 3 minutes to form a pressure-sensitive adhesive layer having a thickness of 20 μm. Then, a silicone-treated side of a polyethylene terephthalate film having a thickness of 25 μm was laminated to one side of a surface of the pressure-sensitive adhesive layer to prepare a pressure-sensitive adhesive sheet.

Example I-2

(Preparation of Pressure-Sensitive Adhesive Composition)

According to the same manner as that of Example I-1 except that 2.0 parts by weight of diallyldimethylammonium bis(trifluoromethanesulfonyl)imide (liquid at 25° C.) was used as an ionic liquid, an acryl pressure-sensitive adhesive solution was prepared.

(Preparation of Pressure-Sensitive Adhesive Sheet)

According to the same manner as that of Example I-1 except that the acryl pressure-sensitive adhesive solution prepared above was used as an acryl pressure-sensitive adhesive solution, a pressure-sensitive adhesive sheet was prepared.

Example I-3

(Preparation of Pressure-Sensitive Adhesive Composition)

The acryl-based polymer B solution (25% by weight) obtained in Preparation Example I-2 was diluted with ethyl acetate to 20% by weight, and 0.1 part by weight of 1-butyl-3-methylpyridinium trifluoromethanesulfonate (liquid at 25° C.) as an ionic liquid, 1.1 parts by weight of a trimethylolpropane/tolylene diisocyanate trimer adduct (Coronate L manufactured by Nippon Polyurethane Industry Co., Ltd.) and 0.6 part by weight of dibutyltin dilaurate (1% by weight ethyl acetate solution) were added to 100 parts by weight of this solution to prepare an acryl pressure-sensitive adhesive solution.

(Preparation of Pressure-Sensitive Adhesive Sheet)

According to the same manner as that of Example I-1 except that the acryl pressure-sensitive adhesive solution prepared above was used as an acryl pressure-sensitive adhesive solution, a pressure-sensitive adhesive sheet was prepared.

Example I-4

(Preparation of Pressure-Sensitive Adhesive Composition)

The acryl-based polymer C solution (40% by weight) obtained in Preparation Example I-3 was diluted with ethyl acetate to 20% by weight, and 2.0 parts by weight of diallyldimethylammonium bis(trifluoromethanesulfonyl)imide (liquid at 25° C.) as an ionic liquid, 0.7 part by weight of 1,3-bis(N,N-diglycidylaminomethyl)cyclohexane (TETRAD-C manufactured by Mitsubishi Gas Chemical Company, Inc.) and 0.3 part by weight of a trimethylolpropane/tolylene diisocyanate trimer adduct (Coronate L manufactured by Nippon Polyurethane Industry Co. Ltd.) were added to 100 parts by weight of this solution to prepare an acryl pressure-sensitive adhesive solution.

(Preparation of Pressure-Sensitive Adhesive Sheet)

According to the same manner as that of Example I-1 except that the acryl pressure-sensitive adhesive solution prepared above was used as an acryl pressure-sensitive adhesive solution, a pressure-sensitive adhesive sheet was prepared.

Example I-5

(Preparation of Pressure-Sensitive Adhesive Composition)

0.2 part by weight of 1-butyl-3-methylpyridinium trifluoromethanesulfonate (liquid at 25° C.) as an ionic liquid, 1.5 parts by weight of trimethylolpropane triacrylate and 0.1 part by weight of benzyldimethylketal (Irgacure 651 manufactured by Ciba Specialty Chemicals) were added to 100 parts by weight of the partial polymer obtained in Preparation Example I-4 to prepare an acryl pressure-sensitive adhesive solution.

(Preparation of Pressure-Sensitive Adhesive Sheet)

The aforementioned acryl pressure-sensitive adhesive solution was coated on one side of a polyethylene terephthalate film at a thickness of 20 μm, and a polyethylene terephthalate film having a thickness of 25 μm which had been silicone-treated was placed thereon. This sheet was irradiated with ultraviolet-ray with a high pressure mercury lamp at an irradiance of 37 mW/cm$^2$ and an exposure dose of 660 mJ/cm$^2$ to prepare a pressure-sensitive adhesive sheet.

Example I-6

(Preparation of Pressure-Sensitive Adhesive Composition)

According to the same manner as that of Example I-1 except that 0.1 part by weight of 1-butyl-3-methylpyridinium bis(trifluoromethanesulfonyl)imide (liquid at 25° C.) was used as an ionic liquid, an acryl pressure-sensitive adhesive solution was prepared.

(Preparation of Pressure-ensitive Adhesive Sheet)

According to the same manner as that of Example I-1 except that the acryl pressure-sensitive adhesive solution prepared above was used as an acryl pressure-sensitive adhesive solution, a pressure-sensitive adhesive sheet was prepared.

Comparative Example I-1

According to the same manner as that of Example I-1 except that an ionic liquid was not added, an acryl pressure-sensitive adhesive solution was prepared. According to the same manner as that of Example I-1 except that this acryl pressure-sensitive adhesive solution was used as an acryl pressure-sensitive adhesive solution, a surface protecting film having a thickness of 20 μm was prepared.

Comparative Example I-2

According to the same manner as that of Example I-3 except that an ionic liquid was not added, an acryl pressure-sensitive adhesive solution was prepared. According to the same manner as that of Example I-1 except that this acryl pressure-sensitive adhesive solution was used as an acryl pressure-sensitive adhesive solution, a surface protecting film having a thickness of 20 μm was prepared.

Comparative Example I-3

According to the same manner as that of Example I-4 except that an ionic liquid was not added, an acryl pressure-sensitive adhesive solution was prepared. According to the same manner as that of Example I-1 except that this acryl pressure-sensitive adhesive solution was used as an acryl pressure-sensitive adhesive solution, a surface protecting film having a thickness of 20 μm was prepared.

Comparative Example I-4

According to the same manner as that of Example I-5 except that an ionic liquid was not added, an acryl pressure-sensitive adhesive solution was prepared. According to the same manner as that of Example I-1 except that this acryl pressure-sensitive adhesive solution was used as an acryl pressure-sensitive adhesive solution, a surface protecting film having a thickness of 20 μm was prepared.

Comparative Example I-5

According to the same manner as that of Example I-1 except that 4.0 parts by weight of an antistatic agent A solution (50% by weight) of Preparation Example I-5 was used in place of the ionic liquid in Example I-1, an acryl pressure-sensitive solution was prepared. According to the same manner as that of Example I-1 except that this acryl pressure-sensitive adhesive solution was used as an acryl pressure-sensitive adhesive solution, a pressure-sensitive adhesive sheet was prepared.

Comparative Example I-6

According to the same manner as that of Example I-1 except that 10 parts by weight of an antistatic agent B solution (20% by weight) of Preparation Example I-6 was used in place of the ionic liquid in Example I-1, an acryl pressure-sensitive adhesive solution was prepared. According to the same manner as that of Example I-1 except that this acryl pressure-sensitive adhesive solution was used as an acryl pressure-sensitive adhesive solution, a pressure-sensitive adhesive sheet having a thickness of 20 μm was prepared.

Reference Example I-1

According to the same manner as that of Example I-1 except that 8.0 parts by weight of 1-butyl-3-methylpyridinium trifluoromethanesulfonate (liquid at 25° C.) was added as an ionic liquid, an acryl pressure-sensitive adhesive solution was prepared. According to the same manner as that of Example I-1 except that this acryl pressure-sensitive adhesive solution was used as an acryl pressure-sensitive adhesive solution, a surface protecting film having a thickness of 20 μm was prepared.

Regarding pressure-sensitive adhesive sheets obtained in the aforementioned Examples, Comparative Examples, and Reference Example, a peeling electrification voltage, staining property and an adhesive strength were assessed by the following conditions.

Measurement of Peeling Electrification Voltage

A pressure-sensitive adhesive is cut into a size of a width of 70 mm and a length of 100 mm, and is mounted on a sample fixing base as shown in FIG. 1. One end of a separator is fixed to an automatic winding machine, and a sample is peeled at a peeling angle of 1500 and a peeling rate of 10 m/min. A potential at a pressure-sensitive adhesive surface was measured with an electrostatic voltmeter (KSD-0103 manufactured by Kasuga Denki, INC.) fixed at a prescribed position. Measurement was performed under the environment of 23° C.×50% RH.

<Assessment of Staining Property>

A triacetylcellulose film (FujiTAC manufactured by Fuji Photo Film Co., Ltd.) having a thickness of 80 μm was cut into a width of 70 mm and a length of 100 mm, and this was immersed in an aqueous sodium hydroxide solution (10% by weight) at 60° C. for 1 minute, and washed with distilled water to prepare an adherend. The adherend was allowed to stand for 1 day under the environment of 23° C.×50% RH, the pressure-sensitive adhesive sheet which had been cut into a size of a width of 70 mm and a length of 100 mm was applied by a hand so that air bubbles were put in between the sheet and the adherend, to prepare an assessment sample. The sample was allowed to stand for 1 day under the environment of 50° C., and allowed to stand for 2 hours under the environment of 23° C.×50% RH and, thereafter, the pressure-sensitive adhesive sheet was peeled from the adherend by a hand, and the state of staining of an adherend surface was observed with naked eyes. Assessment criteria were such that the case of observation of non staining was ○, and the case of observation of staining was x.

<Measurement of Pressure-Sensitive Adhering Force>

A triacetylcellulose film (FujiTAC manufactured by Fuji Photo Film Co., Ltd.) having a thickness of 80 μm was cut into a width of 70 mm and a length of 100 mm, and this was immersed in an aqueous sodium hydroxide solution (10% by weight) at 60° C. for 1 minute, and washed with distilled water to prepare an adherend. The adherend was allowed to stand for 1 day under the environment of 23° C.×50% RH, to obtain an adherend for assessing a pressure-sensitive adhering force. A pressure-sensitive adhesive sheet which had been cut into a size of a width of 25 mm and a length of 80 mm was laminated on the aforementioned adherend for assessment at a pressure of 0.25 MPa to prepare an assessment sample. After allowed to stand for 30 minutes after lamination, a pressure-sensitive adhering force when peeled at a peeling rate of 30 m/min and a peeling angle of 180° using a universal tensile testing machine was measured. Measurement was performed under the environment of 23° C.×50% RH.

The above results are shown in Table 1.

TABLE 1

| | Peeling electrification voltage [kV] | Staining property [—] | Adhesive strength [N/25 mm] |
|---|---|---|---|
| Example I-1 | 0.0 | ○ | 1.1 |
| Example I-2 | 0.0 | ○ | 2.5 |
| Example I-3 | 0.0 | ○ | 6.4 |
| Example I-4 | 0.5 | ○ | 1.2 |
| Example I-5 | 0.0 | ○ | 1.7 |
| Example I-6 | 0.0 | ○ | 1.1 |
| Comparative Example I-1 | 1.9 | ○ | 1.5 |
| Comparative Example I-2 | 0.7 | ○ | 6.5 |
| Comparative Example I-3 | 1.2 | ○ | 1.1 |
| Comparative Example I-4 | 2.0 | ○ | 1.8 |
| Comparative Example I-5 | 0.0 | X | 1.6 |
| Comparative Example I-6 | 0.0 | X | 0.3 |
| Reference Example I-1 | 0.0 | X | 0.3 |

As apparent from results of Table 1, in all of pressure-sensitive adhesive sheets of Examples I-1 to 6 of the present invention, a peeling electrification voltage is suppressed while maintaining almost of an adhesive strength, as compared with pressure-sensitive adhesive sheets not containing an ionic liquid of Comparative Examples I-1 to 4. In addition, in all of pressure-sensitive adhesive sheets of Examples I-1 to 6 of the present invention, stains are not recognized as compared with Comparative Examples I-5 to 6. Therefore, it was seen that pressure-sensitive adhesive compositions of Examples I-1 to 6 are a pressure-sensitive adhesive composition excellent in antistatic property and low staining property.

In particular, in Comparative Example I-6, since a surfactant having a long chain alkyl group is used, bleeding is caused, and a pressure-sensitive adhering force is reduced and, also in Comparative Example I-5, bleeding preventing effect due to complexing of an alkali metal salt is not sufficient.

Example II

Preparation Example II-1

(Acryl-Based Polymer A)

As an acryl-based polymer A of Preparation Example II-1, an acryl-based polymer solution (40% by weight) of the acryl-based polymer A (Tg=−68° C., weight average molecular weight 500 thousands, acid value of 0) of Preparation Example I-1 in Example I was used.

Preparation Example II-2

(Acryl-Based Polymer B)

200 parts by weight of isononyl acrylate, 8 parts by weight of 2-hydroxyethyl acrylate, 0.4 part by weight of 2,2'-azobis (isobutyronitrile) and 312 parts by weight of ethyl acetate were reacted at 65° C. for 6 hours under nitrogen atmosphere to obtain a solution (40% by weight) of an acryl-based polymer having Tg=−80° C., a weight average molecular weight of 540 thousands, and an acid value of 0.

Preparation Example II-3

(Allyl Polymer C)

A mixture of 200 parts by weight of 2-ethylhexyl acrylate, 0.1 part by weight of 1-hydroxycyclohexyl phenyl ketone [Irgacure 184 manufactured by Ciba Specialty Chemicals] and 0.1 part by weight of benzyldimethylketal (Irgacure 651 manufactured by Ciba Specialty Chemicals) was irradiated with ultraviolet-ray with a high pressure mercury lamp under nitrogen atmosphere to obtain a partial polymer (weight average molecular weight 2200 thousands, acid value 0) having a polymerization rate of 10%.

Preparation Example II-4

(Acryl-Based Polymer D)

A mixture of 200 parts by weight of 2-ethylhexyl acrylate, 0.4 part by weight of acrylic acid, 3.6 parts by weight of 2-hydroxyethyl acrylate, 0.4 part by weight of 2,2'-azobis (isobutyronitrile) and 312 parts by weight of ethyl acetate was reacted at 65° C. for 6 hours under nitrogen atmosphere to obtain a solution (40% by weight) of an acryl-based polymer having Tg=−66° C., a weight average molecular weight of 560 thousands and an acid value of 1.3.

Preparation Example II-5

(Acryl-Based Polymer E)

A mixture of 200 parts by weight of 2-ethylhexyl acrylate, 8 parts by weight of acrylic acid, 0.4 part by weight of 2,2'-azobis(isobutyronitrile) and 312 parts by weight of ethyl acetate was reacted at 65° C. for 6 hours under nitrogen atmosphere to obtain a solution (40% by weight) of an acryl-based polymer having Tg=−66° C., a weight average molecular weight of 540 thousands and an acid value of 30.

Preparation Example II-6

(Antistatic Agent A)

As an antistatic agent A of Preparation Example II-6, the antistatic agent solution (50% by weight) of the antistatic agent A of Preparation Example I-5 in Example I was used.

Preparation Example II-7

(Antistatic-Treated Film)

10 Parts by weight of an antistatic agent (Microsolver RMd-142 manufactured by Solvex Co., Ltd.; a main component is tin oxide and polyester resin) was diluted with a mixed solvent containing 30 parts by weight of water and 70 parts by weight of methanol to prepare an antistatic agent solution.

The resulting antistatic agent solution was coated on a polyethylene terephthalate (PET) film (thickness 38 μm) using a Meyer bar, and this was dried at 130° C. for 1 minute to remove a solvent, to form an antistatic layer (thickness 0.2 μm), whereby, an antistatic-treated film was prepared.

Preparation Example II-8

(Antistatic Agent B)

As an antistatic agent B of Preparation Example II-8, the antistatic agent solution (20% by weight) of the antistatic agent B of Preparation Example I-6 in Example I was used.

Example II-1

[Preparation of Pressure-Sensitive Adhesive Composition]

The acryl-based polymer A solution (40% by weight) obtained in Preparation Example II-1 was diluted with ethyl acetate to 20% by weight, and 0.1 part by weight of 1-butyl-3-methylpyridinium trifluoromethanesulfonate (BMP-Trf manufactured by Japan Carlit Co., Ltd.; liquid at 25° C.) as an ionic liquid, 0.8 part by weight of an isocyanurate of hexamethylene diisocyanate (Coronate HX manufactured by Nippon Polyurethane Industry Co., Ltd.) and 0.4 part by weight of dibutyltin dilaurate (1% by weight ethyl acetate solution) as a crosslinking catalyst were added to 100 parts by weight of this solution to prepare an acryl pressure-sensitive adhesive solution.

(Preparation of Pressure-Sensitive Adhesive Sheet)

The aforementioned acryl pressure-sensitive adhesive solution was coated on a side opposite to an antistatic-treated side of the antistatic-treated film obtained in Preparation Example II-7, and this was heated at 110° C. for 3 minutes to form a pressure-sensitive adhesive layer having a thickness of 20 μm. Then, a silicone-treated side of a polyethylene terephthalate film having a thickness of 25 μm which had been subjected to silicone-treated was laminated on one side of a surface of the aforementioned pressure sensitive adhesive layer to prepare a pressure-sensitive adhesive sheet.

Example II-2

(Preparation of Pressure-Sensitive Adhesive Composition)

According to the same manner as that of Example II-1 except that 0.5 part by weight of N,N-diethyl-N-methyl-N-(2-methoxyethyl)ammonium bis(trifluoromethanesulfonyl) imide (manufactured by Kanto Kagaku; liquid at 25° C.)

(10% by weight ethyl acetate solution) was used as an ionic liquid, an acryl pressure-sensitive adhesive solution was prepared.

(Preparation of Pressure-Sensitive Adhesive Sheet)

According to the same manner as that of Example II-1 except that the acryl pressure-sensitive adhesive solution prepared above was used as an acryl pressure-sensitive adhesive solution, a pressure-sensitive adhesive sheet was prepared.

Example II-3

(Preparation of Pressure-Sensitive Adhesive Composition)

According to the same manner as that of Example II-1 except that a solution (40% by weight) of the acryl-based polymer B obtained in Preparation Example II-2 was diluted with ethyl acetate to 20% by weight, and 100 parts by weight of this solution was used, an acryl pressure-sensitive adhesive solution was prepared.

(Preparation of Pressure-Sensitive Adhesive Sheet)

According to the same manner as that of Example II-1 except that the acryl pressure-sensitive adhesive solution prepared above was used as an acryl pressure-sensitive adhesive solution, a pressure-sensitive adhesive sheet was prepared.

Example II-4

(Preparation of Pressure-Sensitive Adhesive Composition)

0.2 part by weight of 1-butyl-3-methylpyridinium trifluoromethanesulfonate (BMP-Trf manufactured by Japan Carlit Co., Ltd.; liquid at 25° C.) as an ionic liquid, 1.5 parts by weight of trimethylolpropane triacrylate and 0.1 part by weight of benzyldimethylketal (Irgacure 651 manufactured by Ciba Specialty Chemicals) were added to 100 parts by weight of the partial polymer obtained in Preparation Example II-3 to prepare an acryl pressure-sensitive adhesive solution.

(Preparation of Pressure-Sensitive Adhesive Sheet)

The aforementioned acryl pressure-sensitive adhesive solution was coated on a side opposite to an antistatic-treated side of the antistatic-treated film obtained in Preparation Example II-7 at a thickness of 20 μm, and a silicone-treated polyethylene terephthalate film having a thickness of 25 μm was placed thereon. This sheet was irradiated with ultraviolet-ray with a high pressure mercury lamp at an irradiance of 37 mW/cm$^2$ and an exposure dose of 660 mJ/cm$^2$ to prepare a pressure-sensitive adhesive sheet.

Example II-5

(Preparation of Pressure-Sensitive Adhesive Composition)

According to the same manner as that of Example II-1 except that 0.5 part by weight of 1-hexyl-3-methylimidazolium trifluoromethanesulfonate (manufactured by ACROS ORGANICS; liquid at 25° C.) (10% by weight ethyl acetate solution) was used as an ionic liquid, an acryl pressure-sensitive adhesive solution was prepared.

(Preparation of Pressure-Sensitive Adhesive Sheet)

According to the same manner as that of Example II-1 except that the acryl pressure-sensitive adhesive solution prepared above was used as an acryl pressure-sensitive adhesive solution, a pressure-sensitive adhesive sheet was prepared.

Example II-6

(Preparation of Pressure-Sensitive Adhesive Composition)

According to the same manner as that of Example II-1 except that 0.1 part by weight of 1-butyl-3-methylpyridinium bis(trifluoromethanesulfonyl)imide (BMP-IL manufactured by Japan Carlit Co., Ltd.; liquid at 25° C.) was used as an ionic liquid, an acryl pressure-sensitive adhesive solution was prepared.

(Preparation of Pressure-Sensitive Adhesive Sheet)

According to the same manner as that of Example II-1 except that the acryl pressure-sensitive adhesive solution prepared above was used as an acryl pressure-sensitive adhesive solution, a pressure-sensitive adhesive sheet was prepared.

Example II-7

(Preparation of Pressure-Sensitive Adhesive Composition)

The acryl-based polymer A solution (40% by weight) obtained in Preparation Example II-1 was diluted with ethyl acetate to 20% by weight, and 0.08 part by weight of 1-ethyl-3-methylimidazolium (trifluoromethanesulfonyl)trifluoroacetamide (trade name: EMI-TSAC manufactured by Tokuyama Corp.; liquid at 25° C.) as an ionic liquid, 0.4 part by weight of an isocyanurate of hexamethylene diisocyanate (Coronate HX manufactured by Nippon Polyurethane Industry Co., Ltd.), and 0.4 part by weight of dibutyltin dilaurate (1% by weight ethyl acetate solution) as a crosslinking catalyst were added to 100 parts by weight of this solution to prepare an acryl pressure-sensitive adhesive solution.

(Preparation of Pressure-Sensitive Adhesive Sheet)

According to the same manner as that of Example II-1 except that the acryl pressure-sensitive adhesive solution prepared above was used as an acryl pressure-sensitive adhesive solution, a pressure-sensitive adhesive sheet was prepared.

Example II-8

(Preparation of Pressure-Sensitive Adhesive Composition)

The acryl-based polymer A solution (40% by weight) obtained in Preparation Example II-1 was diluted with ethyl acetate to 20% by weight, and 0.1 part by weight of an aliphatic amine-based ionic liquid (IL-A1 manufactured by Koei Chemical Co., Ltd.; liquid at 25° C.) as an ionic liquid, 0.5 part by weight of an isocyanurate of hexamethylene diisocyante (Coronate HX manufactured by Nippon Polyurethane Industry Co., Ltd.) and 0.5 part by weight of dibutyltin dilaurate (1% by weight ethyl acetate solution) as a crosslinking catalyst were added to 100 parts by weight of this solution to prepare an acryl pressure-sensitive adhesive solution.

(Preparation of Pressure-Sensitive Adhesive Sheet)

According to the same manner as that of Example II-1 except that the acryl pressure-sensitive adhesive solution prepared above was used as an acryl pressure-sensitive adhesive solution, a pressure-sensitive adhesive sheet was prepared.

Comparative Example II-1

According to the same manner as that of Example II-1 except that an ionic liquid was not added, an acryl pressure-sensitive adhesive solution was prepared. According to the same manner as that of Example II-1 except that this acryl pressure-sensitive adhesive solution was used, a pressure-sensitive adhesive sheet having a thickness of 20 μm was prepared.

Comparative Example II-2

The acryl pressure-sensitive adhesive solution prepared in Comparative Example II-1 was coated on one side of a polyethylene terephthalate film, and this was heated at 110° C. for 3 minutes to form a pressure-sensitive adhesive layer having a thickness of 20 μm. Then, a silicone-treated side of a polyethylene terephthalate film having a thickness of 25 μm in which one side had been silicone-treated was laminated on a surface of the pressure-sensitive adhesive layer to prepare a pressure-sensitive adhesive sheet.

Comparative Example II-3

According to the same manner as that of Example II-3 except that an ionic liquid was not added, an acryl pressure-sensitive adhesive solution was prepared. According to the same manner as that of Example II-1 except that this acryl pressure-sensitive adhesive solution was used, a pressure-sensitive adhesive sheet having a thickness of 20 μm was prepared.

Comparative Example II-4

According to the same manner as that of Example II-4 except that an ionic liquid was not added, an acryl pressure-sensitive adhesive solution was prepared. According to the same manner as that of Example II-1 except that this acryl pressure-sensitive adhesive solution was used, a pressure-sensitive adhesive sheet having a thickness of 20 μm was prepared.

Comparative Example II-5

According to the same manner as that of Example II-1 except that the acryl-based polymer D solution (40% by weight) obtained in Preparation Example II-4 was diluted with ethyl acetate to 20% by weight, and 100 parts by weight of this solution was used, an acryl pressure-sensitive adhesive solution was prepared. According to the same manner as that of Example II-1 except that this acryl pressure-sensitive adhesive solution was used, a pressure-sensitive adhesive sheet having a thickness of 20 μm was prepared.

Comparative Example II-6

The acryl-based polymer E solution (40% by weight) obtained in Preparation Example II-5 was diluted with ethyl acetate to 20% by weight, and 0.2 part by weight of 1-butyl-3-methylpyridinium trifluoromethanesulfonate (BMP-Trf manufactured by Japan Carlit Co., Ltd.; liquid at 25° C.) as an ionic liquid, 0.7 part by weight of 1,3-bis(N,N-diglycidylaminomethyl)cyclohexane (TETRAD-C manufactured by Mitsubishi Gas Chemical Company, Inc.) and 0.3 part by weight of a trimethylolpropane/tolylene diisocyanate trimer adduct (Coronate L manufactured by Nippon Polyurethane Industry Co., Ltd.) were added to 100 parts by weight of this solution to prepare an acryl pressure-sensitive adhesive solution. According to the same manner as that of Example II-1 except that this acryl pressure-sensitive adhesive solution was used, a pressure-sensitive adhesive sheet having a thickness of 20 μm was prepared.

Comparative Example II-7

The acryl-based polymer A solution (40% by weight) obtained in Preparation Example II-1 was diluted with ethyl acetate to 20% by weight, and 4.0 parts by weight of the antistatic agent solution (50% by weight) of Preparation Example II-6, 0.53 part by weight of a trimethylolpropane/tolylene diisocyanate trimer adduct (Coronate L manufactured by Nippon Polyurethane Industry Co., Ltd.) and 0.4 part by weight of dibutyltin dilaurate (1% by weight ethyl acetate solution) as a crosslinking catalyst were added to 100 parts by weight of this solution to prepare an acryl pressure-sensitive adhesive solution. According to the same manner as that of Example II-1 except that this acryl pressure-sensitive adhesive solution was used, a pressure-sensitive adhesive sheet having a thickness of 20 μm was prepared.

Comparative Example II-8

According to the same manner as that of Example II-1 except that 0.5 part by weight of the antistatic agent B solution (20% by weight) of Preparation Example II-8 was used in place of the ionic liquid in Example II-1, an acryl pressure-sensitive adhesive solution was prepared. According to the same manner as that of Example II-1 except that this acryl pressure-sensitive adhesive solution was used, a pressure-sensitive adhesive sheet having a thickness of 20 μm was prepared.

Comparative Example II-9

The acryl pressure-sensitive adhesive solution prepared in Example II-2 was coated on one side of a polyethylene terephthalate film, and this was heated at 110° C. for 3 minutes to form a pressure-sensitive adhesive layer having a thickness of 20 μm. Then, a silicone-treated side of a polyethylene terephthalate film having a thickness of 25 μm in which one side had been silicone-treated was laminated on a surface of the aforementioned pressure-sensitive adhesive layer to prepare a pressure-sensitive adhesive sheet.

Reference Example II-1

According to the same manner as that of Example II-1 except that 8.0 parts by weight of 1-butyl-3-methylpyridinium trifluoromethanesulfonate was added as an ionic liquid, an acryl pressure-sensitive adhesive solution was prepared. According to the same manner as that of Example II-1 except that this acryl pressure-sensitive adhesive solution was used as an acryl pressure-sensitive adhesive solution, a pressure-sensitive adhesive sheet having a thickness of 20 μm was prepared.

Regarding pressure-sensitive adhesive sheets obtained in the aforementioned Examples, Comparative Examples, and Reference Example, a peeling electrification voltage, staining property and an adhesive strength were assessed by the following conditions.

<Measurement of Peeling Electrification Voltage>

A pressure-sensitive adhesive sheet is cut into a size of a width of 70 mm and a length of 130 mm, a separator is peeled, and the sample is adhered to a surface of a polarizing plate (SEG1425EWVAGS2B manufactured by Nitto Denko Corporation, size; width 70 mm, length 100 mm) laminated to an acryl plate having a thickness of 1 mm, a width of 70 mm and a length of 100 mm from which electricity has been removed in advance, with a hand roller, so that one end is protruded by 30 mm. After allowing to stand for one day under the environment of 23√ C.×50% RH, a sample is set at a prescribed position as shown in FIG. 2. One end protruding by 30 mm is fixed on an automatic winding machine, and the sample is peeled at a peeling angle of 150° and a peeling rate of 10 m/min. A voltage at a polarizing plate surface generated thereupon was measured with an electrostatic voltmeter (KSD-0103 manufactured by Kasuga Denki, INC.) fixed at a prescribed position. Measurement was performed under the environment of 23° C.×50% RH.

<Assessment of Staining Property>

After the aforementioned measurement of a peeling electrification voltage, a peeled pressure-sensitive adhesive sheet was applied to a polarizing plate after measurement with a hand again so that air bubbles were put in between the sheet and the plate, to prepare an assessment sample. After allowing to stand for one month under the environment of 23° C.×50% RH, a pressure-sensitive adhesive sheet was peeled from an adherend with a hand, and the state of staining of an adherend surface was observed with naked eyes. Assessment criteria were such that the case of observation of no staining was ○, and the case of observation of staining was x.

<Measurement of Adhesive Strength>

Measurement of an adhesive strength in Example II was performed as in the case of Example I.

The above results are shown in Table 2.

TABLE 2

| | Peeling electrification voltage [kV] | Staining property [—] | Adhesive strength [N/25 mm] |
|---|---|---|---|
| Example II-1 | 0.0 | ○ | 1.1 |
| Example II-2 | −0.3 | ○ | 1.3 |
| Example II-3 | 0.0 | ○ | 1.2 |
| Example II-4 | 0.0 | ○ | 1.7 |
| Example II-5 | 0.0 | ○ | 1.5 |
| Example II-6 | 0.0 | ○ | 1.1 |
| Example II-7 | 0.0 | ○ | 2.2 |
| Example II-8 | 0.0 | ○ | 2.3 |
| Comparative Example II-1 | −1.1 | ○ | 1.5 |
| Comparative Example II-2 | −0.8 | ○ | 1.4 |
| Comparative Example II-3 | −1.4 | ○ | 1.7 |
| Comparative Example II-4 | −1.2 | ○ | 1.8 |
| Comparative Example II-5 | −0.7 | ○ | 1.3 |
| Comparative Example II-6 | −0.9 | ○ | 0.9 |
| Comparative Example II-7 | 0.0 | X | 2.1 |
| Comparative Example II-8 | 0.0 | X | 0.4 |
| Comparative Example II-9 | −1.0 | ○ | 1.3 |
| Reference Example II-1 | 0.0 | X | 0.3 |

As apparent from results of the Table 2, in all of pressure-sensitive adhesive sheets of Examples II-1 to 8 of the present invention, a peeling electrification voltage is suppressed while maintaining almost of an adhesive strength as compared with pressure-sensitive adhesive sheets not containing an ionic liquid of Comparative Examples II-1 to 4. In addition, in all of pressure-sensitive adhesive sheets of Examples II-1 to 8 of the present invention, stains are not recognized as compared with Comparative Examples II-7 to 9. Therefore, it is seen that pressure-sensitive adhesive compositions of Examples II-1 to 8 are a pressure-sensitive adhesive composition excellent in antistatic property and low staining property.

In particular, in Comparative Example II-8, since a surfactant is used, bleeding is caused and, also in Comparative Example II-7, effect of preventing bleeding due to complexing an alkali metal salt is not sufficient.

Example III

Preparation Example III-1

(Acryl-Based Polymer A)

As an acryl-based polymer A of Preparation Example III-1, the acryl-based polymer solution (40% by weight) of the acryl-based polymer A (Tg=−68° C., weight average molecular weight 500 thousands, acid value 0) of Preparation Example I-1 in Example I was used.

Preparation Example III-2

(Acryl-Based Polymer B)

As an acryl-based polymer A of Preparation Example III-2, the acryl-based polymer solution (25% by weight) of the acryl-based polymer B (Tg=−54° C., weight average molecular weight 540 thousands, acid value 0) of Preparation Example I-2 in Example I was used.

Preparation Example III-3

(Acryl-Based Polymer C)

A mixture of 156 parts by weight of 2-ethylhexyl acrylate, 40 parts by weight of diethylacrylamide, 4 parts by weight of acrylic acid, 0.4 part by weight of 2,2'-azobis(isobutyronitrile) and 300 parts by weight of ethyl acetate was reacted at 65° C. for 6 hours under nitrogen atmosphere to obtain a solution (40% by weight) of an acryl-based polymer having Tg=−49° C., a weight average molecular weight of 560 thousands and an acid value of 15.

Preparation Example III-4

(Polarizing Plate)

A polyvinyl alcohol film having a polymerization degree of 1700 and a thickness of 80 μm was swollen in a warm water bath for 1 minute, stretched about 3-fold in an aqueous solution (30° C.) having an iodine concentration of 0.3% by weight comprising iodine and potassium iodide (weight ratio=1:10) and, thereafter, stretched in a 4% by weight aqueous boric acid solution at 50° C. so that a total stretching fold became 6. Subsequently, the film was immersed in a 4% by weight aqueous potassium iodide solution at 30° C. for 5 seconds, and dried at 40° C. for 5 minutes to obtain a polarizer. A saponification-treated triacetylcellulose film of a thickness of 80 μm was laminated on both sides of this polarizer using an adhesive comprising a 7% by weight aqueous polyvinyl alcohol solution to prepare a polarizing plate. Saponification treatment was performed by immersing in an aqueous sodium hydroxide solution (10% by weight) at 60° C. for 1 minute.

Example III-1

(Preparation of Pressure-Sensitive Adhesive Composition)

The acryl-based polymer A solution (40% by weight) obtained in Preparation Example III-1 was diluted with ethyl acetate, and 2.0 parts by weight of glycidyltrimethylammonium trifluoromethanesulfonate (liquid at 25° C.) as an ionic liquid, and 0.13 part by weight of a trimethylolpropane/tolylene diisocyanate trimer adduct (Coronate L manufactured by Nippon Polyurethane Industry Co., Ltd.) were added to 100 parts by weight of this solution to prepare an acryl pressure-sensitive adhesive solution.

(Preparation of Pressure-Sensitive Adhesive-Type Optical Member)

The aforementioned acryl pressure-sensitive adhesive solution was coated on a silicone-treated side of a polyethylene terephthalate film having a thickness of 38 μm which had been silicone-treated, and heated at 110° C. for 3 minutes to form a pressure-sensitive adhesive layer having a thickness of 25 μm. Then, a polarizing plate prepared in Preparation Example III-4 was laminated on the aforementioned pressure-sensitive adhesive layer side to prepare a pressure-sensitive adhesive-type optical member.

Example III-2

(Preparation of Pressure-Sensitive Adhesive Composition)

The acryl-based polymer B solution (25% by weight) obtained in Preparation Example III-2 was diluted with ethyl acetate to 20% by weight, and 0.2 part by weight of 1-butyl-3-methylpyridinium trifluoromethanesulfonate (liquid at 25° C.) as an ionic liquid, and 0.13 part by weight of a trimethylolpropane/tolylene diisocyante trimer adduct (Coronate L manufactured by Nippon Polyurethane Industry Co., Ltd.) were added to 100 parts by weight of this solution to prepare an acryl pressure-sensitive adhesive solution.

[Preparation of Pressure-Sensitive Adhesive-Type Optical Member]

According to the same manner as that of Example III-1 except that the acryl pressure-sensitive adhesive solution prepared above was used as an acryl pressure-sensitive adhesive solution, a pressure-sensitive adhesive-type optical member was prepared.

Example III-3

(Preparation of Pressure-Sensitive Adhesive Composition)

The acryl-based polymer solution (40% by weight) obtained in Preparation Example III-3 was diluted with ethyl acetate to 20% by weight, and 2.0 parts by weight of diallyldimethylammonium trifluoromethanesulfonate (liquid at 25° C.) as an ionic liquid, and 0.13 part by weight of a trimethylolpropane/tolylene diisocyanate trimer adduct (Coronate L manufactured by Nippon Polyurethane Industry Co., Ltd.) were added to 100 parts by weight of this solution to prepare an acryl pressure-sensitive adhesive solution.

(Preparation of Pressure-Sensitive Adhesive-Type Optical Member)

According to the same manner as that of Example III-1 except that the acryl pressure-sensitive adhesive solution prepared above was used as an acryl pressure-sensitive adhesive solution, an optical member was prepared.

Example III-4

(Preparation of Pressure-Sensitive Adhesive Composition)

The acryl-based polymer A solution (40% by weight) obtained in Preparation Example III-1 was diluted with ethyl acetate to 20% by weight, and 2.0 parts by weight of glycidyltrimethylammonium bis(trifluoromethanesulfonyl)imide (liquid at 25° C.) as an ionic liquid, and 0.13 part by weight of a trimethylolpropane/tolylene diisocyanate trimer adduct (Coronate L manufactured by Nippon Polyurethane Industry Co., Ltd.) were added to 100 parts by weight of this solution to prepare an acryl pressure-sensitive adhesive solution.

(Preparation of Pressure-Sensitive Adhesive-Type Optical Member)

The aforementioned acryl pressure-sensitive adhesive solution was coated on a silicone-treated side of a polyethylene terephthalate film of a thickness of 38 μm which had been silicone-treated, and heated at 110° C. for 3 minutes to form a pressure-sensitive adhesive layer having a thickness of 25 μm. Then, the polarizing plate prepared in Preparation Example III-4 was laminated on the pressure-sensitive adhesive layer side to prepare a pressure-sensitive adhesive-type optical member.

Example III-5

(Preparation of Pressure-Sensitive Adhesive Composition)

The acryl-based polymer B solution (25% by weight) obtained in Preparation Example III-2 was diluted with ethyl acetate to 20% by weight, and 0.2 part by weight of 1-butyl-3-methylpyridinium bis(trifluoromethanesulfonyl)imide (liquid at 25° C.) as an ionic liquid, and 0.13 part by weight of a trimethylolpropane/tolylene diisocyanate trimer adduct (Coronate L manufactured by Nippon Polyurethane Industry Co., Ltd.) were added to 100 parts by weight of this solution to prepare an acryl pressure-sensitive adhesive solution.

(Preparation of Pressure-Sensitive Adhesive-Type Optical Member)

According to the same manner as that of Example III-1 except that the acryl pressure-sensitive adhesive solution prepared above was used as an acryl pressure-sensitive adhesive solution, a pressure-sensitive adhesive-type optical member was prepared.

Example III-6

(Preparation of Pressure-Sensitive Adhesive Composition)

The acryl-based polymer solution (40% by weight) obtained in Preparation Example III-3 was diluted with ethyl acetate to 20% by weight, and 2.0 parts by weight of diallyldimethylammonium bis(trifluoromethanesulfonyl)imide (liquid at 25° C.) as an ionic liquid, and 0.13 part by weight of a trimethylolpropane/tolylene diisocyanate trimer adduct (Coronate L manufactured by Nippon Polyurethane Industry Co., Ltd.) were added to 100 parts by weight of this solution to prepare an acryl pressure-sensitive adhesive solution.

(Preparation of Pressure-Sensitive Adhesive-Type Optical Member)

According to the same manner as that of Example III-1 except that the acryl pressure-sensitive adhesive solution prepared above was used as an acryl pressure-sensitive adhesive solution, an optical member was prepared.

Comparative Example III-1

According to the same manner as that of Example III-1 except that an ionic liquid was not used, an acryl pressure-sensitive adhesive solution was prepared. According to the same manner as that of Example III-1 except that this acryl pressure-sensitive adhesive solution was used, a pressure-sensitive adhesive-type optical member was prepared.

Comparative Example III-2

According to the same manner as that of Example III-2 except that an ionic liquid was not used, an acryl pressure-sensitive adhesive solution was prepared. According to the same manner as that of Example III-1 except that this acryl pressure-sensitive adhesive solution was used, a pressure-sensitive adhesive-type optical member was prepared.

Comparative Example III-3

According to the same manner as that of Example III-3 except that an ionic liquid was not used, an acryl pressure-sensitive adhesive solution was prepared. According to the same manner as that of Example III-1 except that this acryl pressure-sensitive adhesive solution was used, a pressure-sensitive adhesive-type optical member was prepared.

Regarding pressure-sensitive adhesive sheets obtained in the aforementioned Examples and Comparative Examples, a peeling electrification voltage, staining property and an adhesive strength were assessed under the following conditions.

Preparation Example III-5

(Preparation of Antistatic-Treated Polyethylene Terephthalate Film)

The antistatic-treated film of Preparation Example II-7 in Example II was used as an antistatic-treated polyethylene terephthalate film of Preparation Example III-5.

Preparation Example III-6

(Preparation of Pressure-Sensitive Adhesive Composition)

The acryl-based polymer A solution (40% by weight) obtained in Preparation Example III-1 was diluted with ethyl acetate to 20% by weight, and 0.8 part by weight of an isocyanurate of hexamethylene diisocyanate (Coronate HX manufactured by Nippon Polyurethane Industry Co., Ltd.), and 0.4 part by weight of dibutyltin dilaurate (1% by weight ethyl acetate solution) as a crosslinking catalyst were added to 100 parts by weight of this solution to prepare an acryl pressure-sensitive adhesive solution.

Preparation Example III-7

(Preparation of Protecting Film)

The aforementioned acryl pressure-sensitive adhesive solution was coated on a side opposite to an antistatic-treated side of the antistatic-treated polyethylene terephthalate film obtained in Preparation Example III-5, and this was heated at 110° C. for 3 minutes to form a pressure-sensitive adhesive layer having a thickness of 20 μm. Then, a silicone-treated side of a polyethylene terephthalate film of a thickness of 25 μm in which one side had been silicone-treated was laminated on a surface of the aforementioned pressure-sensitive adhesive layer to prepare a protecting film.

<Measurement of Peeling Electrification Voltage>

A separator of a pressure-sensitive adhesive-type optical member which had been cut into a size of a width of 70 mm and a length of 100 mm was peeled, and laminated on an acryl plate (Acrylite manufactured by Mitsubishi Rayon Co., Ltd, thickness: 1 mm, width: 70 mm, length: 100 mm) from which electricity had been removed in advance, with a hand roller, to prepare an adherend. The protecting film obtained in Preparation Example III-7 was cut into a size of a width of 70 mm and a length of 130 mm, a separator was peeled, and this was adhered to a polarizing plate surface of the adherend from which electricity had been removed in advance, with a hand roller, so that one end was protruded by 30 mm. After allowed to stand for one day under the environment of 23° C.×50% RH, a sample was set at a prescribed position as shown below. One end protruding by 30 mm was fixed to an automatic winding machine, and the sample was peeled at a peeling angle of 150° and a peeling rate of 10 m/min. A potential at a polarizing plate surface generated thereupon was measured with an electrostatic voltmeter (KSD-0103 manufactured by KASUGA DENKI, INC.) fixed at a prescribed position. Measurement was performed under the environment of 23° C.×50% RH.

<Measurement of Adhesive Strength>

A separator of a pressure-sensitive adhesive-type optical member which had been cut into a width of 25 mm and a length of 100 mm was peeled, and laminated on a slide glass (manufactured by Matsunami Glass Ind., Ltd.; water edge polishing) having a thickness of 1.3 mm, a width of 65 mm and a length of 165 mm at a pressure of 0.25 MPa to prepare an assessment sample. After allowing to stand for 30 minutes after lamination, a pressure-sensitive adhering force when peeled with a universal tensile testing machine at a peeling rate of 300 mm/min and a peeling angle of 90° was measured. Measurement was performed under the condition of 23° C.×50% RH.

The above results are shown in Table 3.

TABLE 3

|  | Peeling electrification voltage [kV] | Adhesive strength [N/25 mm] |
|---|---|---|
| Example III-1 | 0.1 | 2.9 |
| Example III-2 | 0.2 | 4.3 |
| Example III-3 | 0.2 | 8.5 |
| Example III-4 | 0.1 | 2.9 |
| Example III-5 | 0.2 | 4.3 |
| Example III-6 | 0.2 | 8.5 |
| Comparative Example III-1 | 1.2 | 2.2 |
| Comparative Example III-2 | 1.2 | 4.5 |
| Comparative Example III-3 | 1.2 | 7.8 |

As apparent from results of the Table 3, in all of pressure-sensitive adhesive-type optical members of Examples III-1 to 6 of the present invention, a peeling electrification voltage is suppressed as compared with Comparative Examples III-1 to 3. In addition, all of pressure-sensitive adhesive-type optical members of Examples III-1 to 6 of the present invention exhibit a pressure-sensitive adhering force equal to that of Comparative Examples III-1 to 3. Therefore, it is seen that pressure-sensitive adhesive-type optical members of Examples III-1 to 6 are a pressure-sensitive adhesive-type optical member excellent in antistatic property and adhesive strength.

Example IV

<Preparation of Acryl-Based Polymer>

[Acryl-Based Polymer]

As an acryl-based polymer (A) of Example IV, the acryl-based polymer (A) solution (40% by weight) of the acryl-based polymer A (Tg=−68° C., weight average molecular weight 500 thousands, acid value 0) of Preparation Example I-1 in Example I was used.

[Acryl-Based Polymer (B)]

A four-neck flask equipped with a stirring wing, a thermometer, a nitrogen gas introducing tube and a condenser was charged with 200 parts by weight of isononyl acrylate, 8 parts by weight of 2-hydroxyethyl acrylate, 0.4 part by weight of 2,2′-azobis(isobutyronitrile) as a polymerization initiator, and 312 parts by weight of ethyl acetate, a nitrogen gas was introduced while mildly stirring, and a polymerization reaction was performed while maintaining a temperature of a liquid in a flask at around 65° C., to prepare an acryl-based polymer (B) solution (40% by weight). This acryl-based polymer (B) had Tg=−80° C., a weight average molecular weight of 540 thousands and an acid value of 0.0.

<Preparation of Ionic Liquid>

[Ionic Liquid (1)]

A 5% by weight aqueous solution of 10 parts by weight of tetra-n-pentylammonium bromide (manufactured by Tokyo Kasei Kogyo Co., Ltd.) was added to a four-neck flask equipped with a stirring wing, a thermometer and a condenser, and a 50% by weight aqueous solution of 5 parts by weight of lithium trifluoromethanesulfonate (manufactured by Tokyo Kasei Kogyo Co., Ltd.) was gradually added while rotating a stirring wing. After addition, stirring was continued at 23° C. for 2 hours, and this was allowed to stand for 12 hours. After the supernatant was removed, this was dried for 2 hours under the condition of 110° C. to obtain 6.5 parts by weight of an ionic liquid (1) which is liquid at 23° C.

NMR ($^1$H, $^{13}$C) measurement, FT-IR measurement and XRF measurement of the resulting ionic liquid (1) were performed, and tetra-n-pentylammonium trifluoromethanesulfonate was identified and confirmed. In addition, toluene-solubility was assessed, and possession of toluene-solubility was confirmed.

[Ionic Liquid (2)]

10 parts by weight of tetra-n-hexylammonium bromide (manufactured by Tokyo Kasei Kogyo Co., Ltd.) was added to a four-neck flask equipped with a stirring wing, a thermometer and a condenser, 40 parts by weight of distilled water and 50 parts by weight of dichloromethane were added, and a 50% by weight aqueous solution of 4 parts by weight of lithium trifluoromethanesulfonate (manufactured by Tokyo Kasei Kogyo Co., Ltd.) was gradually added while rotating a stirring wing. After addition, stirring was continued at 23° C. for 2 hours, and this was allowed to stand for 12 hours. Then, the supernatant was removed to obtain a dichloromethane-soluble substance.

The resulting dichloromethane-soluble substance was washed with 100 parts by weight of distilled water two times, dichloromethane was extracted and removed, and this was dried for 2 hours under the environment of 110° C. to obtain 10 parts by weight of an ionic liquid (2) which is liquid at 23° C.

NMR ($^1$H, $^{13}$C) measurement, FT-IR measurement and XRF measurement of the resulting ionic liquid (2) were performed, and tetra-n-hexylammonium trifluoromethanesulfonate was identified and confirmed. In addition, toluene-solubility was assessed, and possession of toluene-solubility was confirmed.

[Ionic Liquid (3)]

10 Parts by weight of tetra-n-heptylammonium bromide (manufactured by Tokyo Kasei Kogyo Co., Ltd.) was added to a four-neck flask equipped with a stirring wing, a thermometer and a condenser, 70 parts by weight of distilled water, and 50 parts by weight of dichloromethane were added, and a 50% by weight aqueous solution of 4 parts by weight of lithium trifluoromethanesulfonate (manufactured by Tokyo Kasei Kogyo Co., Ltd.) was gradually added while rotating a stirring wing. After addition, stirring was continued at 23° C. for 2 hours, and this was allowed to stand for 12 hours. Then, the supernatant was removed to obtain a dichloromethane-soluble substance.

The resulting dichloromethane-soluble substance was washed with 100 parts by weight of distilled water two times, dichloromethane was extracted and removed, and this was dried for 2 hours under the environment of 110° C. to obtain II parts by weight of an ionic liquid (3) which is liquid at 23° C.

NMR ($^1$H, $^{13}$C) measurement, FT-IR measurement and XRF measurement of the resulting ionic liquid (3) were performed, and tetra-n-heptylammonium trifluoromethanesulfonate was identified and confirmed. In addition, toluene-solubility was assessed, and possession of toluene-solubility was confirmed.

[Ionic Liquid (4)]

10 Parts by weight of tetra-n-octylphosphonium bromide (manufactured by Tokyo Kasei Kogyo Co., Ltd.) was added to a four-neck flask equipped with a stirring wing, a thermometer and a condenser, 200 parts by weight of distilled water and 50 parts by weight of dichloromethane were added, and a 50% by weight aqueous solution of 3 parts by weight of lithium trifluoromethanesulfonate (manufactured by Tokyo Kasei Kogyo Co., Ltd.) was gradually added while rotating a stirring wing. After addition, stirring was continued at 23° C. for 2 hours, and this was allowed to stand for 12 hours. Then, the supernatant was removed to obtain a dichloromethane-soluble substance.

The resulting dichloromethane-soluble substance was washed with 100 parts by weight of distilled water two times, dichloromethane was extracted and removed, and this was dried for 2 hours under the environment of 110° C. to obtain 10 parts by weight of an ionic liquid (4) which is liquid at 23° C.

NMR (1H, $^{13}$C) measurement, FT-IR measurement and XRF measurement of the resulting ionic liquid (4) were performed, and tetra-n-octylphosphonium trifluoromethanesulfonate was identified and confirmed. In addition, toluene-solubility was assessed, and possession of toluene-solubility was confirmed.

[Ionic Liquid (5)]

A 5% by weight aqueous solution of 10 parts by weight of tetra-n-pentylammonium bromide (manufactured by Tokyo Kasei Kogyo Co., Ltd.) was added to a four-neck flask equipped with a stirring wing, a thermometer and a condenser, and a 50% by weight aqueous solution of 9 parts by weight of lithium bis(trifluoromethanesulfon)imide (manufactured by Kishida Chemical Co., Ltd.) was gradually added while rotating a stirring wing. After addition, stirring was continued at 23° C. four 1 hour, 70 parts by weight of dichloromethane was added, and this was further stirred for 1 hour, and allowed to stand for 12 hours. Then, the supernatant was removed to obtain a dichloromethane-soluble substance.

The resulting dichloromethane-soluble substance was washed with 100 parts by weight of distilled water three times, dichloromethane was extracted and removed, and this was dried for 2 hours under the environment of 110° C. to obtain 15 parts by weight of an ionic liquid (5) which is liquid at 23° C.

NMR ($^1$H, $^{13}$C) measurement, FT-IR measurement and XRF measurement of the resulting ionic liquid (5) were performed, and tetra-n-pentylammonium bis(trifluoromethanesulfon)imide was identified and confirmed. In addition, toluene-solubility was assessed, and possession of toluene-solubility was not confirmed.

[Ionic Liquid (6)]

A 20% by weight aqueous solution of 10 parts by weight of 1-butyl-3-methylpyridinium chloride (manufactured by Wako Pure Chemical Industries, Ltd.) was added to four-neck flask equipped with a stirring wing, a thermometer and a condenser, and a 20% by weight aqueous solution of 19 parts by weight of lithium bis(trifluoromethanesulfon)imide (manufactured by Kishida Chemical Co., Ltd.) was gradually added while rotating a stirring wing. After addition, stirring was continued at 23° C. for 2 hours, and this was allowed to stand for 12 hours. Then, the supernatant was removed to obtain a liquid product.

The resulting liquid product was washed with 100 parts by weight of distilled water three times, and dried for 2 hours under the environment of 110° C. to obtain 2 parts by weight of an ionic liquid (6) which is liquid at 23° C.

NMR ($^1$H, $^{13}$C) measurement, FT-IR measurement and XRF measurement of the resulting ionic liquid (6) were performed, and 1-butyl-3-methylpyridinium bis(trifluoromethanesulfon)imide was identified and confirmed. In addition, toluene-solubility was assessed, and possession of toluene-solubility was not confirmed.

<Preparation of Antistatic Agent Solution>

[Antistatic Agent Solution (a)]

A four-neck flask equipped with a stirring wing, a thermometer and a condenser was charged with 0.1 part by weight of lithium perchlorate, 9.9 parts by weight of polypropylene glycol (diol type, number average molecular weight: 2000), and 10 parts by weight of ethyl acetate, and mixing and stirring were performed for 2 hours while maintaining a temperature of a liquid in a flask at around 80° C., to prepare an antistatic agent solution (a) (50% by weight).

<Preparation of Antistatic-Treated Film>

The antistatic-treated film of Preparation Example II-7 in Example II was used as an antistatic-treated film in Example IV.

Example IV-1

(Preparation of Pressure-Sensitive Adhesive Composition)

The aforementioned acryl-based polymer (A) solution (40% by weight) was diluted with ethyl acetate to 20% by weight, 2 parts by weight of the aforementioned ionic liquid (1) (10% by weight toluene solution), 0.6 part by weight of an isocyanurate of hexamethylene diisocyanate (Coronate HX manufactured by Nippon Polyurethane Industry Co., Ltd.), and 0.4 part by weight of dibutyltin dilaurate (1% by weight ethyl acetate solution) as a crosslinking catalyst were added to 100 parts by weight of this solution, and mixing and stirring were performed at 25° C. for 1 minute to prepare an acryl pressure-sensitive adhesive solution (1).

(Preparation of Pressure-Sensitive Adhesive Sheet)

The aforementioned acryl pressure-sensitive adhesive solution (1) was coated on a side opposite to an antistatic-treated side of the aforementioned antistatic-treated film, and this was heated at 110° C. for 3 minutes to form a pressure-sensitive adhesive layer having a thickness of 20 µm. Then, a silicone-treated side of a polyethylene terephthalate film having a thickness of 25 µm in which one side had been silicone-treated was laminated on a surface of the pressure-sensitive adhesive layer to prepare a pressure-sensitive adhesive sheet.

Example IV-2

(Preparation of Pressure-Sensitive Adhesive Composition)

According to the same manner as that of Example IV-1 except that 6 parts by weight of the aforementioned ionic liquid (2) (10% by weight toluene solution) was used in place of 2 parts by weight of the ionic liquid (1) (10% by weight toluene solution), an acryl pressure-sensitive adhesive solution (2) was prepared.

(Preparation of Pressure-Sensitive Adhesive Sheet)

According to the same manner as that of Example IV-1 except that the acryl pressure-sensitive adhesive solution (2) was used in place of the acryl pressure-sensitive adhesive solution (1), a pressure-sensitive adhesive sheet was prepared.

Example IV-3

(Preparation of Pressure-Sensitive Adhesive Composition)

According to the same manner as that of Example IV-1 except that 6 parts by weight of the ionic liquid (3) (10% by weight toluene solution) was used in place of 2 parts by weight of the ionic liquid (1) (10% by weight toluene solution), an acryl pressure-sensitive adhesive solution (3) was prepared.

(Preparation of Pressure-Sensitive Adhesive Sheet)

According to the same manner as that of Example IV-1 except that the acryl pressure-sensitive adhesive solution (3) was used in place of the acryl pressure-sensitive adhesive solution (1), a pressure-sensitive adhesive sheet was prepared.

Example IV-4

(Preparation of Pressure-Sensitive Adhesive Composition)

According to the same manner as that of Example IV-1 except that 16 parts by weight of the ionic liquid (4) (10% by weight toluene solution) was used in place of 2 parts by weight of the ionic liquid (1) (10% by weight toluene solution), an acryl pressure-sensitive adhesive solution (4) was prepared.

(Preparation of Pressure-Sensitive Adhesive Sheet)

According to the same manner as that of Example IV-1 except that the acryl pressure-sensitive adhesive solution (4)

was used in place of the acryl pressure-sensitive adhesive solution (1), a pressure-sensitive adhesive sheet was prepared.

Example IV-5

(Preparation of Pressure-Sensitive Adhesive Composition)

According to the same manner as that of Example IV-1 except that 100 parts by weight of a solution obtained by diluting the acryl-based polymer (B) solution (40% by weight) with ethyl acetate to 20% by weight was used in place of 100 parts by weight of a solution obtained by diluting the acryl-based polymer (A) solution (40% by weight) with ethyl acetate to 20% by weight, an acryl pressure-sensitive adhesive solution (5) was prepared.

(Preparation of Pressure-Sensitive Adhesive Sheet)

According to the same manner as that of Example IV-1 except that the acryl pressure-sensitive adhesive solution (5) was used in place of the acryl pressure-sensitive adhesive solution (1), a pressure-sensitive adhesive sheet was prepared.

Comparative Example IV-1

(Preparation of Pressure-Sensitive Adhesive Composition)

The acryl-based polymer (A) solution (40% by weight) was diluted with ethyl acetate to 20% by weight, 0.8 part by weight of an isocyanurate of hexamethylene diisocyanate (Coronate HX manufactured by Nippon Polyurethane Industry Co., Ltd.), and 0.4 part by weight of dibutyltin dilaurate (1% by weight ethyl acetate solution) were added to 100 parts by weight of this solution, and this was mixed and stirred at 25° C. for about 1 minute to prepare an acryl pressure-sensitive adhesive solution (6).

(Preparation of Pressure-Sensitive Adhesive Sheet)

According to the same manner as that of Example IV-1 except that the acryl pressure-sensitive adhesive solution (6) was used in place of the acryl pressure-sensitive adhesive solution (1), a pressure-sensitive adhesive sheet was prepared.

Comparative Example IV-2

(Preparation of Pressure-Sensitive Adhesive Composition)

According to the same manner as that of Comparative Example IV-1 except that 100 parts by weight of a solution obtained by diluting the acryl-based polymer (B) solution (40% by weight) with ethyl acetate to 20% by weight was used in place of 100 parts by weight of a solution obtained by diluting the acryl-based polymer (A) solution (40% by weight) with ethyl acetate to 20% by weight, an acryl pressure-sensitive adhesive solution (7) was prepared.

(Preparation of Pressure-Sensitive Adhesive Sheet)

According to the same manner as that of Example IV-1 except that the acryl pressure-sensitive adhesive solution (7) was used in place of the acryl pressure-sensitive adhesive solution (1), a pressure-sensitive adhesive sheet was prepared.

Comparative Example IV-3

(Preparation of Pressure-Sensitive Adhesive Composition)

According to the same manner as that of Example IV-1 except that 2 parts by weight of the ionic liquid (5) (10% by weight ethyl acetate solution) was used in place of 2 parts by weight of the ionic liquid (1) (10% by weight toluene solution), an acryl pressure-sensitive adhesive solution (8) was prepared.

(Preparation of Pressure-Sensitive Adhesive Sheet)

According to the same manner as that of Example IV-1 except that the acryl pressure-sensitive adhesive solution (8) was used in place of the acryl pressure-sensitive adhesive solution (1), a pressure-sensitive adhesive sheet was prepared.

Comparative Example IV-4

(Preparation of Pressure-Sensitive Adhesive Composition)

According to the same manner as that of Example IV-1 except that 2 parts by weight of the ionic liquid (6) (10% by weight ethyl acetate solution) was used in place of 2 parts by weight of the ionic liquid (1) (10% by weight toluene solution), an acryl pressure-sensitive adhesive solution (9) was prepared.

(Preparation of Pressure-Sensitive Adhesive Sheet)

According to the same manner as that of Example IV-1 except that the acryl pressure-sensitive adhesive solution (9) was used in place of the acryl pressure-sensitive adhesive solution (1), a pressure-sensitive adhesive sheet was prepared.

Comparative Example IV-5

(Preparation of Pressure-Sensitive Adhesive Composition)

The acryl-based polymer (A) solution (40% by weight) was diluted with ethyl acetate to 20% by weight, 2.6 parts by weight of the antistatic agent solution (a) (50% by weight), 0.4 part by weight of an isocyanurate of hexamethylene diisocyanate (Coronate HX manufactured by Nippon Polyurethane Industry Co., Ltd.), and 0.4 part by weight of dibutyltin dilaurate (1% by weight ethyl acetate solution) as a crosslinking catalyst were added to 100 parts by weight of this solution, and this was mixed and stirred at 25° C. for about 1 minute to prepare an acryl pressure-sensitive adhesive solution (10).

(Preparation of Pressure-Sensitive Adhesive Sheet)

According to the same manner as that of Example IV-1 except that the acryl pressure-sensitive adhesive solution (10) was used in place of the acryl pressure-sensitive adhesive solution (1), a pressure-sensitive adhesive sheet was prepared.

Regarding pressure-sensitive adhesive sheets obtained in the aforementioned Examples and Comparative Examples, a peeling electrification voltage, staining property and an adhesive strength were assessed under the following conditions.

<Measurement of Peeling Electrification Voltage>

A pressure-sensitive adhesive sheet was cut into a size of a width of 70 mm and a length of 130 mm, a separator was peeled, and this was adhered to a surface of a polarizing plate (SEG1224DUARC150T manufactured by Nitto Denko Corporation, width: 70 mm, length: 100 mm) laminated to an acryl plate (Acrylite manufactured by Mitsubishi Rayon Co., Ltd, thickness: 1 mm, width: 70 mm, length: 100 mm) from which electricity had been removed in advance, with a hand roller, so that one end was protruded by 30 mm.

After allowed to stand for one day under the environment of 23° C.×50% RH, and a sample was set at a prescribed position as shown in FIG. 2. One end protruding by 30 mm was fixed on an automatic winding machine, and a sample was peeled at a peeling angle of 150° and a peeling rate of 10 m/min. A potential at a polarizing plate surface generated thereupon was measured with an electrostatic voltmeter (KSD-0103 manufactured by Kasuga Denki, INC.) fixed at a prescribed position. Measurement was performed under the environment of 23° C.×50% RH.

<Assessment of Staining Property>

A pressure-sensitive adhesive sheet was cut into a size of a width of 70 mm and a length of 100 mm, and this was laminated on a polarizing plate (SEG1424DURARC150T manufactured by Nitto Denko Corporation, width: 70 mm, length: 100 mm) which had been surface-treated with a fluorine compound, with a hand, in the state where air bubbles were put in between the pressure-sensitive adhesive sheet and the polarizing plate, and an assessment sample was prepared.

This assessment sample was allowed to stand for 24 hours under the environment of 50° C.×92% RH, and allowed to stand for 2 hours under the environment of 23° C.×50% RH and, thereafter, the pressure-sensitive adhesive sheet was peeled from an adherend with a hand, and staining state of an adherend surface thereupon was observed with naked eyes. Assessment criteria are as follows:

Case of observation of no staining: ○
Case of observation of staining: x

<Measurement of Adhesive Strength>

A triacetylcellulose film (FujiTAC manufactured by Fuji Photo Film Co., Ltd., thickness: 90 μm) was cut into a width of 70 mm and a length of 100 mm, this was immersed in an aqueous sodium hydroxide solution (10% by weight) at 60° C. for 1 minute, and washed with distilled water to prepare an adherend.

The adherend was allowed to stand for 24 hours under the environment of 23° C.×50% RH, and a pressure-sensitive adhesive sheet which had been cut into a width of 25 mm and a length of 100 mm was laminated on the adherend at a pressure of 0.25 MPa to prepare an assessment sample.

After allowing to stand for 30 minutes under the environment of 23° C.×50% RH after the lamination, an adhesive strength when peeled with a universal tensile testing machine at a peeling rate of 10 m/min and a peeling angle of 180° was measured. Measurement was performed under the environment of 23° C.×50% RH.

Regarding pressure-sensitive adhesive sheets obtained in the aforementioned Examples and Comparative Examples, a peeling electrification voltage, staining property, and an adhesive strength were assessed under the aforementioned conditions. Results are shown in Table 4.

TABLE 4

|  | Peeling electrification voltage [kV] | Staining property [—] | Adhesive strength [N/25 mm] |
|---|---|---|---|
| Example IV-1 | −0.2 | ○ | 0.8 |
| Example IV-2 | −0.2 | ○ | 0.7 |
| Example IV-3 | −0.4 | ○ | 0.7 |
| Example IV-4 | −0.2 | ○ | 0.7 |
| Example IV-5 | −0.2 | ○ | 0.8 |
| Comparative Example IV-1 | −0.9 | ○ | 0.6 |
| Comparative Example IV-2 | −1.0 | ○ | 0.7 |
| Comparative Example IV-3 | −1.1 | ○ | 1.3 |
| Comparative Example IV-4 | −1.3 | X | 0.6 |
| Comparative Example IV-5 | −0.5 | X | 0.3 |

From results of the Table 4, it was made clear that, when pressure-sensitive adhesive compositions prepared according to the present invention are used (Examples IV-1 to 5), a peeling electrification voltage on a polarizing plate is suppressed in all Examples, and staining does not occur.

To the contrary, when an ionic liquid was not used (Comparative Examples IV-1 to 2), although occurrence of staining was not recognized in all cases, a peeling electrification voltage on a polarizing plate having a surface treated with a fluorine resin is high. In addition, an ionic liquid having no toluene-solubility was used (Comparative Examples IV-3 to 4), a peeling electrification voltage on a polarizing plate having a surface treated with a fluorine resin is high. Further, when an antistatic agent consisting of polyether polyol and an alkaline metal salt is used (Comparative Example IV-5), although a peeling electrification voltage is suppressed, occurrence of staining is recognized. Therefore, in all of Comparative Examples, both of a peeling electrification voltage on a polarizing plate as an adherend and occurrence of staining cannot be suppressed, and it was made clear that this is not suitable in a pressure-sensitive adhesive composition for a pressure-sensitive adhesive sheet.

In all of pressure-sensitive adhesive sheets of Examples IV-1 to 5 of the present invention, a 180° peeling adhesive strength is in a range of 0.1 to 6 N/25 mm, and it is seen that they are a pressure-sensitive adhesive sheet which is applicable as a pressure-sensitive adhesive sheet.

Example V

<Preparation of Acryl-Based Polymer>

[Acryl-Based Polymer (A)]

As an acryl-based polymer (A) of Example V, the acryl-based polymer (A) solution (40% by weight) of the acryl-based polymer (A) (Tg=−68° C., weight average molecular weight 500 thousands, acid value 0) of Preparation Example I-1 in Example I was used.

<Preparation of Ionic Liquid>

[Ionic Liquid (1)]

A solution obtained by diluting 10 parts by weight of 1-butyl-3-methylpyridinium chloride (manufactured by Wako Pure Chemical Industries, Ltd.) with distilled water to 20% by weight was added to a four-neck flask equipped with a stirring wing, a thermometer and a condenser, and a solution obtained by diluting 19 parts by weight of lithium bis(trifluoromethanesulfonyl)imide (manufactured by Kishida Chemical Co., Ltd.) with distilled water to 20% by weight was gradually added while rotating a stirring wing. After addition, stirring was continued at 25° C. for 2 hours, this was allowed to stand for 12 hours, and the supernatant was removed to obtain a liquid product.

The resulting liquid product was washed with 100 parts by weight of distilled water three times, and this was dried for 2 hours under the environment of 110° C. to obtain 20 parts by weight of an ionic liquid (1) which is liquid at 25° C. NMR ($^1$H, $^{13}$C) measurement, FT-IR measurement and XRF measurement of the resulting ionic liquid (1) were performed, and 1-butyl-3-methylpyridinium bis(trifluoromethanesulfonyl) imide was identified and confirmed.

<Preparation of Antistatic Agent Solution>

[Antistatic Agent Solution (e)]

10 Parts by weight of lauryltrimethylammonium chloride (manufactured by Tokyo Kasei Kogyo Co., Ltd.; solid at 25° C.) which is a cationic surfactant was diluted with a mixed solvent containing 20 parts by weight of ethyl acetate and 20 parts by weight of isopropyl alcohol, to prepare an antistatic agent solution (e) (20% by weight).

[Antistatic Agent Solution (f)]

As an antistatic agent solution (f) of Preparation Example V, the antistatic agent solution (50% by weight) of the antistatic agent A of Preparation Example I-5 in Example I was used.

<Preparation of Antistatic-Treated Film>

The antistatic-treated film of Preparation Example II-7 in Example II was used as an antistatic-treated film in Example IV.

Example V-1

(Preparation of Pressure-Sensitive Adhesive Composition)

The acryl-based polymer (A) solution (40% by weight) was diluted with ethyl acetate to 0.20% by weight, 0.6 part by weight of an alicyclic ionic liquid solution (10% by weight solution of IL-C1 in ethyl acetate, IL-C1 is manufactured by Koei Chemical Co. Ltd.), 0.6 part by weight of an isocyanurate of hexamethylene diisocyanate (Coronate HX manufactured by Nippon Polyurethane Industry Co., Ltd.) as a crosslinking agent, and 0.4 part by weight of dibutyltin dilaurate (1% by weight ethyl acetate solution) as a crosslinking catalyst were added to 100 parts by weight of this solution, and this was mixed and stirred at 25° C. for about 1 minute to prepare an acryl pressure-sensitive adhesive solution (1).

(Preparation of Pressure-Sensitive Adhesive Sheet)

The acryl pressure-sensitive adhesive solution (1) was coated on a side opposite to an antistatic-treated side of the antistatic-treated film, and this was heated at 110° C. for 3 minutes to form a pressure-sensitive adhesive layer having a thickness of 20 μm. Then, a silicone-treated side of a polyethylene terephthalate film having a thickness of 25 μm in which one side had been silicone-treated was laminated on a surface of the pressure-sensitive adhesive layer to prepare a pressure-sensitive adhesive sheet.

Example V-2

(Preparation of Pressure-Sensitive Adhesive Composition)

According to the same manner as that of Example V-1 except that 0.6 part by weight of an alicyclic ionic liquid (10% by weight of solution of IL-C3 in ethyl acetate, IL-C3 is manufactured by Koei Chemical Co. Ltd.) was used in place of 0.6 part by weight of the aforementioned alicyclic ionic liquid (10% by weight solution of IL-C1 in ethyl acetate), an acryl pressure-sensitive adhesive solution (2) was prepared.

(Preparation of Pressure-Sensitive Adhesive Sheet)

According to the same manner as that of Example V-1 except that the acryl pressure-sensitive adhesive solution (2) was used in place of the acryl pressure-sensitive adhesive solution (1), a pressure-sensitive adhesive sheet was prepared.

Comparative Example V-1

(Preparation of Pressure-Sensitive Adhesive Composition)

The acryl-based polymer (A) solution (40% by weight) was diluted with ethyl acetate to 20% by weight, 0.6 part by weight of an isocyanurate of hexamethylene diisocyanate (Coronate HX manufactured by Nippon Polyurethane Industry Co., Ltd.) as a crosslinking agent, and 0.4 part by weight of dibutyltin dilaurate (1% by weight ethyl acetate solution) as a crosslinking catalyst were added to 100 parts by weight of this solution, and this was mixed and stirred at 25° C. for about 1 minute to prepare an acryl pressure-sensitive adhesive solution (6).

(Preparation of Pressure-Sensitive Adhesive Sheet)

According to the same manner as that of Example V-1 except that the acryl pressure-sensitive adhesive solution (6) was used in place of the acryl pressure-sensitive adhesive solution (1), a pressure-sensitive adhesive sheet was prepared.

Comparative Example V-2

(Preparation of Pressure-Sensitive Adhesive Composition)

According to the same manner as that of Example V-1 except that 0.6 part by weight of a 10% by weight of solution of the ionic liquid (1) in ethyl acetate was used in place of 0.6 part by weight of the aforementioned alicyclic ionic liquid (10% by weight solution of IL-C1 in ethyl acetate), an acryl pressure-sensitive adhesive solution (7) was prepared.

(Preparation of Pressure-Sensitive Adhesive Sheet)

According to the same manner as that of Example V-1 except that the acryl pressure-sensitive adhesive solution (7) was used in place of the acryl pressure-sensitive adhesive solution (1), a pressure-sensitive adhesive sheet was prepared.

Comparative Example V-5

(Preparation of Pressure-Sensitive Adhesive Composition)

The acryl-based polymer (A) solution (40% by weight) was diluted with ethyl acetate to 20% by weight, 0.3 part by weight of the antistatic agent solution (e) (20% by weight), 0.5 part by weight of an isocyanurate of hexamethylene diisocyanate (Coronate HX manufactured by Nippon Polyurethane Industry Co., Ltd.) as a crosslinking agent, and 0.4 part by weight of dibutyltin dilaurate (1% by weight ethyl acetate solution) as a crosslinking catalyst were added to 100 parts by weight of this solution, and this was mixed and stirred at 25° C. for about 1 minute to prepare an acryl pressure-sensitive adhesive solution (10).

(Preparation of Pressure-Sensitive Adhesive Sheet)

According to the same manner as that of Example V-1 except that the acryl pressure-sensitive adhesive solution (10) was used in place of the acryl pressure-sensitive adhesive solution (1), a pressure-sensitive adhesive sheet was prepared.

Comparative Example V-6

(Preparation of Pressure-Sensitive Adhesive Composition)

The acryl-based polymer (A) solution (40% by weight) was diluted with ethyl acetate to 20% by weight, 4 parts by weight of the antistatic agent solution (f) (50% by weight), 0.53 part by weight of a trimethylolpropane/tolylene diisocyanate trimer adduct (Coronate L manufactured by Nippon Polyurethane Industry Co., Ltd.) as a crosslinking agent, and 0.4 part by weight of dibutyltin dilaurate (1% by weight ethyl acetate solution) as a crosslinking catalyst were added to 100 parts by weight of this solution, and this was mixed and stirred at 25° C. for about 1 minute to prepare an acryl pressure-sensitive adhesive solution (II).

[Preparation of Pressure-Sensitive Adhesive Sheet]

According to the same manner as that of Example V-1 except that the acryl pressure-sensitive adhesive solution (11) was used in place of the acryl pressure-sensitive adhesive solution (1), a pressure-sensitive adhesive sheet was prepared.

Regarding pressure-sensitive adhesive sheets obtained in the aforementioned Examples and Comparative Examples, a peeling electrification voltage, staining and an adhesive strength were assessed under the following conditions.

<Measurement of Peeling Electrification Voltage>

A pressure-sensitive adhesive sheet was cut into a size of a width of 70 mm and a length of 130 mm, a separator was peeled, and this was adhered on a surface of a polarizing plate (SEG1425EWVAGS2B (antiglare-treated type) or SEG1425EWV (antiglare-untreated type) manufactured by Nitto Denko Corporation, width: 70 mm, length: 100 mm) laminated to an acryl plate (Acrylite manufactured by Mitsubishi Rayon Co., Ltd, thickness: 1 mm, width: 70 mm, length: 100 mm) from which electricity had been removed in advance, with a hand roller, so that one end was protruded by 30 mm.

After allowed to stand for one day under the environment of 23° C.×50% RH, a sample is set at a prescribed position as shown in FIG. 2. One end protruding by 30 mm is fixed on an automatic winding machine, and the sample is peeled at a peeling angle of 1500 and a peeling rate of 10 m/min. A potential at a polarizing plate surface generated thereupon was measured with an electrostatic voltmeter (KSD-0103 manufactured by Kasuga DENKI, INC.) fixed at a prescribed position. Measurement was performed under the environment of 23° C.×50% RH.

<Assessment of Staining Property>

A pressure-sensitive adhesive sheet was cut into a size of a width of 100 mm and a length of 100 mm, and this was adhered on a surface of a polarizing plate (SEG1425EWVAGS2B manufactured by Nitto Denko Corporation, width: 180 mm, length: 250 mm) laminated to an acryl plate (CLAREX (black) manufactured by Nitto Resin Industry Co., Ltd., thickness: 1 mm, width: 180 mm, length: 250 mm), with a hand roller, to prepare an assessment sample.

This assessment sample was allowed to stand for 1 month under the environment 23° C.×50% RH and, thereafter, the pressure-sensitive adhesive sheet was peeled from an adherend with a hand, and staining state of an adherend surface thereupon was observed with naked eyes. Assessment criteria are as follows:

Case of observation of no staining: ○
Case of observation of staining: x

<Measurement of Adhesive Strength>

An adhesive strength in Example V was measured as in Example IV.

The above results are shown in Table 5.

TABLE 5

| | Peeling electrification voltage [kV] | | Staining property | Adhesive strength |
|---|---|---|---|---|
| | SEG1425EWVAGS2B | SEG1425EWV | [—] | [N/25 mm] |
| Example V-1 | −0.1 | −0.3 | ○ | 0.8 |
| Example V-2 | −0.1 | −0.3 | ○ | 0.8 |
| Comparative Example V-1 | −1.1 | 1.2 | ○ | 0.9 |
| Comparative Example V-2 | −0.7 | −0.6 | ○ | 0.7 |
| Comparative Example V-5 | 0.0 | 0.0 | X | 0.4 |
| Comparative Example V-6 | 0.0 | 0.0 | X | 0.5 |

From results of the above Table 5, it was made clear that, when pressure-sensitive adhesive compositions prepared in accordance with the present invention are used (Examples V-1 to 2), a peeling electrification voltage on any type of a polarizing plate is suppressed, staining of a polarizing plate does not occur, and re-peelability is excellent in all Examples.

To the contrary, when an ionic liquid was not used (Comparative Example V-1), although occurrence of staining was not recognized, a peeling electrification voltage on a polarizing plate was high. In addition, when an ionic liquid not having an alicyclic group was used (Comparative Examples V-2), both of suppression of a peeling electrification voltage and suppression of occurrence of staining on two both types of polarizing plates were not realized, being inferior. Further, when a surfactant is used as an antistatic agent (Comparative Example V-5), and when an antistatic agent consisting of polyether polyol and an alkali metal salt was used (Comparative Example V-6), although a peeling electrification voltage was suppressed, occurrence of staining was recognized in both cases. Therefore, in any of Comparative Examples, both of suppression of a peeling electrification voltage and suppression of occurrence of staining on two both types of polarizing plates which are an adherend could not be realized, and it was made clear that those Comparative Examples do not suitable in a pressure-sensitive adhesive composition for a pressure-sensitive adhesive sheet.

What is claimed is:

1. A pressure-sensitive adhesive composition comprising an ionic liquid, and a polymer having a glass transition temperature Tg of 0° C. or lower as a base polymer,
   wherein the ionic liquid is a melt salt exhibiting the liquid state at room temperature.

2. The pressure-sensitive adhesive composition according to claim 1, wherein the ionic liquid is at least one kind or more of a nitrogen-containing onium salt, a sulfur-containing onium salt, and a phosphorus-containing onium salt.

3. The pressure-sensitive adhesive composition according to claim 2, wherein the ionic liquid contains one or more kinds of cations represented by the following general formulas (A) to (D):

[Chemical Formula 1]

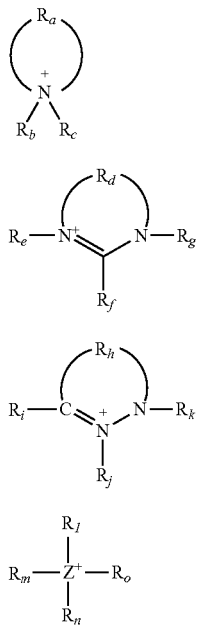

in the formula (A), $R_a$ represents a hydrocarbon group of a carbon number of 4 to 20, and may contain a hetero atom, and $R_b$ and $R_c$ are the same or different, represent hydrogen or a hydrocarbon group of a carbon number of 1 to 16, and may contain a hetero atom, provided that, when a nitrogen atom contains a double bond, $R_c$ is not present;

in the formula (B), $R_d$ represents a hydrocarbon group of a carbon number of 2 to 20, and may contain a hetero atom, and $R_e$, $R_f$ and $R_g$ are the same or different, represent hydrogen or a hydrocarbon group of a carbon number of 1 to 16, and may contain a hetero atom;

in the formula (C), $R_h$ represents a hydrocarbon group of a carbon number of 2 to 20, and may contain a hetero atom, and $R_i$, $R_j$ and $R_k$ are the same or different, represent a hydrogen or a hydrocarbon group of a carbon number of 1 to 16, and may contain a hetero atom; and in the formula (D), Z represents a nitrogen atom, a sulfur atom, or a phosphorus atom, and $R_l$, $R_m$, $R_n$ and $R_o$ are the same or different, represent a hydrocarbon group of a carbon number of 1 to 20, and may contain a hetero atom, provided that, when Z is a sulfur atom, $R_o$ is not present.

4. The pressure-sensitive adhesive composition according to claim 1, wherein the ionic liquid is a toluene-soluble ionic liquid.

5. The pressure-sensitive adhesive composition according to claim 1, wherein the polymer having a glass transition temperature Tg of 0° C. or lower is a (meth)acryl-based polymer containing, as a main component, one or more kinds of acrylate and/or methacrylate having an alkyl group of a carbon number of 1 to 14.

6. The pressure-sensitive adhesive composition according to claim 5, wherein an acid value of the (meth)acryl-based polymer is 1.0 or less.

7. A pressure-sensitive adhesive layer comprising a pressure-sensitive adhesive composition as defined in claim 1.

8. A pressure-sensitive adhesive sheet comprising a pressure-sensitive adhesive layer containing a pressure-sensitive adhesive composition as defined in claim 1 on one side or both sides of a support.

9. The pressure-sensitive adhesive sheet according to claim 8, wherein the support is provided with an antistatic-treated plastic film.

10. A surface protecting film comprising a pressure-sensitive adhesive layer containing a pressure-sensitive adhesive composition as defined in claim 1 on one side or both sides of a support.

11. The surface protecting film according to claim 10, wherein the support is provided with an antistatic-treated plastic film.

12. A pressure-sensitive adhesive-type optical member comprising a pressure-sensitive adhesive layer containing a pressure-sensitive adhesive composition as defined in claim 1 on one side or both sides of an optical member.

13. The pressure-sensitive adhesive optical member according to claim 12, wherein the optical member comprises a polarizing plate, a phase difference plate, a luminance improving plate or an antiglare sheet.

14. The pressure-sensitive adhesive composition of claim 1, wherein said pressure-sensitive adhesive composition is capable of preventing electrification of an adherend upon peeling of a surface protecting film containing said composition from the adherend.

15. The pressure-sensitive adhesive composition according to claim 1, wherein the amount of ionic liquid to be added is 0.01-40 parts by weight to 100 parts by weight of the base polymer.

16. A pressure-sensitive adhesive composition comprising an ionic liquid, and a polymer having a glass transition temperature Tg of 0° C. or lower as a base polymer,
wherein the ionic liquid is a toluene-soluble ionic liquid,
wherein the ionic liquid is a melt salt exhibiting the liquid state at room temperature,
and wherein the ionic liquid comprises a $CF_3SO_3^-$ anion.

17. A pressure-sensitive adhesive composition comprising an ionic liquid, and a polymer having a glass transition temperature Tg of 0° C. or lower as a base polymer, wherein the ionic liquid is an alicyclic ionic liquid, and wherein the ionic liquid is a melt salt exhibiting the liquid state at room temperature.

18. The pressure-sensitive adhesive composition according to claim 17, wherein the ionic liquid comprises any of a pyrrolidinium cation and/or a piperidinium cation.

* * * * *

UNITED STATES PATENT AND TRADEMARK OFFICE
CERTIFICATE OF CORRECTION

PATENT NO. : 7,691,925 B2
APPLICATION NO. : 11/073456
DATED : April 6, 2010
INVENTOR(S) : Tatsumi Amano et al.

It is certified that error appears in the above-identified patent and that said Letters Patent is hereby corrected as shown below:

Column 5, Line 18, please delete "ionic-liquid" and insert --ionic liquid--, therefor.

Column 6, Line 40, please delete "0.5 kv." and insert --0.5 kV.--, therefor.

Column 8, Line 29, please delete "present]" and insert --present].--, therefor.

Column 8, Line 50, please delete "1-butyl-3-methylmidazolium" and insert --1-butyl-3-methylimidazoliun--, therefor.

Column 9, Line 24, please delete "glycidiyltrimethylammonium" and insert --glycidyltrimethylammonium--, therefor.

Column 9, Line 50, please delete "metyl" and insert --methyl--, therefor.

Column 10, Line 11, please delete "glycidiyltrimethylammonium" and insert --glycidyltrimethylammonium--, therefor.

Column 10, Line 62-64, please delete "liquid-having-improved-" and insert --liquid having improved--, therefor.

Column 11, Line 5, please delete "(trifluoromethaneslufonyl)" and insert --(trifluoromethanesulfonyl)--, therefor.

Column 16, Line 58, please delete "increased," and insert --increased.--, therefor.

Column 19, Line 55, please delete "(meth)acrly" and insert --(meth)acryl--, therefor.

Column 19, Line 65, please delete "alicycilc" and insert --alicyclic--, therefor.

Column 20, Line 64, please delete "polyfunctinal" and insert --polyfunctional--, therefor.

Column 20, Line 65, please delete "diethlene" and insert --diethylene--, therefor.

Column 21, Line 4, please delete "polyfunctinal" and insert --polyfunctional--, therefor.

Column 21, Line 34, please delete "acetophenes" and insert --acetophenones--, therefor.

Column 21, Line 40, please delete "thioxanthons" and insert --thioxanthones--, therefor.

Column 21, Line 45, please delete "benzil," and insert --benzyl,--, therefor.

Signed and Sealed this
Twenty-eighth Day of August, 2012

David J. Kappos
*Director of the United States Patent and Trademark Office*

CERTIFICATE OF CORRECTION (continued)

Column 21, Line 63, please delete "diemethylaminoacetophenone," and insert --dimethylaminoacetophenone,--, therefor.

Column 23, Line 44, please delete "alkylbetain" and insert --alkylbetaine--, therefor.

Column 24, Line 7, please delete "alkylbetain, alkylimidazoliumbetain," and insert --alkylbetaine, alkylimidazoliumbetaine,--, therefor.

Column 24, Line 8, please delete "carbobetaingrafted" and insert --cabobetaine grafted--, therefor.

Column 27, Line 4, please delete "arylate-" and insert --acrylate--, therefor.

Column 30, Line 17, please delete "polyarylate," and insert --polyacrylate,--, therefor.

Column 30, Line 36, please delete "polysiloxisane," and insert --polysiloxane,--, therefor.

Column 33, Line 60, please delete "πtype" and insert --π type--, therefor.

Column 34, Line 55, please delete "µL" and insert --EL--, therefor.

Column 40, Line 22, please delete "Pressure-ensitive" and insert --Pressure-sensitive--, therefor.

Column 41, Line 37, please delete "Measurement of Peeling Electrification Voltage" and insert --<Measurement of Peeling Electrification Voltage>--, therefor.

Column 41, Line 42, please delete "1500" and insert --150°--, therefor.

Column 46, Line 39-40, please delete "diisocyante" and insert --diisocyanate--, therefor.

Column 48, Line 59, please delete "23√ C.x50%" and insert --23° C.x50%--, therefor.

Column 51, Line 35, please delete "diisocyante" and insert --diisocyanate--, therefor.

Column 63, Line 33, please delete "0.20%" and insert --20%--, therefor.

Column 65, Line 38, please delete "1500" and insert --150°--, therefor.